(12) United States Patent
Armes et al.

(10) Patent No.: US 9,611,335 B2
(45) Date of Patent: Apr. 4, 2017

(54) POLYMER SYNTHESIS

(75) Inventors: Steven P. Armes, Sheffield (GB);
Yuting Li, Seattle, WA (US)

(73) Assignee: University of Sheffield, Sheffield (GB)

( * ) Notice: Subject to any disclaimer, the term of this patent is extended or adjusted under 35 U.S.C. 154(b) by 400 days.

(21) Appl. No.: 13/583,557

(22) PCT Filed: Mar. 8, 2011

(86) PCT No.: PCT/GB2011/050453
§ 371 (c)(1),
(2), (4) Date: Sep. 7, 2012

(87) PCT Pub. No.: WO2011/110841
PCT Pub. Date: Sep. 15, 2011

(65) Prior Publication Data
US 2013/0046052 A1    Feb. 21, 2013

(30) Foreign Application Priority Data
Mar. 10, 2010   (GB) .................................. 1003970.9

(51) Int. Cl.
*C08F 265/06*   (2006.01)
*C08F 2/18*   (2006.01)
(Continued)

(52) U.S. Cl.
CPC .................. *C08F 2/18* (2013.01); *C08F 2/38* (2013.01); *C08F 293/005* (2013.01); *C08F 2438/03* (2013.01)

(58) Field of Classification Search
CPC .... C08F 2438/03; C08F 293/005; C08F 2/18; C08F 2/38
See application file for complete search history.

(56) References Cited

U.S. PATENT DOCUMENTS 8,389,643 B2 * 3/2013 Couvreur ................ C08F 20/12
525/345
2006/0223936 A1 * 10/2006 Such et al. ..................... 524/555
(Continued)

FOREIGN PATENT DOCUMENTS

WO    WO-03/055919 A1    7/2003

OTHER PUBLICATIONS

Ali, et al., "Synthesis of Poly(2-hydroxypropyl methacrylate) Latex Particles via Aqueous Dispersion Polymerization," Soft Matter, vol. 3, pp. 1003-1013 (2007).
(Continued)

*Primary Examiner* — Michael A Salvitti
(74) *Attorney, Agent, or Firm* — Wilmer Cutler Pickering Hale and Dorr LLP

(57) ABSTRACT

A method of preparing a block copolymer of Formula (B) wherein $P_1$ represents a substantially aqueously soluble polymeric component and $P_2$ represents a substantially aqueously insoluble polymeric component, comprises admixing an aqueously soluble polymer macro-chain transfer agent comprising $P_1$ with a monomer ($M_2$) and initiating an aqueous dispersion-type radical addition fragmentation chain transfer (RAFT) polymerization. ($P_1$) is derived from a monomer ($M_1$) selected from monomers of the Formulae ($M_{1A}$), ($M_{1B}$) and/or ($M_{1C}$) where $R^1$, $R^{10}$ and $R^{11}$ represent a substituent of ($M_{1A}$) or ($M_{1C}$) which allows $P_1$ to be at least partially aqueously soluble, $R^2$ represents H, $CH_3$ or CN, $R^S$ represents one or more substituents of the aromatic ring effective to allow $P_1$ to be at least partially aqueously soluble, and monomer $M_2$ is selected from: where $R^3$ is a substituent of ($M_2$) which allows $P_2$ to be substantially aqueously insoluble, and $R^4$ and $R^6$ independently represent H or methyl.

(Continued)

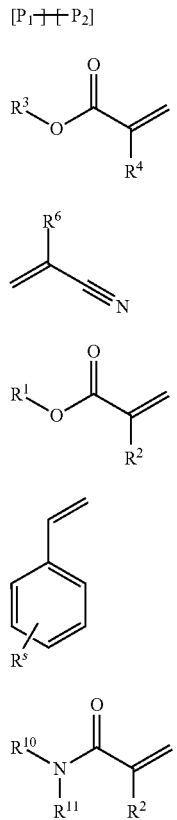

5 Claims, 33 Drawing Sheets

(51) Int. Cl.
    *C08F 2/38* (2006.01)
    *C08F 293/00* (2006.01)

(56) References Cited

U.S. PATENT DOCUMENTS

| | | | |
|---|---|---|---|
| 2007/0123670 A1* | 5/2007 | McCormick et al. | C07C 327/36 526/222 |
| 2008/0139399 A1* | 6/2008 | Fonnum | C08F 287/00 506/9 |
| 2010/0227975 A1* | 9/2010 | Such et al. | 524/849 |
| 2011/0021689 A1* | 1/2011 | Schellekens | C08F 293/005 524/505 |
| 2011/0207871 A1* | 8/2011 | Geurts | C08F 2/18 524/458 |
| 2012/0282212 A1* | 11/2012 | Schellekens | C08F 293/005 424/78.31 |
| 2013/0046052 A1* | 2/2013 | Armes et al. | 524/547 |
| 2013/0150528 A1* | 6/2013 | Schellekens et al. | 524/831 |

OTHER PUBLICATIONS

An, et al., "Facile RAFT Precipitation Polymerization for the Microwave-Assisted Synthesis of Well-Defined, Double Hydrophilic Block Copolymers and Nanostructured Hydrogels," J. American Chemical Society, vol. 129, pp. 14493-14499 (2007).
Ferguson, et al., "Ab Initio Emulsion Polymerization by RAFT-Controlled Self-Assembly," Macromolecules, vol. 38, pp. 2191-2204 (2005).
Ferguson, et al., "Effective ab Initio Emulsion Polymerization under RAFT Control," Macromolecules, vol. 35, No. 25, pp. 9243-9245 (2002).
Li, Y. and Armes, S.P., "RAFT Synthesis of Sterically Stabilized Methacrylic Nanolatexes and Vesicles by Aqueous Dispersion Polymerization," Angew. Chem. Int. Ed., vol. 49, pp. 4042-4046 (2010).
Manguian, et al., "Batch Emulsion Polymerization of Styrene Stabilized by a Hydrophilic Macro-RAFT Agent$^a$," Macromol. Rapid Commun., vol. 27, pp. 399-404 (2006).
Moad, et al., "Living Radical Polymerization by the RAFT Process," Aust. J. Chem., vol. 58, pp. 379-410 (2005).
Moad, et al., "Toward Living Radical Polymerization," Accounts of Chemical Research, vol. 41, No. 9, pp. 1133-1142 (Sep. 2008).
Pham, et al., "Miniemulsion Polymerization Stabilized by Amphipathic Macro RAFT Agents," Macromolecules, vol. 36, No. 24, pp. 8907-8909 (Dec. 2, 2003).
Rieger, et al., "Amphiphilic Poly(ethylene oxide) Macromolecular RAFT Agent as a Stabilizer and Control Agent in ab Initio Batch Emulsion Polymerization," Macromolecules, vol. 41, pp. 4065-4068 (2008).
Stoffelbach, et al., "Surfactant-Free, Controlled/Living Radical Emulsion Polymerization in Batch Conditions Using a Low Molar Mass, Surface-Active Reversible Addition-Fragmentation Chain-Transfer (RAFT) Agent," Macromolecules, vol. 41, pp. 7850-7856 (2008).
Tadros, T.F., "Colloids in Paints," Colloids and Interface Science Series, Wiley, Hoboken, vol. 6, pp. 11-32 (2010).
International Search Report and Written Opinion for International Patent Application No. PCT/GB11/50453, dated Jun. 9, 2011 (11 pages).
Kim et al., "Dispersion polymerization of acrylonitrile using a poly(ethylene glycol)-*b*-polyacrylonitrile macro-RAFT agent" Fibers and Polymers 11(2), pp. 153-157 (2010).
Li and Armes, "RAFT Synthesis of Sterically Stabilized Methacrylic Nanolatexes and Vesicles by Aqueous Dispersion Polymerization," Angew. Chem., Int. Ed. 49, pp. 4042-4046 (2010).
Rieger et al., "Amphiphilic Poly(ethylene oxide) Macromolecular RAFT Agent as a stabilizer and Control Agent in ab Initio Batch Emulsion Polymerization," Macromolecules 41, pp. 4065-4068 (2008).
Rieger et al., "Pegylated thermally responsive block copolymer micelles and nanogels via in situ RAFT aqueous dispersion polymerization," Journal of Polymer Science, Part A: Polymer Chemistry, 47(9), pp. 2373-2390 (2009).
Shi et al., "Ultra-fast RAFT polymerisation of poly(ethylene glycol) acrylate in aqueous media under mild visible light radiation at 25 degrees C," Chemical Communications 21(11), pp. 1368-1370 (2009).
Zhang et al., "Synthesis and characterization of core-shell-type polymeric micelles from diblock copolymers via reversible addition-fragmentation chain transfer," Journal of Polymer Science, Part A: Polymer Chemistry, 44(10), pp. 3312-3320 (2006).

* cited by examiner

POLYMER SYNTHESIS

This disclosure relates to a method of preparing block copolymers and more particularly to a method of preparing colloidally stable particles comprising such polymers. The polymer particles can be formed in a variety of different morphological forms, including spherical nano-sized latexes (nanolatexes), rod or "worm-like" particles and/or vesicles (also known as 'polymersomes'). The method of the disclosure uses a RAFT type dispersion polymerisation process under aqueous conditions and is advantageous in providing particles, in particular vesicle or nanolatex particles, of low polydispersity. The method of the disclosure employs in particular a macromonomer chain transfer agent ("Macro-CTA") and, typically, a vinyl monomer in the RAFT synthesis. The present disclosure relates generally to the RAFT synthesis of sterically-stabilized nanolatexes, typically of about 10 nm to about 150 nm, in particular about 20 nm to 110 nm diameter, and to the RAFT synthesis of sterically-stabilized vesicles, typically of up to about 1500 nm diameter, in each case via aqueous dispersion polymerisation. The present disclosure also relates generally to the RAFT synthesis of particles with a rod, fibre or "worm-like" morphology, which typically have a width of 20 nm to 110 nm and range in length from 100 nm to several microns (for example, up to 10 microns).

BACKGROUND

Emulsion polymerisation is widely used for waterborne polymer latex coatings[1]. Reducing the latex particle size in such coatings is known to promote coalescence and hence enhance film formation. However, achieving smaller latex particle sizes by emulsion polymerisation usually requires additional surfactant, which can compromise the quality of waterborne coatings. For example, poor adhesion and reduced film quality can result because of migration of excess surfactant[2]. In principle, reactive surfactants offer a potentially decisive advantage over conventional surfactants in emulsion polymerisation because the former become irreversibly bound to the latex and hence cannot migrate during film formation; this allows defect-free coatings to be produced with reduced moisture sensitivity[3].

Over the last two decades, controlled/living radical polymerisation techniques such as nitroxide-mediated polymerisation[4], atom transfer radical polymerisation (ATRP)[5] and reversible addition-fragmentation chain transfer (RAFT) polymerisation[6-8] have become powerful tools for synthetic polymer chemists. There are many examples of latex syntheses based on these approaches[9]. For example, nitroxide-mediated living radical polymerisation has been used by Charleux[10-15], El-Aasser[16], Okubo[17] and Georges[18] to mediate the mini-emulsion polymerisation of n-butyl acrylate and styrene. ATRP has been optimised by Matyjaszewski[19-22] and Okubo[23-25] for the mini-emulsion polymerisation of (meth)acrylic and styrene monomers. RAFT polymerisation has been extensively exploited in the context of both emulsion and mini-emulsion polymerisation by Hawkett[26-29], Charleux[30-33], El-Aasser[34], Cunningham[35] and Zhu[36]. There are also a number of RAFT syntheses conducted under non-aqueous dispersion polymerisation conditions[37-39].

However, the inventors believe that there are only two literature examples of the application of controlled/living radical polymerisation techniques for latex syntheses by aqueous dispersion polymerisation[40,41]. In each case, a relatively expensive speciality monomer was utilised for the latex core, namely N-isopropylacrylamide[40] and N,N'-diethyl acrylamide[41]. This lack of research is perhaps surprising, because aqueous dispersion polymerisation formulations are conceptually much more straightforward than aqueous emulsion polymerisation since the initial reaction solution is homogeneous in the former case.

Recently, the inventors have reported the use of conventional (non-living) free radical chemistry for the aqueous dispersion polymerisation of a commodity methacrylic monomer, 2-hydroxypropyl methacrylate (HPMA)[42]. The resulting PHPMA latexes were stabilised by poly(N-vinylpyrrolidone) and the mean particle diameter could be varied from approximately 100 to 1000 nm diameter, with good control over the particle size distribution in most cases.

BRIEF SUMMARY OF THE DISCLOSURE

According to a first aspect of the present disclosure there is provided a method of preparing a block copolymer of Formula B

Formula B wherein $P_1$ represents a polymeric component derived from a monomer $M_1$ and $P_2$ represents a substantially aqueously insoluble polymeric component derived from an aqueously soluble monomer $M_2$,
the method comprising admixing
(a) an aqueously soluble polymer including moieties of Formula A

Formula A where X represents a terminal group of $P_1$, at least some of the groups X being a chain transfer agent (CTA) terminal group,
with
(b) monomer $M_2$
and initiating an aqueous dispersion-type radical addition fragmentation chain transfer (RAFT) polymerisation, to provide the block copolymer of Formula B,
wherein monomer $M_1$ is selected from monomers of the Formulae $M_{1A}$ and $M_{1B}$:

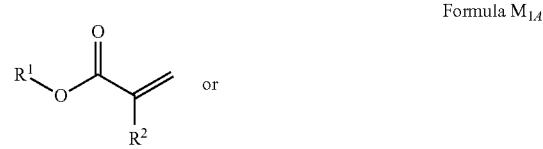

Formula $M_{1A}$

Formula $M_{1B}$ where $R^1$ represents a substituent of $M_{1A}$ which allows $P_1$ to be at least partially aqueously soluble,
$R^2$ represents H, $CH_3$ or CN,
$R^S$ represents one or more substituents of the aromatic ring effective to allow $P_1$ to be least partially aqueously soluble,
and
monomer $M_2$ is selected from monomers of Formulae $M_{2A}$ and $M_{2B}$:

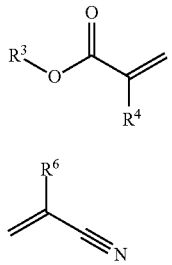

Formula $M_{2A}$

Formula $M_{2B}$ where $R^3$ is a substituent of $M_2$ which allows $P_2$ to be substantially aqueously insoluble,
and $R^4$ and $R^6$ independently represent H or methyl.

In a further aspect, the present invention provides a method of preparing colloidally stable polymeric particles comprising a block copolymer of Formula B:

[P₁┼┼P₂]

Formula B wherein $P_1$ represents an aqueously soluble polymeric component derived from a monomer $M_1$ and $P_2$ represents a substantially aqueously insoluble polymeric component derived from an aqueously soluble monomer $M_2$,
the method comprising forming a block copolymer of Formula B in an aqueous based medium by admixing:
(a) an aqueously soluble polymer including moieties of Formula A

[P₁┼┼X]

Formula A where X represents a terminal group of $P_1$, at least some of the groups X being a chain transfer agent (CTA) terminal group,
with
(b) monomer $M_2$
and initiating an aqueous dispersion-type radical addition fragmentation chain transfer (RAFT) polymerisation, to provide the block copolymer of Formula B,
wherein each monomer $M_1$ is selected from a monomer of the Formula $M_{1A}$, $M_{1B}$ and/or $M_{1C}$:

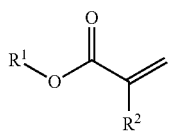

Formula $M_{1A}$

Formula $M_{1B}$

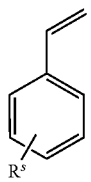

Formula $M_{1C}$

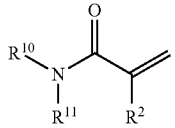

where $R^1$, $R^{10}$ and $R^{11}$ represents a substituent of $M_{1A}$ or $M_{1C}$ which allows $P_1$ to be at least partially aqueously soluble,
$R^2$ represents H, $CH_3$ or ON,
$R^S$ represents one or more substituents of the aromatic ring effective to allow $P_1$ to be least partially aqueously soluble,
and
each monomer $M_2$ is selected from a monomer of the Formulae $M_{2A}$ and/or $M_{2B}$:

Formula $M_{2A}$

Formula $M_{2B}$

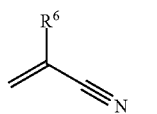

where $R^3$ is a substituent of $M_2$ which allows $P_2$ to be substantially aqueously insoluble, and $R^4$ and $R^6$ independently represent H or methyl;
or $P_1$ is a copolymer comprising a monomer $M_1$ with a monomer $M_2$ provided that the polymer $P_1$ remains aqueously soluble.

In an embodiment of the invention, $P_1$ is a copolymer, which comprises two or more monomers $M_1$ of the Formulae $M_{1A}$, $M_{1B}$ and $M_{1C}$ defined above.

In an alternative embodiment, $P_1$ is a homopolymer comprising a single monomer $M_1$ selected from the monomers of Formulae $M_{1A}$, $M_{1B}$ and $M_{1C}$ defined above.

In an embodiment, $P_1$ is a homopolymer or copolymer comprising monomers of formulae $M_{1A}$ or $M_{1B}$.

In an embodiment, $P_1$ is a homopolymer or copolymer comprising monomers of formulae $M_{1A}$.

In an embodiment, $P_1$ is a copolymer comprising a monomer $M_1$ with a monomer $M_{2A}$ provided that the polymer $P_1$ remains aqueously soluble.

In a further embodiment of the invention, $P_2$ is a copolymer, wherein monomer $M_2$ is selected from two or more monomers of the Formulae $M_{2A}$ and $M_{2B}$ defined above.

In an alternative embodiment, $P_2$ is a homopolymer comprising a single monomer $M_2$ selected from the monomers of Formulae $M_{2A}$ and $M_{2B}$.

Suitably, $P_2$ is a polymer or copolymer comprising monomers $M_2$ selected from the monomers of Formulae $M_{2A}$.

Thus, in a particular embodiment, $P_2$ is a polymer or copolymer comprising monomers of formula $M_{2,4}$.

In certain embodiments, $P_2$ may additionally comprise a cross-linking monomeric unit (such as, for example, EGDMA), whether $P_2$ is a copolymer or a homopolymer. In other embodiments, $P_2$ does not comprise any cross-linking monomeric units.

In a preferred embodiment of the invention, both of $P_1$ and $P_2$ are homopolymers as defined above.

The term "aqueous-based medium" is used herein to mean a medium comprising water as the principal solvent. In some embodiments, the aqueous-based medium may comprise one or more co-solvents in addition to the water. Any co-solvent that is present in the aqueous-based medium is suitably a water miscible solvent. In some embodiments, the aqueous-based medium comprises less than 10% v/v of co-solvent. Suitably, the aqueous-based medium comprises less than 5% v/v of co-solvent. In most cases, the aqueous-based medium will comprise at least 50% water and preferably at least 70% water, and more preferably at least 90% water. In a particular embodiment, the aqueous-based medium is pure water or water comprising a dissolved electrolyte.

Preferably $R^1$ is sufficiently hydrophilic to render $P_1$ at least partially aqueously soluble. Accordingly, $R^1$ is suitably selected from a polar substituent group which renders the monomeric units $M_1$, and the polymeric component $P_1$ formed therefrom, water soluble. Any suitably hydrophilic $R^1$ substituent group may be used.

In an embodiment, $R^1$ is selected from:

hydrogen;

a $C_{1-8}$ alkyl chain, optionally interrupted by one or more hetero atoms (such as O or N or S or P), and optionally having one or more substituents selected from: OH; =O; $N(R^{a1})(R^{a2})$; $N^+(R^{b1})(R^{b2})(R^{b3})$ and $SO_3^-$, wherein $R^{a1}$, $R^{a2}$, $R^{b1}$, $R^{b2}$ and $R^{b3}$ are independently selected from H, $C_{1-6}$ alkyl;

an oligomer moiety effective to render $P_1$ at least partially aqueously soluble;

and a moiety of the general formula:

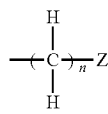

where n is 1, 2 or 3, Z represents a five or six membered heterocycle having one, two or three heteroatoms selected from O and N.

In some preferred embodiments $R^1$ is selected from:

hydrogen;

a $C_1$, $C_2$, $C_3$, $C_4$, $C_5$ or $C_6$ alkyl chain, optionally interrupted by one or more hetero atoms (such as O or N or S or P), and having one or more substituents selected from: OH; =O; $N(R^{a1})(R^{a2})$; $N^+(R^{b1})(R^{b2})(R^{b3})$ and $SO_3^-$ where $R^{a1}$, $R^{a2}$, $R^{b1}$, $R^{b2}$ and $R^{b3}$ are independently selected from H, $C_1$, $C_2$, $C_3$ and $C_4$ alkyl;

an oligomer moiety effective to render $P_1$ at least partially aqueously soluble;

and a moiety of the general formula:

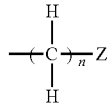

where n is 1, 2 or 3, Z represents a five or six membered heterocycle having one, two or three heteroatoms selected from O and N. In preferred variations, Z represents an N-morpholino group. Preferably n is 2.

When $R^1$ is an alkyl chain interrupted by one or more heteroatoms, the heteroatom is suitably O or N, and most suitably O.

In variations of the above embodiment the oligomer moiety is an oligo-ether, in particular an oligo(ethylene glycol) preferably with a degree of polymerisation of about 6 or more. When $R^1$ is an oligoether, it suitably has a terminal group selected from hydroxyl, methoxy or ethoxy.

Preferably $R^S$ represents one or more hydrophilic substituents on the aromatic ring effective to render $P_1$ least partially aqueously soluble. Any suitably hydrophilic group could be used.

In an embodiment, $R^S$ is selected from hydroxyl, halo, nitro, cyano, carboxy, amino, amido, $haloC_{1-4}alkyl$ (e.g. $CF_3$), $hydroxyC_{1-4}alkyl$, or $SO_3^-$.

Preferably $R^3$ is insufficiently hydrophilic, or is sufficiently hydrophobic, to render $P_2$ substantially aqueously insoluble.

In further preferred embodiments $R^3$ is selected from the group comprising: a $C_1$, $C_2$ or $C_3$ alkyl group optionally having one or more substituent hydroxyl groups; and an oligomer moiety effective to render $P_2$ substantially aqueously insoluble.

Preferably in the above embodiments where $R^3$ is an oligomer moiety, said moiety is an oligoether, in particular an oligo(ethylene glycol), preferably with a degree of polymerisation of less than 6, in particular less than 4 and especially about 2 or 3. When $R^3$ is an oligoether, it suitably has a terminal group selected from hydroxyl, methoxy or ethoxy.

In an embodiment, $R^{10}$ and $R^{11}$ are selected from hydrogen or (1-2C)alkyl. In a particular embodiment, $R^{10}$ and $R^{11}$ are hydrogen or methyl, especially methyl.

In some preferred embodiments the method further includes a preliminary step of forming the aqueously soluble polymer of Formula A by the RAFT polymerisation of the monomer $M_1$.

In some embodiments the aqueously soluble polymer of formula A is a non-ionic polymer.

In some embodiments the aqueously soluble polymer of formula A is an anionic polymer.

In some embodiments the aqueously soluble polymer of formula A is a cationic polymer In some embodiments the aqueously soluble polymer of formula A is a zwitterionic polymer.

In some embodiments, particles with varying surface charge can be prepared by altering the charge density in the polymer of formula A. This can be achieved by the appropriate selection of the monomer units $M_1$. For example, the polymer $P_1$ may be a homopolymer composed of charged monomeric units $M_1$ that provide a high charge density. The charge density of the polymer $P_1$ and hence the surface charge (or zeta potential) of the resultant particles may also be reduced by forming $P_1$ as a copolymer of charged monomers $M_1$ with non-charged monomers $M_1$. The zeta potential of the final particle may also be adjusted by judiciously mixing cationic and anionic monomers $M_1$ when making copolymer $P_1$.

In some preferred embodiments the monomer $M_1$ is selected from monomers of the formulae:

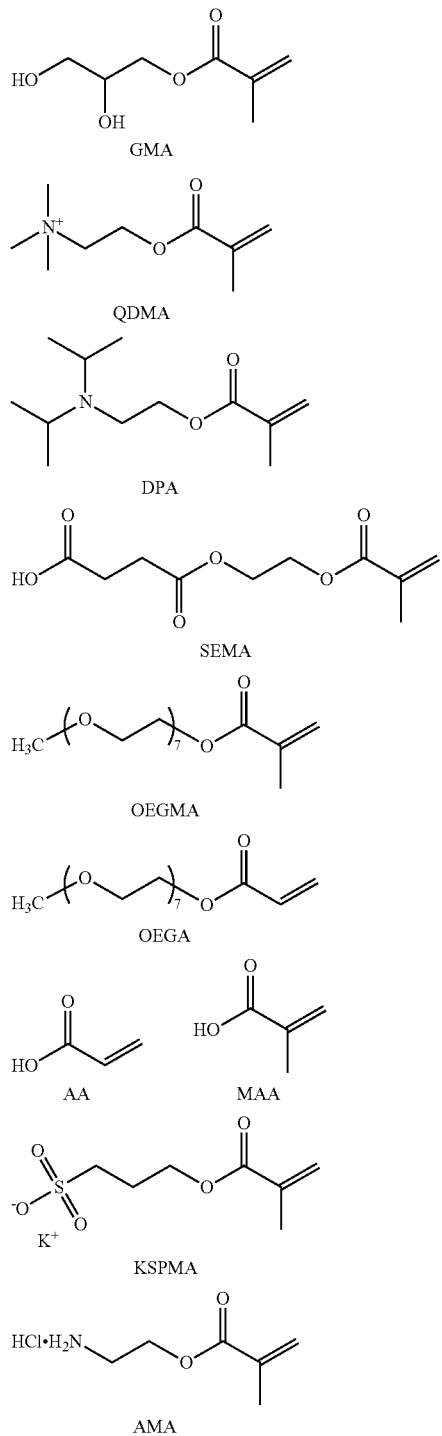

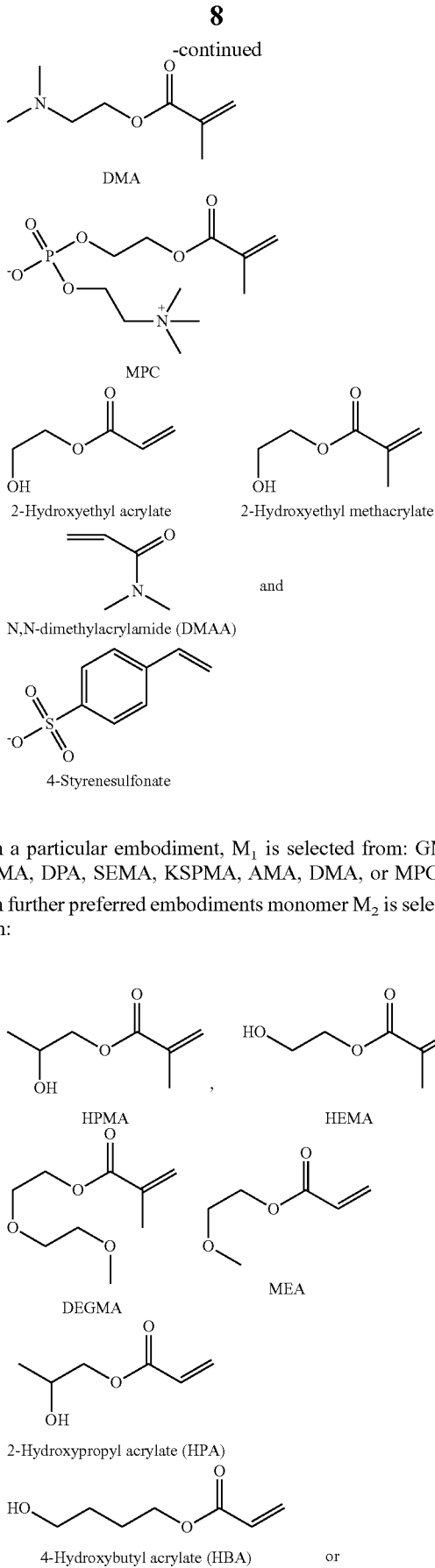

In a particular embodiment, $M_1$ is selected from: GMA, QDMA, DPA, SEMA, KSPMA, AMA, DMA, or MPC.

In further preferred embodiments monomer $M_2$ is selected from:

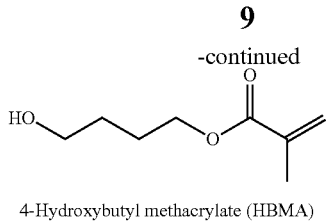

4-Hydroxybutyl methacrylate (HBMA)

In a particular embodiment, $M_2$ is selected from HPMA or HEMA.

In a further embodiment, $M_2$ is a copolymer of HEMA or HPMA with HBMA. In a further embodiment, $M_2$ is a copolymer of HEMA with HPMA.

As mentioned above, monomers $M_1$ and $M_2$ may be selected for $P_1$ and $P_2$ so that either or both of $P_1$ and $P_2$ are copolymers or homopolymers.

In a particular embodiment, the polymeric component $P_1$ is a homopolymer, wherein $M_1$ has any of the meanings as defined hereinbefore, and the polymeric component $P_2$ is a homopolymer, wherein $M_2$ is HPMA or HEMA.

Particularly suitable block copolymers according to Formula B $[P_1-P_2]$ include any one of the following:
1. PGMA-PHPMA. The PGMA block may suitably have a degree of polymerisation (DP) of 30-80, and suitably 40-150. The PHPMA block may suitably have a DP of 10-1000, and suitably 50-500.
2. PQDMA-PHPMA. The PQDMA block may suitably have a DP of 40-80, and suitably 60-70. The PHPMA block may suitably have a DP of 20-400, and suitably 150-250.
3. PDPA-PHPMA. The PDPA block may suitably have a DP of 40-80, and suitably 50-70. The PHPMA block may suitably have a DP of 10-400, and suitably 50-150.
4. PSEMA-PHPMA. The PSEMA block may suitably have a DP of 40-100, and suitably 60-80. The PHPMA block may suitably have a DP of 10-400, and suitably 150-250.
5. PKPSMA-PHPMA. The PKPSMA block may suitably have a DP of 50-80, and suitably 60-70. The PHPMA block may suitably have a DP of 10-400, and suitably 150-250.
6. PAMA-PHPMA. The PAMA block may suitably have a DP of 50-80, and suitably 60-70. The PHPMA block may suitably have a DP of 10-400, and suitably 50-150.
7. PDMA-PHPMA. The PDMA block may suitably have a DP of 50-80, and suitably 60-70. The PHPMA block may suitably have a DP of 10-400, and suitably 200-350.
8. PGMA-PHEMA. The PGMA block may suitably have a DP of 40-80, and suitably 50-70. The PHEMA block may suitably have a DP of 10-400, and suitably 50-150.
9. PMPC-PHPMA. The PMPC block may suitably have a DP of 10-60, and suitably 20-55, and suitably 20-30. The PHPMA block may suitably have a DP of 10-450, and suitably 100-400.
10. PGMA-(PHPMA/EGDMA), where EGDMA is a cross linker for the PHPMA chains. The PGMA block may suitably have a DP of 30-80, and suitably 50-70. The PHPMA block may suitably have a DP of 10-400, suitably 150-250. The EGDMA cross-linker may suitably have a DP of 1-8, suitably 1-2.
11. PMPC-(PHPMA-EGDMA), where EGDMA is a cross linker to PHPMA. The PMPC block may suitably have a DP of 10-170, and suitably 40-60. The PHPMA block may suitably have a DP of 10-450, suitably 100-400. The EGDMA cross-linker may suitably have a DP of 1-8, suitably 1-6.
12. PGMA-P(HEMA-stat-PHBMA). The PGMA block may suitably have a DP of 10-500, suitably 30 to 100 and more suitably 40-60. The HEMA block may suitably have a DP of 10-450, suitably 50-400 and more suitably between 50 and 200. The HBMA block may suitably have a DP of 10-450, suitably 50-400 and more suitably between 50 and 200.
13. PDMAA-PMEA. The PDMAA block may suitably have a DP of 10-500, suitably 20 to 100 and more suitably 30-50. The PMEA block may suitably have a DP of 50-800, suitably 75-600 and more suitably between 75 and 500.

In an embodiment, the water solubility of $M_2$ is between 5 and 30% w/v, particularly between 10 and 30% w/v.

Preferably the water solubility of $M_2$ is at least 10% w/v, more especially the water solubility of $M_2$ is at least 20% w/v. In particularly preferred embodiments, $M_2$ is fully aqueously miscible.

A further preferred embodiment comprises the step of adding to the reaction medium a bifunctional or multifunctional cross-linking agent effective to cross-link with monomer $M_2$.

Preferably the bifunctional cross-linking agent is ethylene glycol dimethacrylate (EGDMA).

In some preferred embodiments the method is carried out in the absence of any co-solvent.

In some preferred embodiments the method is carried out as a "one-pot" synthesis—that is, all the reaction materials are added, at appropriate stages, to the same reaction vessel.

The mean particle size can be controlled by judiciously adjusting the synthesis parameters (such as, for example, the salt concentration, the target degree of polymerisation of $P_2$). For example, larger particles can be prepared by targeting longer $P_2$ chains which form the particle cores.

Thus, the methodology of the present invention enables particles of varying size, morphology and surface charge to be prepared.

Colloidally Stable Polymeric Particles

According to a further aspect of the invention there is provided a colloidally stable polymeric particle comprising a polymer of formula B as defined herein.

In a further aspect, the present invention provides a colloidally stable polymeric particle comprising a polymer of formula B as defined herein which is obtainable by any one of the methods defined herein.

In a further aspect, the present invention provides a colloidally stable polymeric particle comprising a polymer of formula B as defined herein which is obtained by any one of the methods defined herein.

In a further aspect, the present invention provides a colloidally stable polymeric particle comprising a polymer of formula B as defined herein which is directly obtained by any one of the methods defined herein.

Preferably the particles, in particular nanolatex particles, of the polymer of Formula B are formed by in situ micellar self-assembly.

In some preferred forms, the block copolymer of Formula B comprises particles of which component $P_2$ forms a substantially non-solvated core and component $P_1$ acts as a solvated steric stabilizer.

The colloidally stable polymeric particles of the present invention may exist in a number of different morphological forms or as a mixture of different morphological forms. In particular, the particles may be in a substantially spherical or non-spherical form. Particular particle morphologies include spheres, nanolatexes, fibres/worms/rods, lumpy rods, and vesicles.

In an embodiment, the colloidally stable polymeric particles are spheres.

In a particular embodiment, the colloidally stable polymeric particles are nanolatex particles.

Thus, according to another aspect of the disclosure, there is provided a colloidally stable sterically stabilised nanolatex formed by the methodology defined herein.

In some preferred forms, the particles are nanolatex particles having near-monodisperse substantially spherical morphologies.

The mean diameter of said particles may in some preferred methods be increased by increasing the degree of polymerisation of polymeric component $P_2$. Said mean diameter may be selectable over the range of from about 10 nm to about 1500 nm.

In preferred embodiments said particles are nanolatex particles having a mean diameter is selectable over the range of from about 20 nm to about 110 nm.

In other preferred embodiments said particles are in the form of vesicles having a mean diameter selectable over the range of from about 100 nm to about 1500 nm.

These spherical/nanolatex particles may be used for a variety of applications, including their use as coatings, lubricants, imaging agents, binding agents, delivery agents, as precursors for hollow nanoparticles in anti-reflective coatings.

According to another aspect of the disclosure there is provided a colloidally stable block copolymer vesicle formed by the method of any of the first aspect.

Such vesicles comprise a core that may utilised for the loading of particular agents, such as drugs, imaging agents, dyes, nutrients etc. Such vesicles may serve to protect the encapsulated agent and/or release the encapsulated agent when required.

In yet another embodiment, the colloidally stable polymeric particles are in a fibrous "rod" or "worm-like" morphology.

Thus, in another aspect, the present invention provides a colloidally stable polymeric particle comprising a polymer of formula B as defined herein, wherein said particle possesses a fibrous, rod or "worm-like" morphology.

Polymeric particles of the present invention having a fibrous, rod or "worm-like" morphology are described further herein in the accompanying examples. Such particles form viscous fluids and/or gels. Accordingly, such particles are potentially useful as viscosity modifiers or gelling agents for use in, for example, adhesives, wounds dressings, pharmaceutical formulations etc.

In a particular embodiment, the polymeric particles take the form of "lumpy rods", i.e. rod shaped particles with one or more protruding lumps present on its surface. Mixtures containing lumpy rods are envisaged to be suitable inter alia in biomedical applications in view of their biocompatibility and antibacterial properties.

In general it is envisaged that longer rods or "worm-like" particles (diameters of greater than 100 nm) will confer higher fluid viscosities and/or form stronger gels, while thinner fibres (<50 nm) will lead to more transparent gels or fluids, which may be preferred for some applications (e.g. wounds dressings). The mean fibre length can be adjusted by fine-tuning the block copolymer molecular curvature (i.e. the stabiliser/core-forming block ratio) while the mean fibre width is directly related to the mean degree of polymerisation of the core-forming block.

The polymeric particles of the present invention may be also present as a mixture of different morphological forms. Such a mixture may comprise spherical or non-spherical particles or a mixture thereof. In a particular embodiment, the mixture comprises more than one particle variety, for example spheres and worms, or worms and vesicles.

Such mixtures may also have applications, for instance, in pharmaceutical compositions, where vesicles may serve as a drug delivery vehicle whilst worms serve as viscosity modifiers.

In a particular embodiment, the polymeric particles possess a single morphological form.

The skilled person would readily understand how to assess the morphology of the polymer particle, and the imaging techniques (e.g. SEM or TEM) described in the examples allow the skilled person to clearly define the particles.

Thus the present disclosure seeks to provide a method of preparing a block copolymer which, in particular forms, takes the form of latex (especially nanolatex), rods/fibres/worms or vesicle particles. The method of the disclosure can be carried out in wholly aqueous conditions using inexpensive and readily available starting materials. A co-solvent may in some cases be used but preferred methods according to the disclosure use no co-solvent. The methods of the disclosure can further avoid any need to use a surfactant.

Desirably small latex particle sizes are achievable by the methods of the present disclosure without the presence of any surfactant in the reaction medium. The methods of the present disclosure employ RAFT polymerisation techniques. The particles obtained by the methods of the present disclosure typically have relatively low size polydispersity and in at least some cases the particles are near-monodisperse in terms of mean particle diameter. The latex particles resulting from the methods of the present disclosure can be broadly defined as having a core-shell morphology in which an inner core of non- or (in some cases) partially-solvated polymer comprising one block of the block copolymer is surrounded by a shell of solvated sterically stabilising polymer comprising another block of the block copolymer. These particles may be nano-sized latex particles (nanolatexes).

The methods of the present disclosure may also result in particles in the form of vesicles which tend to be larger than the block copolymer latex particles. The production of latex particles or vesicles depends, for example, on the selected starting materials, the targeted block lengths and the precise formulation (for example, the reagent concentrations). Unlike the latex particles, the vesicle particles comprise an aqueous core surrounded by a hydrophobic membrane. Expressed either side of this membrane are the hydrophilic stabilising chains.

Compositions Comprising the Polymeric Particles

According to a further aspect of the disclosure there is provided a composition comprising the colloidally stable polymeric particles as hereinbefore defined.

Such a composition may suitably comprise one or more additional excipients. Such a composition may suitably be a biomedical composition, a wound dressing, a pharmaceutical composition, a gel, a lubricant, a viscosity modifier, as organic precursors for hollow nanoparticles for use in an anti-reflective glass coating, or a personal care composition.

Where the composition is a pharmaceutical composition, the particulate mixture suitably comprises vesicles, for instance, which have trapped therein a pharmaceutical active, or pharmaceutically acceptable salt thereof.

According to a sixth aspect of the disclosure there is provided a use of the colloidally stable polymeric particles as hereinbefore described for the particular applications mentioned herein.

In the present specification polymers or polymeric components are identified using the following notation:—

$$ABCD_{xx}\text{-}EFGH_{yy}$$

where ABCD and EFGH are abbreviations identifying the polymer or polymeric component and xx and yy respectively indicate a degree of polymerisation (DP). Thus, for example, $PGMA_{65}$-$PHPMA_{300}$ indicates a copolymer comprising poly(glycerol monomethacrylate) with a DP of 65 and poly(2-hydroxypropyl methacrylate) with a DP of 300.

BRIEF DESCRIPTION OF THE DRAWINGS

Embodiments of the invention are further described hereinafter with reference to the accompanying drawings, in which.

The present disclosure relates generally to the RAFT synthesis of sterically-stabilised nanolatexes, typically of about 10 nm to about 150 nm in diameter and especially about 20 to about 110 nm diameter, via aqueous dispersion polymerisation. The present disclosure further relates generally to the RAFT synthesis of sterically-stabilised particles in the form of, or resembling, vesicles, typically of from about 400 nm to about 1500 nm in diameter.

Figure 9:
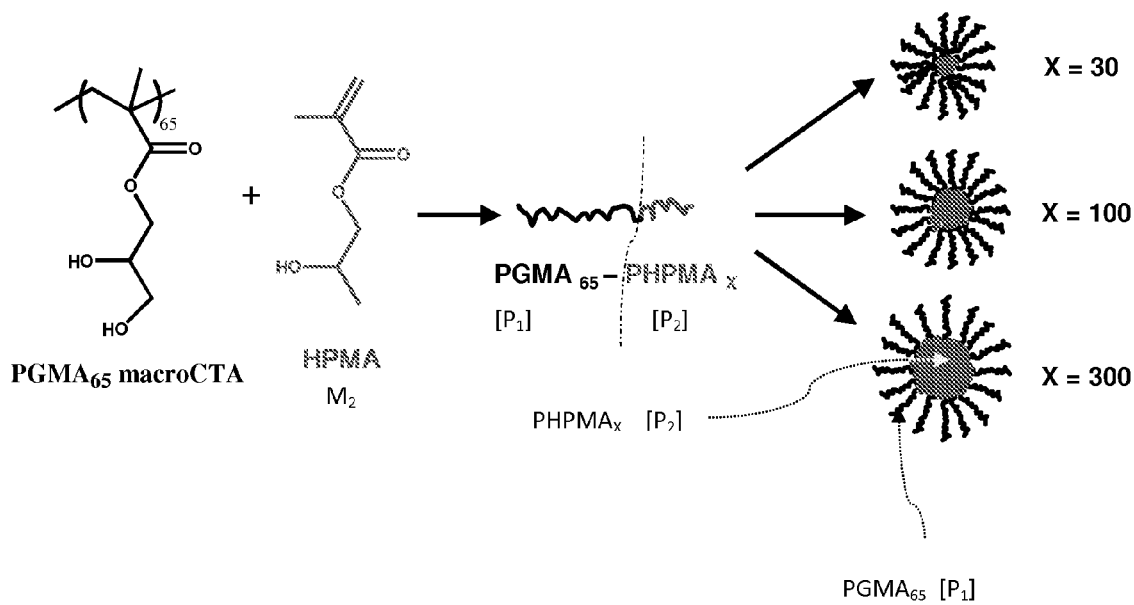
FIG. 9 shows a schematic reaction scheme for RAFT synthesis of sterically-stabilised latexes by aqueous dispersion polymerisation.

Referring initially to FIG. 9, in the process of the present disclosure for preparing latex particles, a suitable polymeric chain transfer agent is reacted under RAFT conditions with a water-miscible monomer to form a block copolymer. The example illustrated in FIG. 9 is typical of the process according to the present disclosure. However, the scope of the present disclosure is not confined to the particular materials identified in FIG. 9. In this example, the polymeric chain transfer agent (macroCTA) ($[P_1]$-$[X]$) is a poly(glycerol monomethacrylate) (PGMA) obtained by the RAFT polymerisation of glycerol monomethacrylate. The PGMA macroCTA is reacted under RAFT conditions with 2-hydroxypropyl methacrylate (HPMA)(monomer $M_2$) to obtain the desired PGMA-PHPMA block copolymer. In FIG. 9, the dot-dashed line indicates schematically the boundary between the PGMA ($[P_1]$) and PHPMA ($[P_2]$) polymer blocks.

The reaction is carried out in aqueous solution. An important requirement of the process of the present disclosure is that both the macroCTA ($[P_1]$-$[X]$) and the monomer ($M_2$) are sufficiently soluble in the aqueous reaction medium. However, in the resulting diblock copolymer $[P_1][P_2]$, the portions $[P_2]$ of the copolymer derived from the monomer ($M_2$) (as distinct from those ($[P_1]$) derived from the macroCTA ($[P_1]$-$[X]$)), are insoluble in aqueous medium. In the example illustrated in FIG. 9, the PGMA macroCTA and the HPMA monomer are sufficiently soluble in water to allow the reaction to proceed in solution, but the PHPMA chains of the resulting diblock copolymer are insoluble. Thus the diblock copolymer forms particles in situ (in the illustrated case, latex nanoparticles) which have the form shown schematically at the right-hand side of FIG. 9. Specifically in this example, a non-solvated PHPMA core is surrounded by a solvated PGMA shell, with the PGMA acting as a steric stabiliser for the latex. The sterically stabilised core-shell morphology is typical of the latex particles produced by the process of the present disclosure. As indicated in FIG. 9, increasing the chain length of the PHPMA component of the PGMA-PHPMA diblock copolymer results in an increase in particle size and, depending on the other conditions, possibly a change in the particle morphology (from spheres to rods/fibres to vesicles). Where vesicles are formed, the structure of the particle is different, as shown schematically in FIG. 10.

The process of the present disclosure is not limited to the reactants and polymer products indicated in FIG. 9 and a range of other materials may be used, as highlighted in the Examples of the present disclosure. For example, several water-soluble polymers can suitably be used as chain transfer agents, including non-ionic poly(glycerol monomethacrylate), anionic poly(potassium 3-sulfopropyl methacrylate) and cationic poly(2-(methacryloyloxy)ethyl trimethylammonium chloride). Zwitterionic polymers may also be used. Thus, only in some of the preferred syntheses is a poly(glycerol monomethacrylate)-based chain transfer agent (CTA) used as the reactive steric stabilizer, notably for the polymerisation of HPMA. In this case both the latex cores and the steric stabiliser chains of the resulting latexes are highly hydroxylated. As suggested above, the inventors have found that varying the length of the targeted PHPMA chains allows the final size of the sterically-stabilised latex particles to be controlled quite precisely (see FIG. 9 and Table 1 illustrating nanoparticles produced by methods of the present disclosure).

Figure 10:
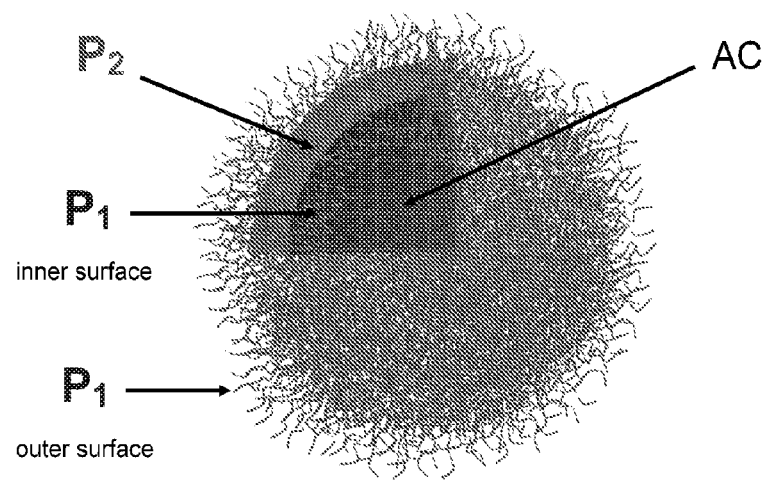
FIG. 10 shows schematically and partially in section the structure of a typical vesicle produced by the method of the present disclosure.

The structure of a typical vesicle is shown in FIG. 10. The molecules of the block copolymer forming the vesicle self-assemble to form a membrane. In the vesicle of FIG. 10 the membrane has a generally spherical inner surface and a generally spherical outer surface, so that the vesicle as a whole has a generally spherical shape. In reality, the inner and outer surfaces may depart in shape considerably from a true sphere. The inner and outer surfaces are defined by the substantially aqueously insoluble (hydrophobic) component ([$P_2$]) of the block copolymer. Steric stabilisation for the membrane is provided by the hydrophilic component ([$P_1$]) of the block copolymer on either side of the membrane. The core of the vesicle (AC) comprises the aqueous medium. Thus, the aqueous medium is encapsulated by the membrane.

The process of the present disclosure may further include, as a preliminary stage, the preparation of the polymeric chain transfer agent (macroCTA). In a typical example, 4-cyanopentanoic acid dithiobenzoate (CTP) is used as a chain transfer agent for the RAFT synthesis of a near-monodisperse PGMA homopolymer. Previously this chain transfer agent has been used to control the RAFT synthesis of both methacrylamide and methacrylate homopolymers[43, 44]. Many other chain transfer agents (CTA) for RAFT syntheses are known to those skilled in the art and examples are given in "The Chemistry of Radical Polymerisation" $2^{nd}$ Edn, by Moad and Solomon (Elsevier 2006) on pages 508 to 514, the contents of which are hereby incorporated by reference.

In the process of the present disclosure, a suitable co-solvent can be used to improve the solubility of the CTA in the macroCTA forming step. This may, for example, be desirable because a relatively large amount of CTA can be required to target lower molecular weight polymers. In one preferred embodiment 1,4-dioxan was used as a co-solvent to improve the CTP solubility for the GMA polymerisation. However, it is also possible to conduct the RAFT polymerisation in purely aqueous solution if the monomer concentration is increased, since the monomer itself can act as a co-solvent for the CTA under these conditions. For example, in the RAFT polymerisation of GMA using CTP as the CTA, increasing the monomer concentration to 50% allows the monomer to act as a co-solvent for the CTP.

Those skilled in the art will appreciate that an initiator is required for the RAFT polymerisations. Generally, radical initiators known to those skilled in the art are suitable, such as 4,4'-azobis(4-cyanopentanoic acid) or 2,2'-azobis(2-amidinopropane)dihydrochloride or ammonium persulfate or 2,2'-azobisisobutyronitrile. The molar ratio of CTA:initiator may be set at ratios that are typical for RAFT polymerisations. In particular examples according to the present disclosure the CTP: 4,4'-azobis(4-cyanopentanoic acid) molar ratio was fixed at 5:1, which is quite typical for RAFT polymerisations. A more general molar ratio range would be from 2:1 to 10:1. Well-defined, low polydispersity homopolymers, such as the methacrylic polymers exemplified herein, can be obtained under such conditions (see, for example, the first entry in Table 1).

The homopolymer obtained in the first stage RAFT synthesis (PGMA in the above example) is then used as a 'macroCTA' for the second-stage RAFT polymerisation to prepare the desired particles, under aqueous dispersion polymerisation conditions. No organic co-solvent is needed where both the macroCTA and the HPMA monomer are fully soluble in aqueous solution under the initial reaction conditions (according to its manufacturer, the solubility of HPMA monomer in aqueous solution is around 13% w/w at 25° C.). An organic co-solvent may be used to increase the solubility of the macroCTA and/or the monomer. However, in preferred processes according to the present disclosure, no such co-solvent is used.

An essential criterion for aqueous dispersion polymerisation in the second stage RAFT synthesis according to the process of the present disclosure is that the monomer is sufficiently soluble in the aqueous reaction medium to enable the reaction to proceed, but the component of the final polymer resulting from said monomer is insoluble in said aqueous reaction medium. The reaction scheme according to the process of the present invention can be expressed in the most general terms as

where: $P_1X$ represents the macroCTA, $P_1$ being the polymer moiety thereof and X representing a terminal group which functions as the chain transfer agent; $M_2$ is the second stage monomer; and $P_1P_2$ is the final block copolymer, of which $P_2$ is the polymeric component derived from $M_2$. The polymeric chain $P_2$ of the block copolymer is "grown" from the macroCTA $P_1X$. Thus in the above scheme, for the reaction to proceed as a dispersion polymerisation, monomer $M_2$ is required to be either fully soluble in the aqueous reaction medium under the reaction conditions or must be at least sufficiently soluble for the reaction to take place in solution. Excess monomer $M_2$ not initially in solution may be brought into solution as the monomer $M_2$ is consumed during the in situ polymerisation. Component $P_2$ of the final block copolymer $P_1P_2$ is, however, insoluble. Typically, the growing block copolymer is initially water-soluble since the $P_2$ block is still relatively short. However, as the $P_2$ block becomes longer, its hydrophobic character increases, which eventually drives in situ micellar self-assembly and ultimately a colloidally stable sterically-stabilised latex or vesicle is formed. The $P_1$ block acts as the solvated steric stabiliser, while the $P_2$ block forms the non-solvated core. In the case of vesicle formation, the $P_2$ block is located in the vesicle membrane, while the $P_1$ block is expressed at both the outer and inner surface of the membrane, In the specific case illustrated in FIG. 9, unlike their earlier synthesis of PHPMA latexes using conventional free radical polymerisation[42], the inventors have utilised RAFT chemistry so the resulting PHPMA latexes comprise $PGMA_{65}$-$PHPMA_x$ block copolymers, since the PHPMA chains are grown from the $PGMA_{65}$ macroCTA. As indicated in the preceding paragraph, initially the growing $PGMA_{65}$-$PHPMA_x$ block copolymer remains water-soluble since the PHPMA block is still relatively short. However, as the PHPMA block becomes longer, its hydrophobic character increases, which eventually drives in situ micellar self-assembly[45] and ultimately a colloidally stable sterically-stabilised PGMA-PHPMA latex is formed. Using the same $PGMA_{65}$ macroCTA, a systematic increase in the mean target degree of polymerisation (DP) of the PHPMA block from 30 to 300 leads to a monotonic increase in the mean latex diameter, from 26 to 105 nm as judged by DLS (see Table 1 and FIG. 9). As is clear from the preceding diameters, the latex formed in this case is a nanolatex.

Figure 4:
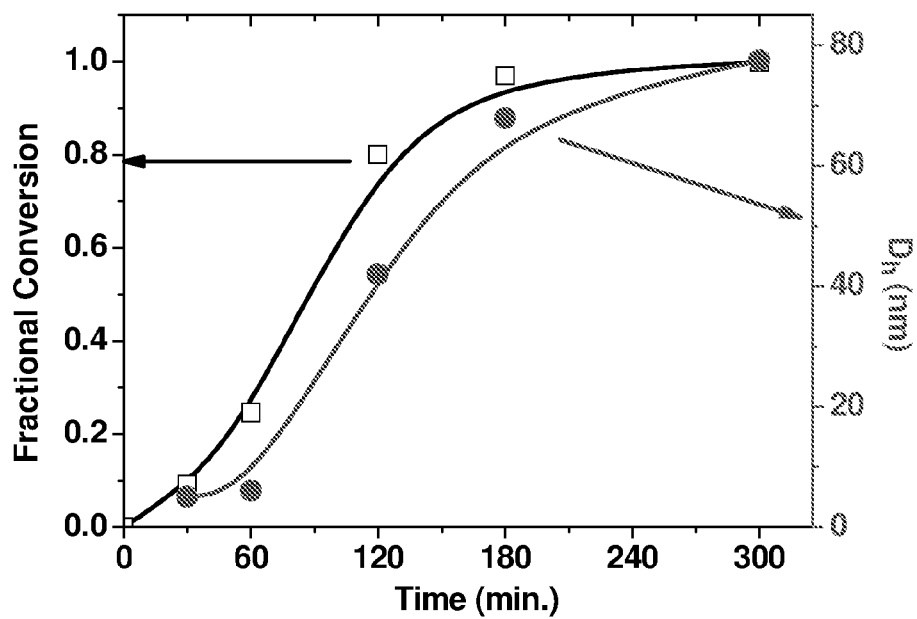
FIG. 4 shows kinetic study results for the 10% solids synthesis of $PGMA_{65}$-$PHPMA_{200}$ at 70° C. Conditions: $[HPMA]_o$=7.35 w/w %; $[PGMA_{65}]_o$=2.65 w/w %; $[4,4'$-azobis(4-cyanopentanoic acid)$]_o$=0.143 w/w %; water=5.088 mL.

Kinetic studies (see FIG. 4) confirm that the RAFT polymerisation of HPMA under aqueous dispersion conditions is relatively fast. For example, 80% conversion can be achieved within 2 h for a targeted block composition of $PGMA_{65}$-$PHPMA_{200}$ at 10% solids. After 5 h, this same formulation leads to almost complete (>99%) HPMA conversion and produces a final intensity-average latex diameter of around 78 nm.

Figure 5:
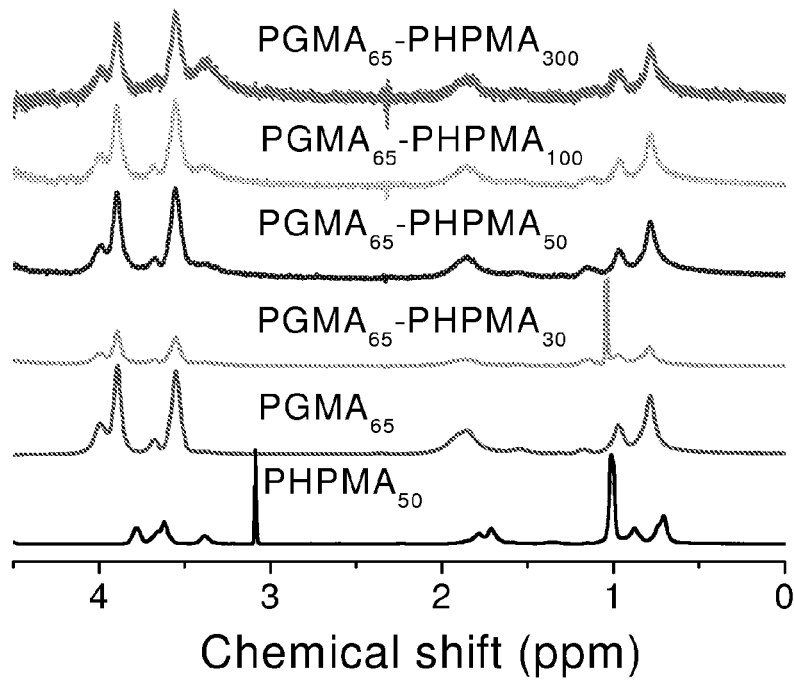
FIG. 5 shows $^1$H NMR spectra recorded for the $PHPMA_{50}$ homopolymer (in $d_4$-methanol), $PGMA_{65}$ homopolymer in $D_2O$ and four $PGMA_{65}$-$PHPMA_x$ latexes redispersed in $D_2O$. Only the PGMA signals are visible in the nanolatex samples, which indicates that these stabiliser chains are solvated, but the PHPMA cores are non-solvated.

$^1$H NMR spectra are shown in FIG. 5 for the PGMA$_{65}$ macroCTA dissolved in D$_2$O, a RAFT-synthesised PHPMA$_{50}$ homopolymer control in CD$_3$OD and four PGMA$_{65}$-PHPMA$_x$ latexes redispersed in D$_2$O. All the signals associated with the PGMA macroCTA are observed in each of the latex spectra. For the shortest PHPMA block (DP=30), there is evidence for at least partial core hydration, since there is a prominent signal at around 1 ppm due to the PHPMA chains. In contrast, no PHPMA signals are visible for longer block lengths (DP=50, 100 or 300; N.B. the signal at 3.2 ppm in the PHPMA homopolymer reference spectrum is due to methanol solvent). Thus these NMR observations are consistent with the PGMA$_{65}$ block acting as the solvated steric stabiliser, while the PHPMA block forms a partially-solvated (at the lowest DP) or a non-solvated latex core.

Figure 6:
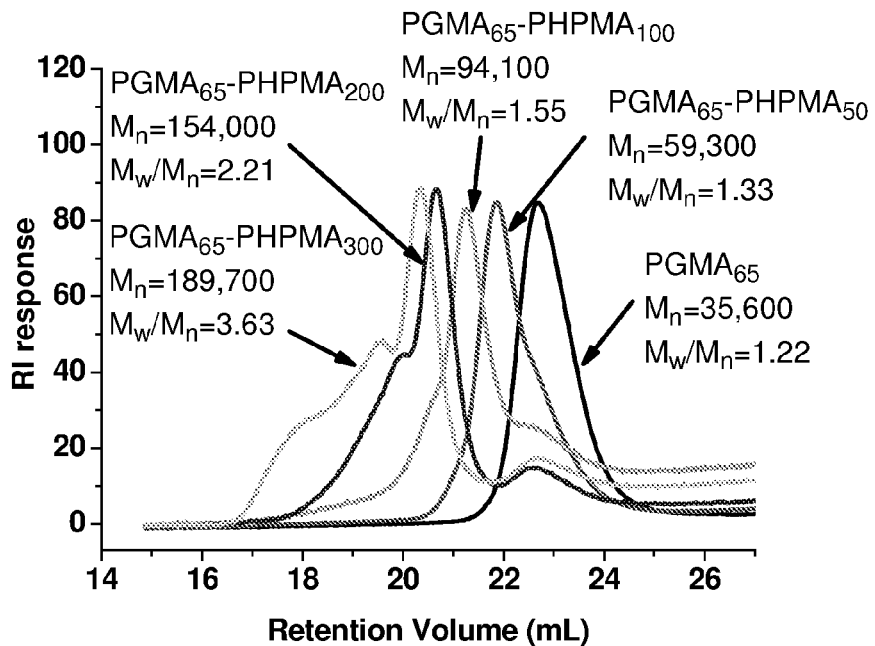
FIG. 6 shows DMF GPC traces (refractive index detector) obtained for $PGMA_{65}$ homopolymer and various $PGMA_{65}$-$PHPMA_x$ block copolymers synthesised via RAFT polymerisation under aqueous dispersion polymerisation conditions. The higher polydispersities observed for longer targeted PHPMA blocks are due to a dimethacrylate impurity in the HPMA monomer.

DMF GPC chromatograms obtained for the PGMA$_{65}$ macro-CTA and selected PGMA$_{65}$-PHPMA$_x$ latexes are shown in FIG. 6. The corresponding molecular weight data are summarised in Table 1. Compared to that of the PGMA$_{65}$ macro-CTA, the GPC traces obtained for the diblock copolymers are all shifted to higher molecular weight. Moreover, a high molecular weight shoulder gradually becomes more prominent as the target DP of the PHPMA block is increased. These results are consistent with the results of the inventors' solution polymerisation control experiments mentioned above. In addition, there is also some evidence for a relatively low level of contamination (<10%) of these PGMA-PHPMA latexes by the original PGMA macroCTA, suggesting that the macroCTA efficiency during the second-stage HPMA polymerisation is less than 100%. This is not unexpected given that RAFT chemistry has only pseudo-living (rather than genuinely living) character.

Although the PHPMA latex cores are cross-linked, this degree of cross-linking is still relatively low, as is apparent from the fact that the copolymer chains can be fully dissolved for GPC analysis, as indicated above. In a variation of the process according to the present disclosure, with a view to preventing such dissolution and to obtain more robust particles, a bifunctional or multifunctional cross-linker can be added to the reaction solution along with the M$_2$ monomer. One example of such a bifunctional cross-linker is ethylene glycol dimethacrylate (EGDMA). Empirically, the inventors have found that 1 mol % EGDMA is sufficient to fully cross-link the latex particles. Compared to a PGMA$_{65}$-PHPMA$_{100}$ latex prepared in the absence of any EGDMA (see entry 5 in Table 1), the mean diameter of the corresponding cross-linked latex (entry 8 in Table 1) increased from 58 to 86 nm. The latex polydispersity also increases slightly from 0.10 to 0.12 as judged by DLS.

Figure 1:
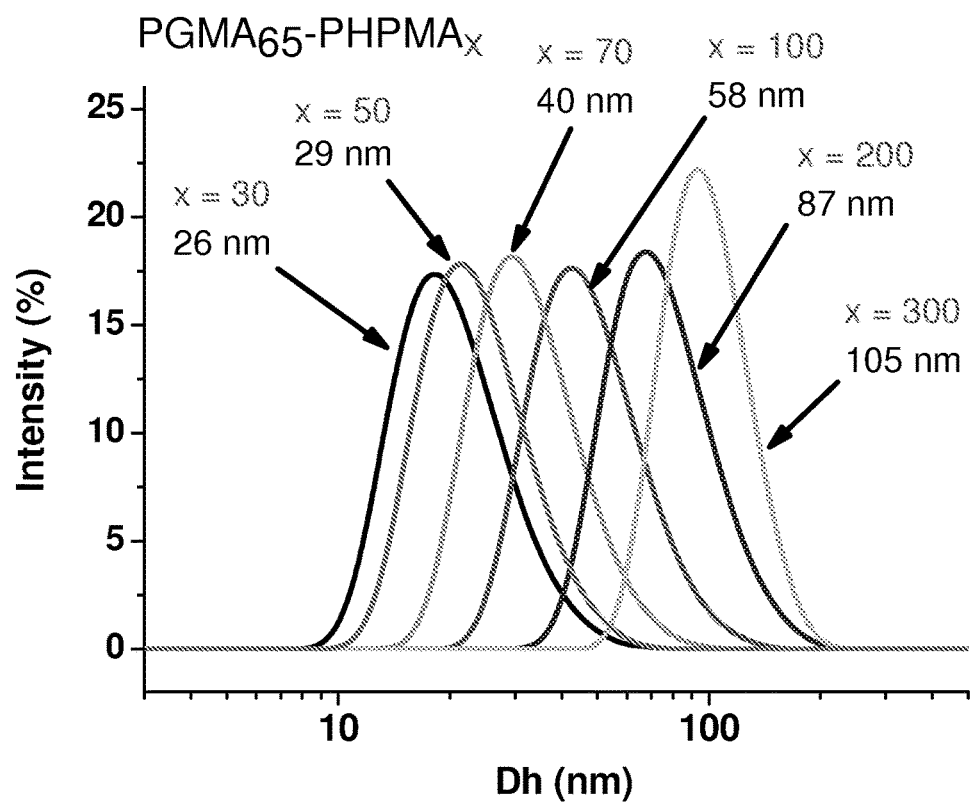
FIG. 1 shows dynamic light scattering particle size distributions obtained for a series of $PGMA_{65}$-$PHPMA_x$ nanolatexes.
Figure 2:
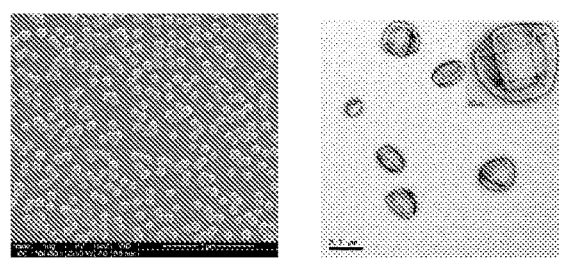
FIG. 2 shows electron microscopy images of (left image) $PGMA_{65}$-$PHPMA_{300}$ latex particles prepared at 10% solids by a two-stage synthesis (see entry 7 in Table 1); and (right image) $PGMA_{65}$-$PHPMA_{300}$ vesicles prepared at 20% solids by a one-pot synthesis (see entry 14 in Table 1)

Scanning electron microscopy allows good-quality images to be obtained for the larger examples of these nanolatexes, as illustrated in FIG. 2. Both the PGMA$_{65}$-PHPMA$_{300}$ and PGMA$_{65}$-PHPMA$_{200}$ latexes have near-monodisperse spherical morphologies, with mean number-average diameters of around 105 nm and 87 nm, respectively. Images obtained for related latexes prepared with shorter PHPMA blocks (not shown) are generally consistent with the DLS observations.

Figure 7:
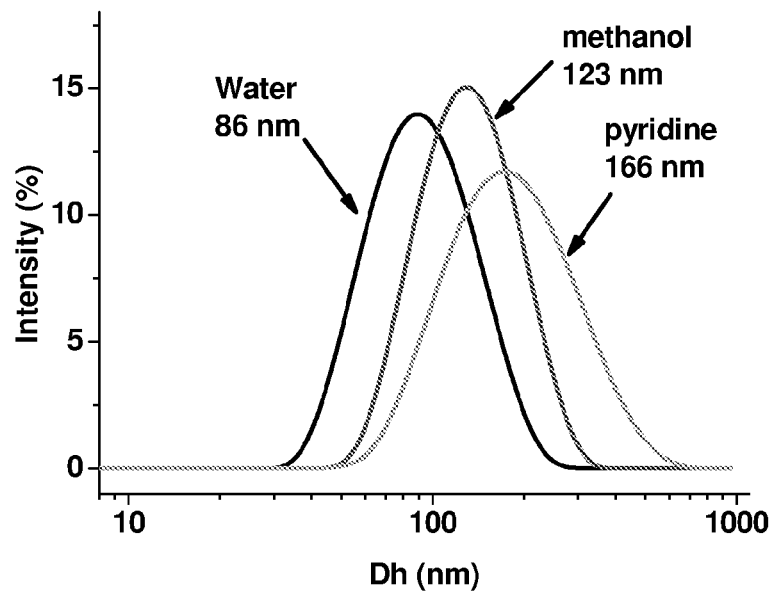
FIG. 7 shows dynamic light scattering particle size distributions obtained for a $PGMA_{65}$-$(PHPMA_{100}$-$EGDMA_1)$ latex dispersed in water, methanol and pyridine, respectively. Water is a poor solvent for the PHPMA latex core. On the other hand, methanol is a solvent and pyridine is a good solvent for PHPMA, which leads to the nanolatex becoming swollen and acquiring microgel character in these latter two solvents.
Figure 8:
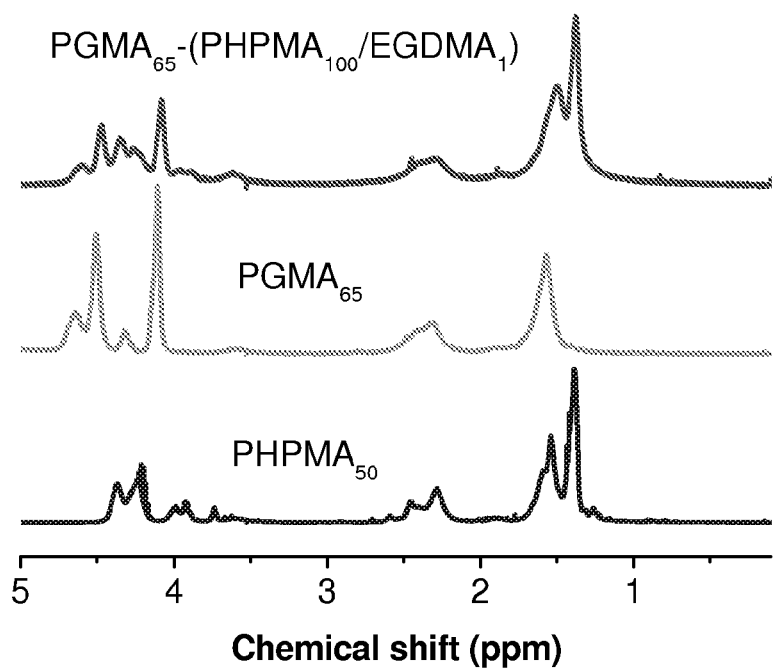
FIG. 8 shows $^1$H NMR spectra recorded in $d_5$-pyridine for a $PHPMA_{50}$ homopolymer, a $PGMA_{65}$ homopolymer and a cross-linked $PGMA_{65}$-$(PHPMA_{100}$-$EGDMA_1)$ latex. All PGMA and PHPMA signals are visible in $d_5$-pyridine, since this is a good solvent for both blocks.

Dynamic light scattering particle size distributions of cross-linked nanolatexes (e.g. PGMA$_{65}$-(PHPMA$_{100}$-EGDMA$_1$) dispersed in water, methanol and pyridine respectively are shown in FIG. 7. Both methanol and pyridine are good solvents for both PGMA and PHPMA homopolymers. Thus the cross-linked latex swells significantly in these latter two solvents. The intensity-average latex diameter increases from 86 nm in water to 123 nm in methanol to 166 nm in pyridine. $^1$H NMR spectra recorded in d$_5$-pyridine for PGMA$_{65}$ homopolymer, PHPMA$_{50}$ homopolymer and the PGMA$_{65}$-(PHPMA$_{100}$-EGDMA$_1$) latex are shown in FIG. 8. In addition to the expected PGMA signals, two PHPMA signals are also observed at δ 4.11 and δ 4.50, which suggests significant solvation of the PHPMA latex cores in this solvent. However, DLS studies confirm that this lightly cross-linked latex acquires microgel character in this solvent environment, rather than undergoing molecular dissolution.

Figure 3:
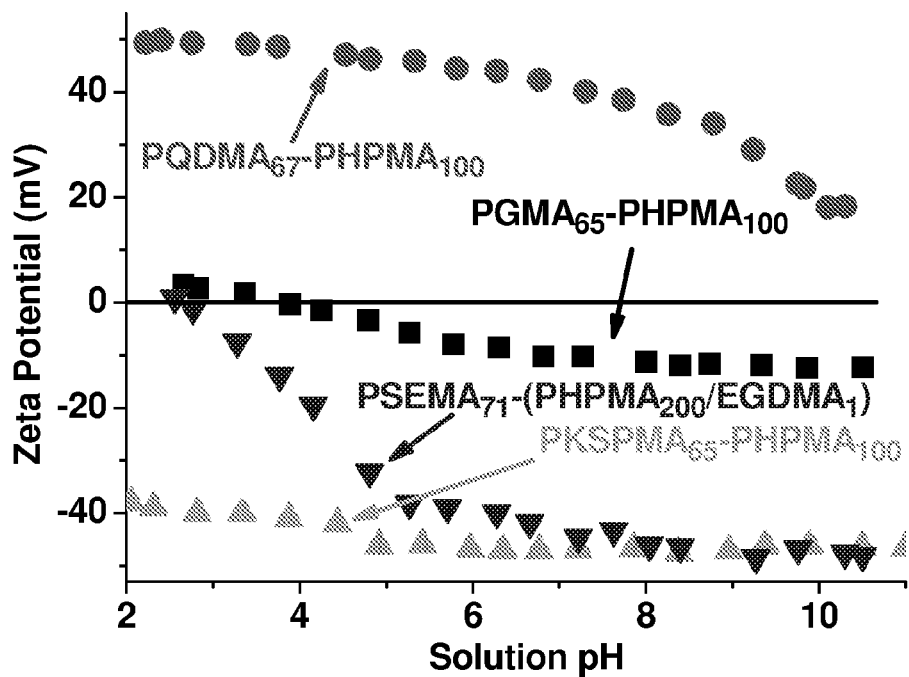
FIG. 3 shows zeta potential vs. pH curves obtained for $PGMA_{65}$-$PHPMA_{100}$, $PQDMA_{50}$-$PHPMA_{100}$, $PSEMA_{53}$-$PHPMA_{100}$ and $PKSPMA_{50}$-$PHPMA_{100}$ nanolatexes.

Selected nanolatexes having respectively non-ionic, anionic and cationic steric stabilisers were characterised by aqueous electrophoresis (see FIG. 3). As expected, in view of its non-ionic character, the PGMA steric stabiliser effectively shields any surface charge, leading to a relatively flat zeta potential vs. pH curve, with zeta potentials only varying from +4 mV to −12 mV. However, PHPMA particles can also be prepared using polyelectrolyte-based macroCTAs and, in contrast, these nanolatexes exhibited markedly different electrophoretic behaviour. Thus macroCTAs based on methyl chloride-quaternised poly(2-(dimethylamino)ethyl methacrylate) [PQDMA] and poly(potassium 3-sulfopropyl methacrylate) [PKSPMA] lead to strongly cationic and anionic particles respectively over a wide range of solution pH. On the other hand, using a poly(2-(methacryloyloxy) ethyl succinate) [PSEMA] macroCTA led to highly anionic zeta potentials above the pK$_a$ of the carboxylic acids (around pH 5), whereas much less anionic zeta potentials were observed below pH 5.

Freeze-thaw stability experiments were also conducted to examine the effectiveness of the steric stabilisation mechanism. A PGMA$_{65}$-PHPMA$_{300}$ latex of 105 nm diameter was frozen overnight at −20° C. and thawed at ambient temperature. DLS studies of the thawed aqueous dispersion indicated a mean particle diameter of 107 nm, which suggests that minimal aggregation had occurred. A similar DLS diameter was obtained for this latex in the presence of 1.0 M NaCl; thus the steric stabilisation conferred by the PGMA$_{65}$ chains provides an effective barrier towards electrolyte-induced coagulation, as expected.

Although the water solubility of HPMA monomer is only about 13% at room temperature, it is nevertheless possible to prepare PGMA-PHPMA particles at 20% solids with little or no coagulum (see Table 1, entry 9). In such a formulation, the PGMA macroCTA and azo initiator are fully dissolved at room temperature, but the HPMA monomer remains partially immiscible even on heating to 70° C. However, the reaction solution becomes transparent after about 30 minutes at 70° C. due to partial consumption of the HPMA monomer. It is also possible to conduct convenient, wholly aqueous, 'one-pot' syntheses of these PGMA-PHPMA particles. In this case, GMA is polymerized via aqueous RAFT polymerisation at 50 w/w %. Under these conditions, the monomer initially acts as a co-solvent to ensure complete dissolution of the CTP RAFT agent. The GMA conversion reaches 96% after 3 h at 70° C. After a small aliquot (~50 µL) was removed for $^1$H NMR and GPC analysis, an aqueous degassed solution of HPMA monomer was added to the reaction solution and the total comonomer conversion reached 99% after 24 h. The final sterically-stabilised PHPMA latex had an intensity-average diameter of around 39 nm and a polydispersity of 0.24, as judged by DLS.

In summary, the inventors have prepared a range of block copolymer sterically-stabilised spherical nanolatexes, rods/lumpy rods/fibres and vesicles via RAFT polymerisation of a water-soluble monomer such as 2-hydroxypropyl methacrylate under aqueous dispersion polymerisation conditions. Several water-soluble polymers can be used as chain transfer agents, including non-ionic poly(glycerol monomethacrylate), anionic poly(potassium 3-sulfopropyl methacrylate) and cationic poly(2-(methacryloyloxy)ethyl trimethylammonium chloride). The precise nature of the steric stabiliser profoundly influences the electrophoretic behaviour of these resulting particles. In at least the case of poly(glycerol monomethacrylate)-stabilised nanolatexes, electron microscopy and DLS studies confirm relatively narrow particle size distributions and the mean latex diameter can be conveniently controlled over the 10 nm to 150 nm, (and especially 20 nm to 105 nm) range simply by adjusting the target block composition. GPC analyses indicate that higher polydispersities may be obtained when targeting higher degrees of polymerisation for the core-forming block due to a dimethacrylate impurity in the 2-hydroxypropyl methacrylate monomer.

The inventors suggest that applications for the nanolatexes obtained by the process of the present disclosure are likely to be dictated by the functionality imparted by the steric stabiliser chains. For example, the well-known highly biocompatible nature of the poly(glycerol monomethacrylate) stabiliser suggests potential biomedical applications such as fluorescent staining of live cells, while ionic stabilisers may be useful for the preparation of colloidal nanocomposite particles. These nanolatexes may also be effective Pickering emulsifiers for the production and stabilisation of oil-in-water emulsions. The block copolymer vesicles (if formed from a biocompatible material such as PGMA, see entry 14 in the Table 1 shown overleaf and also example 5) may be useful for delivering dyes into living cells or for the delivery of genetic material (e.g. DNA, siRNA, proteins, antibodies, antigens) or small molecule drugs into cell nuclei.

Applications for the sterically stabilised particles may depend on the particulate form. For instance, it is envisaged that worm-like particles will be suitable as viscosity modifiers or as ingredients in biocompatible gels (e.g. for wounds dressings) and the like. Such viscosity modifying applications are supported by the viscosity observations set out in the Examples. Lumpy rods, on the other hand, are envisaged to have biomedical applications in view of their biocompatibility and anti-bacterial properties. Finally, certain spherical and non-spherical morphologies are envisaged to be ideal organic precursors for the preparation of hollow nanoparticles for anti-reflective glass coatings.

EXAMPLES

The following examples are further illustrative of the process according to the present disclosure. The intensity-average particle diameters and polydispersities for particles (nanolatexes and vesicles) resulting from examples of the invention are summarised in Table 1.

TABLE 1

Summary of intensity-average particle diameters and polydispersities obtained by dynamic light scattering for various $PGMA_{65}$-$PHPMA_x$ particles (nanolatexes and vesicles) synthesised via RAFT polymerization under aqueous dispersion polymerisation conditions at 70° C.

| Entry No. | Targeted copolymer Structure | DLS Diam. (nm) | PDI |
|---|---|---|---|
| 1 | $PGMA_{65}$ homopolymer | — | |
| 2 | $PGMA_{65}$-$PHPMA_{30}$ | 26 | 0.12 |
| 3 | $PGMA_{65}$-$PHPMA_{50}$ | 29 | 0.12 |

TABLE 1-continued

Summary of intensity-average particle diameters and polydispersities obtained by dynamic light scattering for various $PGMA_{65}$-$PHPMA_x$ particles (nanolatexes and vesicles) synthesised via RAFT polymerization under aqueous dispersion polymerisation conditions at 70° C.

| Entry No. | Targeted copolymer Structure | DLS Diam. (nm) | PDI |
|---|---|---|---|
| 4 | $PGMA_{65}$-$PHPMA_{70}$ | 40 | 0.10 |
| 5 | $PGMA_{65}$-$PHPMA_{100}$ | 58 | 0.10 |
| 6 | $PGMA_{65}$-$PHPMA_{200}$ | 87 | 0.05 |
| 7 | $PGMA_{65}$-$PHPMA_{300}$ | 105 | 0.003 |
| 8 | $PGMA_{65}$-$(PHPMA_{100}/X_1)$ | 86 | 0.12 |
| 9 | $PGMA_{65}$-$PHPMA_{100}$ (20% solids) | 73 | 0.11 |
| 10* | $PGMA_{55}$-$PHPMA_{100}$ | 20 | 0.12 |
| 11* | $pGMA_{55}$-$(PHPMA_{100}/X_1)$ | 39 | 0.24 |
| 12* | $PGMA_{55}$-$PHPMA_{200}$ | 131 | 0.30 |
| 13* | $PGMA_{55}$-$PHPMA_{200}$ (15% solids) | 324 | 0.16 |
| 14* | $PGMA_{55}$-$PHPMA_{300}$ (20% solids) | 520 | 0.22 |
| 15 | $PSEMA_{71}$-$(PHPMA_{200}$-$X_1)$ | 129 | 0.03 |
| 16 | $PKSPMA_{65}$-$PHPMA_{100}$ | 66 | 0.09 |
| 17 | $PQDMA_{67}$-$PHPMA_{100}$ | 56 | 0.20 |

*One-pot syntheses conducted at the stated solids content; all other syntheses were conducted at a total solids content of 10%.
X = EGDMA cross-linker; this was added at the start of the reaction.

Example 1

General Protocol for the RAFT Polymerisation of GMA 4,4'-Azobis(4-cyanopentanoic acid) (0.0309 g, 0.083 mmol), CTP (0.1224 g, 0.417 mmol) and GMA (4.00 g, 25 mmol) were added to a mixture of deionised water (8.0 g) and dioxane (8.0 g) in an ampoule. The solution was stirred until all the CTP had dissolved. The ampoule was sparged with nitrogen for approximately 30 min. and then placed in a pre-heated oil bath at 70° C. The polymerisation was terminated after 4 h by cooling the reaction vessel in an ice bath. The crude PGMA homopolymer was purified by dialysis against water and isolated by lyophilisation. Yield=3.9 g (98%) and Mn=36,200; Mw/Mn=1.22, as judged by DMF GPC vs. poly(methyl methacrylate) standards. The actual degree of polymerisation of this macroCTA is around 65 (hence it is denoted '$PGMA_{65}$') as judged by $^1$H NMR, which indicates that the CTA efficiency is around 90%.

Example 2

$PGMA_{65}$-$PHPMA_{300}$ Latex Syntheses

A general protocol for the synthesis of $PGMA_{65}$-$PHPMA_x$ nanolatexes via RAFT at 10% solids is exemplified as follows for $PGMA_{65}$-$PHPMA_{300}$. 4,4'-Azobis(4-cyanopentanoic acid) initiator (0.0014 g, 0.0038 mmol), $PGMA_{65}$ macroCTA (0.150 g) and HPMA (0.810 g, 5.6 mmol; target DP=300; CTA/initiator molar ratio=5:1) were dissolved in deionised water (8.64 g). This solution was stirred at around 20° C. until both reagents had dissolved (solution pH around 7.0). After sparging with nitrogen for 30 min, the reaction was allowed to proceed at 70° C. with continuous stirring for 24 h. The polymerisation was quenched by cooling the reaction vessel in an ice bath. DLS analysis indicates a mean particle diameter of around 105 nm (PDI=0.003).

Example 3

'20% Solids' Synthesis of a PGMA$_{65}$-PHPMA$_{100}$ Nanolatex 4,4'-Azobis(4-cyanopentanoic acid) initiator (0.0014 g, 0.0038 mmol), PGMA$_{65}$ macroCTA (0.150 g) and HPMA (0.27 g, 1.9 mmol; target DP=100; CTA/initiator molar ratio=5:1) were dissolved in deionised water (1.68 g). The solution was stirred at 20° C. until all the solids had fully dissolved (N.B. the HPMA monomer is not quite fully miscible under these conditions). After sparging with nitrogen for 30 min, the polymerisation was allowed to proceed at 70° C. After 30 min the solution becomes transparent due to partial consumption of the HPMA monomer. The reaction was quenched after 24 h by cooling the reaction vessel in an ice bath. DLS analysis indicates a mean particle diameter of around 73 nm (PDI=0.11).

Example 4

'One-Pot' PGMA$_{60}$-PHPMA$_{100}$ Latex Synthesis at 10% Solids 4,4'-Azobis(4-cyanopentanoic acid) (0.010 g, 0.027 mmol), CTP (0.0398 g, 0.135 mmol) and GMA (1.300 g, 8.125 mmol) were added together with deionised water (1.30 g) into a Schlenk tube. This solution was stirred until all the CTP and 4,4'-azobis(4-cyanopentanoic acid) had dissolved, sparged with nitrogen for approximately 30 min. and then placed in a pre-heated oil bath at 70° C. After 3 h, a small aliquot (~50 µL) was taken for $^1$H NMR and GPC analysis. Then a previously degassed solution containing HPMA (1.95 g, 0.0135 mol), 4,4'-azobis(4-cyanopentanoic acid) (5.0 mg, 0.013 mmol) and deionised water (26.65 g) was added. The second-stage HPMA polymerisation was allowed to proceed for another 24 h. DLS analysis indicates a mean particle diameter of around 20 nm (PDI=0.12).

Example 5

'One-Pot' PGMA$_{55}$-PHPMA$_{300}$ Block Copolymer Vesicles at 20% Solids

The above one-pot synthesis was also repeated at 20% solids using the following reagents. Firstly, 4,4'-azobis(4-cyanopentanoic acid) (0.011 g, 0.030 mmol), CTP (0.0434 g, 0.148 mmol) and GMA (1.300 g, 8.125 mmol) were reacted in H$_2$O (1.30 g) to produce the PGMA-based macroCTA. For the second-stage polymerisation HPMA (6.38 g, 0.0443 mol) and 4,4'-azobis(4-cyanopentanoic acid) (0.011 g, 0.030 mmol) dissolved in deionised water (29.427 g) were added to the reaction solution. In this particular example the target structure was PGMA$_{55}$-HPMA$_{300}$. DLS analysis indicates a mean particle diameter of around 520 nm (PDI=0.22).

Example 6

General Protocol for the RAFT Polymerisation of QDMA 4,4'-Azobis(4-cyanopentanoic acid) (0.0146 g, 0.039 mmol), CTP (0.055 g, 0.197 mmol) and QDMA (3.00 g, 75% aqueous solution, 10.83 mmol) were added to a mixture of deionised water (6.25 g) and dioxane (2.0 g) in an ampoule. The solution was stirred until all the CTP had dissolved. The ampoule was sparged with nitrogen for approximately 30 min. and then placed in a pre-heated oil bath at 70° C. The polymerisation was terminated after 4 h by cooling the reaction vessel in an ice bath; $^1$H NMR analysis shows the polymerisation conversion was about 98%. The crude PQDMA homopolymer was purified by dialysis against deionised water and isolated by lyophilisation. The actual degree of polymerisation of this macroCTA was around 67 (hence it was denoted 'PQDMA$_{67}$') as judged by $^1$H NMR, which indicates a CTA efficiency of around 82%.

Example 7

PQDMA-PHPMA Latex Synthesis. A General Protocol for the Synthesis of PQDMA$_{67}$-PHPMA$_{200}$ Nanolatexes Via RAFT at 10% Solids 4,4'-Azobis(4-cyanopentanoic acid) initiator (0.0007 g, 0.0019 mmol), PQDMA67 macroCTA (0.100 g) and HPMA (0.2773 g, 1.9 mmol; target DP=200; CTA/initiator molar ratio=5:1) were dissolved in deionised water (3.396 g). This solution was stirred at around 20° C. until both reagents had dissolved (solution pH around 7.0). After sparging with nitrogen for 30 min, the reaction was allowed to proceed at 70° C. with continuous stirring for 24 h. DLS analysis indicates a mean particle diameter of around 79 nm (PDI=0.27).

Example 8

General Protocol for the RAFT Polymerisation of DPA

DPA (10.00 g, 40.08 mmol) was added to a mixture of deionised water (10 g) and dioxane (20 g) in an ampoule. The solution pH was adjusted to 5.5 by adding concentrated HCl. The solution was then diluted to 50 grams (with the aid of a four-figure balance) by adding deionised water to the solution. 4,4'-Azobis(4-cyanopentanoic acid) (0.0495 g, 0.134 mmol), CTP (0.1962 g, 0.668 mmol) were then added. The solution was stirred until all the solid had dissolved. The ampoule was sparged with nitrogen for approximately 30 min. and then placed in a pre-heated oil bath at 70° C. The polymerisation was terminated after 3 h by cooling the reaction vessel in an ice bath; $^1$H NMR analysis showed that the polymerisation conversion was about 83%. The crude PDPA homopolymer was purified by dialysis against water and isolated by lyophilisation. Mn=12,800; Mw/Mn=1.23, as judged by aqueous GPC vs. poly(2-vinylpyridine) standards. The actual degree of polymerisation of this macroCTA was around 58 (hence it is denoted 'PDPA$_{58}$') as judged by $^1$H NMR, which indicates that the CTA efficiency is around 86%.

Example 9

PDPA-PHPMA Latex Synthesis. A General Protocol for the Synthesis of PDPA$_{58}$-PHPMA$_{x}$ Nanolatexes Via RAFT at 10% Solids 4,4'-Azobis(4-cyanopentanoic acid) initiator (0.0030 g, 0.008 mmol), PDPA$_{58}$ macroCTA (0.500 g, 0.040 mmol), EGDMA (0.016 g, 0.081 mmol) and HPMA (0.5806 g, 4.03 mmol; target DP=100; CTA/initiator molar ratio=5:1) were dissolved in deionised water (8.80 g). This solution was stirred at around 20° C. until both reagents had dissolved (solution pH around 5.8). After sparging with nitrogen for 30 min, the reaction was allowed to proceed at 70° C. with continuous stirring for 24 h. DLS analysis indicates a mean particle diameter of around 53 nm (PDI=0.23).

Example 10

General Protocol for the RAFT Polymerisation of SEMA 4,4'-Azobis(4-cyanopentanoic acid) (0.0081 g, 0.022 mmol), CTP (0.0319 g, 0.109 mmol) and SEMA solution (5.00 g, 30% aqueous solution, 6.52 mmol, pH 5.8) were added together with dioxane (2.50 g) into an ampoule. The solution was stirred until all the CTP had dissolved. The ampoule was sparged with nitrogen for approximately 30 min. and then placed in a pre-heated oil bath at 70° C. The polymerisation was terminated after 3 h by cooling the reaction vessel in an ice bath; $^1$H NMR analysis showed that the polymerisation conversion was about 90%. The crude PSEMA homopolymer was purified by dialysis against water and isolated by lyophilisation. The actual degree of polymerisation of this macroCTA was around 71 (hence it was denoted 'PSEMA$_{71}$') as judged by $^1$H NMR, which indicates that the CTA efficiency is around 76%.

Example 11

PSEMA-PHPMA Latex Synthesis. A General Protocol for the Synthesis of PSEMA$_{71}$-PHPMA$_x$ Nanolatexes Via RAFT at 10% Solids 4,4'-Azobis(4-cyanopentanoic acid) initiator (0.0009 g, 0.0024 mmol), PSEMA$_{71}$ macroCTA (0.150 g), EGDMA (0.0024 g, 0.012 mmol) and HPMA (0.3478 g, 2.4 mmol; target DP=200; CTA/initiator molar ratio=5:1) were dissolved in deionised water (3.0 g). NaOH (0.1 M) was slowly added to dissolve fully the PSEMA macroCTA. The final solution pH was around pH 6.0. Deionised water was then added to dilute the solution concentration to 10% w/w. After sparging with nitrogen for 30 min, the reaction was allowed to proceed at 70° C. with continuous stirring for 24 h. DLS analysis indicates a mean particle diameter of around 129 nm (PDI=0.03).

Example 12

General Protocol for the RAFT Polymerisation of KSPMA 4,4'-Azobis(4-cyanopentanoic acid) (0.010 g, 0.027 mmol), CTP (0.0397 g, 0.135 mmol) and KSPMA (2.00 g, 8.12 mmol) were added to a mixture of deionised water (8.0 g) and dioxane (2.0 g) in an ampoule. The solution was stirred until all the CTP had dissolved. The ampoule was sparged with nitrogen for approximately 30 min. and then placed in a pre-heated oil bath at 70° C. The polymerisation was terminated after 3 h by cooling the reaction vessel in an ice bath. $^1$H NMR analysis showed that the polymerisation conversion was about 97%. The crude PQDMA homopolymer was purified by dialysis against water and isolated by lyophilisation. The actual degree of polymerisation of this macroCTA was around 65 (hence it is denoted 'PKSPMA$_{65}$') as judged by $^1$H NMR, which indicates that the CTA efficiency was around 89%.

Example 13

PKPSMA$_{65}$-PHPMA$_{200}$ Latex Synthesis. A General Protocol for the Synthesis of PKSPMA$_{65}$-PHPMA$_{200}$ Nanolatexes Via RAFT at 10% Solids 4,4'-Azobis(4-cyanopentanoic acid) initiator (0.0008 g, 0.0021 mmol), PKSPMA$_{65}$ macroCTA (0.150 g) and HPMA (0.3024 g, 2.1 mmol; target DP=200; CTA/initiator molar ratio=5:1) were dissolved in deionised water (4.072 g). This solution was stirred at around 20° C. until both reagents had dissolved (solution pH around 6.5). After sparging with nitrogen for 30 min, the reaction was allowed to proceed at 70° C. with continuous stirring for 24 h. DLS analysis indicates a mean particle diameter of around 82 nm (PDI=0.05).

Example 14

PGMA$_{60}$-(PHPMA$_{200}$/EGDMA$_1$) Latex Synthesis. A General Protocol for the Synthesis of PGMA$_{60}$-(PHPMA$_{200}$/EGDMA$_1$) Nanolatexes Via RAFT at 10% Solids 4,4'-Azobis(4-cyanopentanoic acid) initiator (0.0014 g, 0.0038 mmol), PGMA$_{50}$ macroCTA (0.150 g) and HPMA (0.54 g, 3.8 mmol; target DP=200; CTA/initiator molar ratio=5:1) were dissolved in deionised water (6.21 g). This solution was stirred at around 20° C. until both reagents had dissolved (solution pH around 6.5). After sparging with nitrogen for 30 min, the reaction was allowed to start at 70° C. EGDMA (3.7 mg) was added after 1 h via syringe. The reaction was then allowed to proceed at 70° C. with continuous stirring for 24 h. DLS analysis indicated a mean particle diameter of around 108 nm (PDI=0.065).

Example 15

General Protocol for the RAFT Polymerisation of AMA 4,4'-Azobis(4-cyanopentanoic acid) (0.0448 g, 0.121 mmol), CTP (0.1773 g, 0.604 mmol) and AMA (6.00 g, 36.23 mmol) were added to a mixture of deionised water (18.0 g) and dioxane (8.0 g) in an ampoule. The solution was stirred until all the CTP had dissolved. The ampoule was sparged with nitrogen for approximately 30 min. and then placed in a pre-heated oil bath at 70° C. The polymerisation was terminated after 3.5 h by cooling the reaction vessel in an ice bath. $^1$H NMR analysis showed that the polymerisation conversion was about 85%. The crude PAMA homopolymer was purified by dialysis against water and isolated by lyophilisation. The actual degree of polymerisation of this macroCTA was around 64 (hence it is denoted 'PAMA$_{65}$') as judged by $^1$H NMR, which indicates that the CTA efficiency is around 80%.

Example 16

PAMA-PHPMA Latex Synthesis. A General Protocol for the Synthesis of PAMA$_{65}$-PHPMA$_x$ Nanolatexes Via RAFT at 10% Solids 4,4'-Azobis(4-cyanopentanoic acid) initiator (0.023 g, 0.12 mmol), PAMA$_{65}$ macroCTA (0.500 g), EGDMA (0.0023 g, 0.012 mmol) and HPMA (0.8372 g, 5.8 mmol;

target DP=100; CTA/initiator molar ratio=5:1) were dissolved in deionised water (8.80 g). This solution was stirred at around 20° C. until both reagents had dissolved (solution pH around 6.5). After sparging with nitrogen for 30 min, the reaction was allowed to proceed at 70° C. with continuous stirring for 24 h. DLS analysis indicated a mean particle diameter of around 67 nm (PDI=0.08).

Example 17

General Protocol for the RAFT Polymerisation of DMA

DMA (4.00 g, 25.48 mmol) were added to a mixture of deionised water (6.0 g) and dioxane (8.0 g) in an ampoule. The solution pH as adjusted to 5.5 by adding concentrated HCl. The solution was then diluted to 20 grams by adding deionised water. 4,4'-Azobis(4-cyanopentanoic acid) (0.0315 g, 0.085 mmol) and CTP (0.1247 g, 0.425 mmol) were then added. The solution was stirred until all the solids had dissolved. The ampoule was sparged with nitrogen for approximately 30 min. and then placed in a pre-heated oil bath at 70° C. The polymerisation was terminated after 3 h by cooling the reaction vessel in an ice bath. $^1$H NMR analysis showed that the polymerisation conversion was about 99%. The crude PDPA homopolymer was purified by dialysis against water and isolated by lyophilisation. The actual degree of polymerisation of this macroCTA was around 67 (hence it is denoted 'PDMA$_{67}$') as judged by $^1$H NMR, which indicated that the CTA efficiency is around 89%.

Example 18

PDMA-PHPMA Latex Synthesis. A General Protocol for the Synthesis of PDMA$_{67}$-PHPMA$_x$ Nanolatexes Via RAFT at 10% Solids 4,4'-Azobis(4-cyanopentanoic acid) initiator (0.0010 g, 0.0026 mmol), PDMA67 macroCTA (0.150 g) and HPMA (0.5581 g, 3.9 mmol; target DP=300; CTA/initiator molar ratio=5:1) were dissolved in deionised water (6.373 g). This solution was stirred at around 20° C. until both reagents had dissolved (solution pH around 6.5). After sparging with nitrogen for 30 min, the reaction was allowed to proceed at 70° C. with continuous stirring for 24 h. DLS analysis indicated a mean particle diameter of around 143 nm (PDI=0.21).

Example 19

General Protocol for the RAFT Polymerisation of GMA with CDB as Chain Transfer Agent 4,4'-Azobis(4-cyanopentanoic acid) (0.0067 g, 0.018 mmol), CDB (0.026 g, 0.091 mmol) and GMA (0.80 g, 5 mmol) were added to a mixture of deionised water (1.60 g) and dioxane (2.0 g) in an ampoule. The solution was stirred until all the CDB had dissolved. The ampoule was sparged with nitrogen for approximately 30 min. and then placed in a pre-heated oil bath at 70° C. The polymerisation was terminated after 4 h by cooling the reaction vessel in an ice bath. $^1$H NMR analysis shows the polymerisation conversion is about 97%. The crude PGMA homopolymer was purified by dialysis against water and isolated by lyophilisation. The actual degree of polymerisation of this mac-roCTA is around 60 (hence it is denoted 'PGMA$_{60}$') as judged by $^1$H NMR, which indicated that the CTA efficiency is around 89%.

Example 20

PGMA$_{60}$-PHEMA$_{100}$ Latex Synthesis. A General Protocol for the Synthesis of a PGMA$_{60}$-PHEMA$_{100}$ Nanolatex Via RAFT at 10% Solids 4,4'-Azobis(4-cyanopentanoic acid) initiator (0.0009 g, 0.0025 mmol), PGMA$_{50}$ macroCTA (0.100 g) and HEMA (0.1627 g, 1.3 mmol; target DP=100; CTA/initiator molar ratio=5:1) were dissolved in deionised water (2.364 g). This solution was stirred at around 20° C. until both reagents had dissolved (solution pH around 7.0). After sparging with nitrogen for 30 min, the reaction was allowed to proceed at 70° C. with continuous stirring for 24 h. DLS analysis indicated a mean particle diameter of around 52 nm (PDI=0.06).

Example 21

PMPC$_{25}$-PHPMA$_x$ Latex Synthesis and Alternative Morphologies

This example demonstrates block copolymer self-assembly in concentrated solution to produce alternative morphologies, particularly rod or worm-like morphologies which are typically problematic to form. In this example, a poly(2-(methacryloyloxy)ethyl phosphorylcholine) [PMPC]$^{46,47}$ chain transfer agent serves as the solvated 'A' block (i.e. P$_1$ block). Chain extension of this zwitterionic block with 2-hydroxypropyl methacrylate in water produces a hydrophobic poly(2-hydroxypropyl methacrylate) [PHPMA] 'B' block (i.e. P$_2$ block), which drives in situ self-assembly to form either spheres, worms or vesicles. A detailed phase diagram has been elucidated in which, for a given mean degree of polymerisation (DP) of the PMPC block, the final particle morphology obtained at full conversion is solely dictated by: (i) the target DP of the PHPMA block and (ii) the total solids concentration at which the HPMA polymerisation is conducted. Moreover, if the final targeted structure is vesicles, the observed morphology changes from spheres to worms to vesicles during the in situ polymerisation of HPMA. This facile and generic approach allows the direct, reproducible and highly efficient preparation of pure phases comprising either block copolymer vesicles at up to 25% solids or well-defined worms at 16 to 25% solids in aqueous solution.

i) Method of Synthesis for PMPC$_{25}$-PHPMA$_{100-400}$

For the synthesis of the PMPC macroCTA, MPC (11.073 g, 37.50 mmol, 15.0 w/w %), 4-cyanopentanoic acid dithiobenzoate (CTP; 0.420 g, 1.50 mmol), V-501 (0.084 g, 0.30 mmol), deionised water (52.161 g), and 5.0 w/w % aqueous NaHCO$_3$ solution (10.08 g) were added to a Schlenk flask, which was equipped with a magnetic stir bar. This reaction mixture was then stirred until all the CTP had dissolved in an ice-bath. The solution was purged with nitrogen for approximately 30 min and then placed in a pre-heated oil bath at 70° C. The polymerisation was terminated after 2 h via rapid cooling in an ice bath and exposure to air. The crude PMPC homopolymer (or PMPC macroCTA) was then purified by dialysis against deionised water using semi-permeable cellulose tubing (SPECTRA/POR, corresponding to a molecular weight cut-off of 1000) with at least six changes of deionised water, followed by lyophilisation.

Yield=2.730 g (99%); $M_n$=3900 and $M_w/M_n$=1.07, as judged by GPC using a mixed 3:1 chloroform/methanol eluent, a refractive index detector and a series of near-monodisperse poly(methyl methacrylate) calibration standards. This same GPC set-up was also used to assess the molecular weight of the various PMPC-PHPMA diblock copolymers, The actual degree of polymerisation of this macroCTA was around 25 as judged by $^1$H NMR spectroscopy, which indicates that the CTA efficiency is close to 100%. This PMPC$_{25}$ macroCTA (0.250 g, equivalent to 0.847 mmol MPC repeat units) was mixed with V-501 (2.3 mg, 0.0082 mmol; macroCTA/initiator molar ratio=4.0) and varying amounts of HPMA (0.488-1.954 g, 3.388-13.552 mmol; target DP 100-400), and deionised water (2.211-19.834 g) for the desired total solids concentration in a round-bottomed flask, which was equipped with a magnetic stir bar. These solutions were stirred in an ice bath until all reagents had dissolved. After sparging with nitrogen for approximately 30 min, each polymerisation was allowed to proceed at 70° C. and then quenched after 20 h via rapid cooling in an ice bath and exposure to air.

ii) Materials

All chemicals were purchased from Aldrich at the highest available purity and used as received unless otherwise noted. 2-(Methacryloyloxy)ethyl phosphorylcholine (MPC; >99%) was kindly donated by Biocompatibles Ltd. (Farnham, UK). 2-Hydroxypropyl methacrylate (HPMA) was either donated by Cognis or purchased from Aldrich. The HPMA monomer comprises an isomeric mixture of 75 mol % HPMA and 25 mol % 2-hydroxyisopropyl methacrylate[48]. 4,4'-Azobis(4-cyanopentanoic acid) (V-501) was purchased from Aldrich and was purified by recrystallisation from methanol. 4-Cyanopentanoic acid dithiobenzoate (CTP) was synthesised according to a literature protocol[49].

iii) Polymer Characterisation

Molecular weight distributions were assessed by gel permeation chromatography (GPC) using a Hewlett-Packard HP1090 Liquid Chromatograph pumping unit and two Polymer Laboratories PL Gel 5 μm Mixed-C (7.5×300 mm) columns in series with a guard column at 40° C. connected to a Gilson Model 131 refractive index detector. The eluent was a 3:1 v/v % chloroform/methanol mixture containing 2 mM LiBr at a flow rate of 1.0 mL min$^{-1}$. The number-average molecular weight ($M_n$) and $M_w/M_n$ were calculated from GPC curves using near-monodisperse poly(methyl methacrylate) calibration standards. $^1$H NMR spectra were recorded in either D$_2$O or d$_4$-methanol using a Bruker AV1-400 MHz spectrometer. DLS studies were performed using a Zetasizer Nano-ZS instrument (Malvern Instruments, UK) at 25° C. at a scattering angle of 173°. Copolymer solutions for light scattering studies were prepared at the desired concentration and ultrafiltered prior to use. The intensity-average hydrodynamic diameter and polydispersity of the micelles were calculated by cumulants analysis of the experimental correlation function using Dispersion Technology Software version 5.03. Electrophoresis measurements were also conducted using the same Zetasizer Nano-ZS instrument. Zeta potentials were calculated from mobilities using the Henry equation and determined as a function of solution pH at 25° C. Atomic force microscopy (AFM) measurements were performed using tapping mode under ambient conditions with a Nanoscope IIIa (Veeco Instrument) scanning probe microscope. Samples for AFM imaging were prepared by placing a 20 μL drop of aqueous block copolymer dispersion (typically 0.10 w/w % solids in water) on freshly cleaved mica and allowing it to dry in air at 20° C. Transmission electron microscopy (TEM) studies were conducted using a Philips CM 100 instrument operating at 100 kV equipped with a Gatan 1 k CCD camera. Carbon-coated copper grids were glow-discharged for 20-30 sec to create a hydrophilic surface. Grids were then immersed in aqueous block copolymer dispersions (0.5 w/w %) for 1 min and then immersed for 20 s in an uranyl formate solution (0.75 w/v %) for negative staining. Each grid was then blotted with filter paper and dried using a vacuum hose.

iv) Discussion

Figure 11:
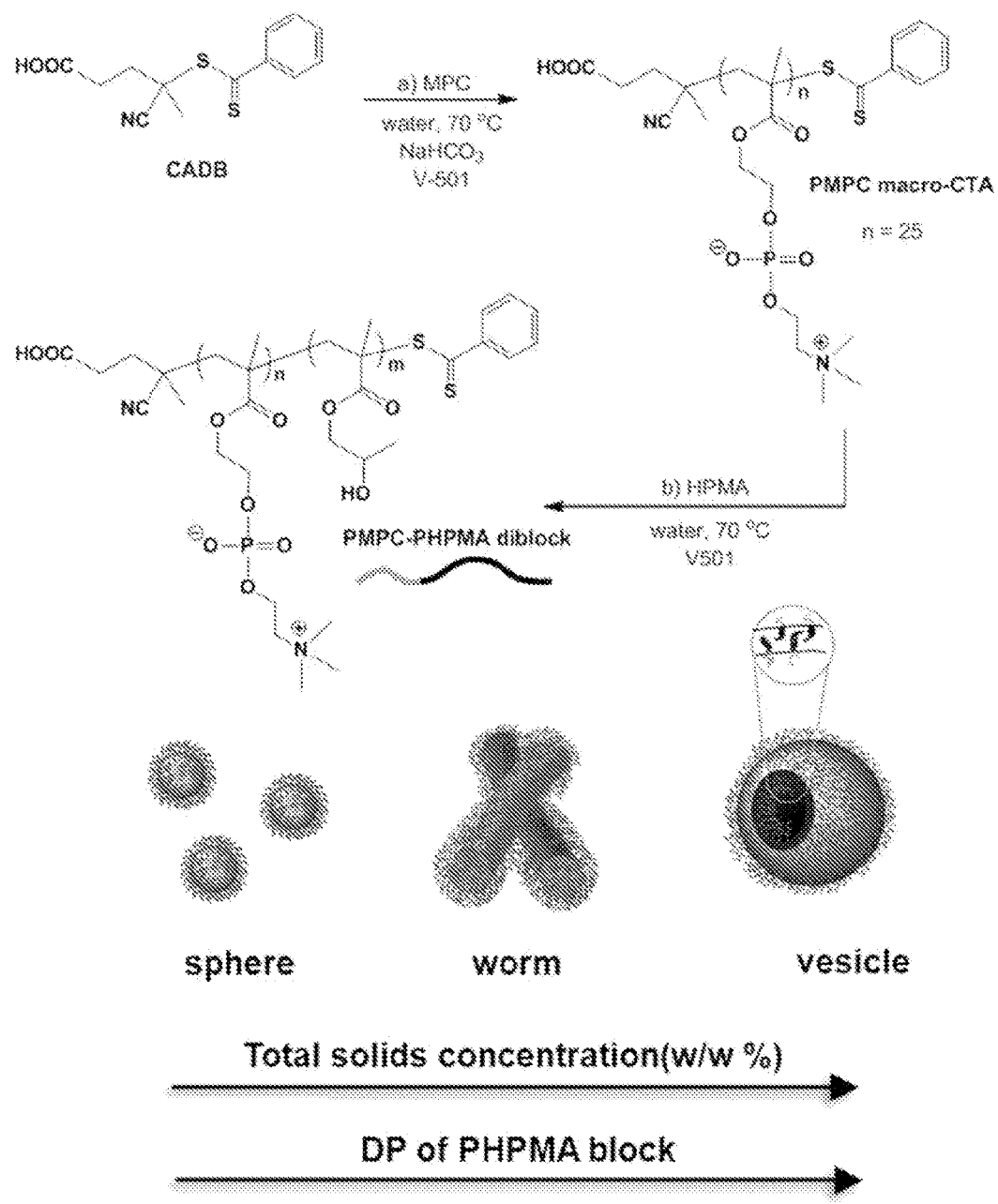
FIGS. 11-54 are described in the description and examples that follow.

Reversible addition-fragmentation transfer (RAFT)[6,50] polymerisation of 2-hydroxypropyl methacrylate (HPMA) was conducted in water using a poly(2-(methacryloyloxy) ethyl phosphorylcholine) (PMPC)-based chain transfer agent (CTA) (FIG. 11). As the PHPMA chains grow, they become increasingly hydrophobic. Thus the resulting PMPC-PHPMA block copolymers undergo spontaneous self-assembly in water. The final particle morphology is controlled not only by the PMPC/PHPMA block ratio but also by the total solids concentration under which the HPMA polymerisation is conducted. Thus, by fixing the mean degree of polymerisation (DP) of the PMPC chains at 25 units, we have constructed a detailed phase diagram for the three block copolymer morphologies (spheres, worms or vesicles) simply by varying two synthesis parameters: the target DP of the PHPMA chains and the total solids concentration.

First, we prepared near-monodisperse PMPC$_{25}$ homopolymer using 4,4'-azobis(4-cyanopentanoic acid) (V-501) initiator and 4-cyanopentanoic acid dithiobenzoate (CTP) as a RAFT chain transfer agent in water in the presence of NaHCO$_3$. The latter reagent was simply used to adjust the pH and hence improve the water solubility of the CTP. RAFT polymerisation proceeded smoothly at approximately pH 8 and was almost complete after 2 h. The mean DP of the resulting PMPC macroCTA was determined by $^1$H NMR spectroscopy. The actual DP of 25 estimated from the aromatic RAFT end-group was in good agreement with the targeted DP and the final copolymer polydispersity was relatively narrow as judged by gel permeation chromatography (GPC) (FIGS. 12 and 13).

Figure 12:
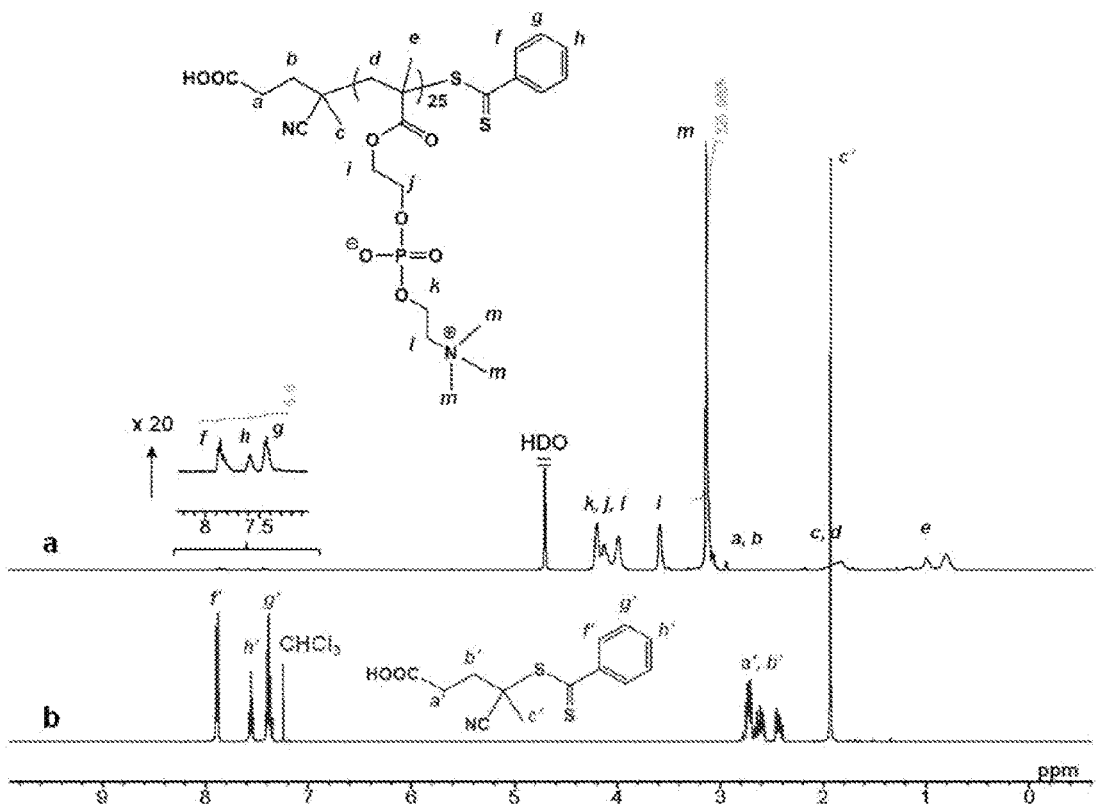

FIG. 12 shows a typical $^1$H NMR spectra for PMPC$_{25}$ macroCTA.a, PMPC$_{25}$ macroCTA in D$_2$O and b, CTP in CDCl$_3$ at 25° C. The inset shows the chemical structure of the PMPC$_{25}$ macroCTA (black) and CTP (blue) and with full peak assignments (a-h and a'-h').

Figure 13:
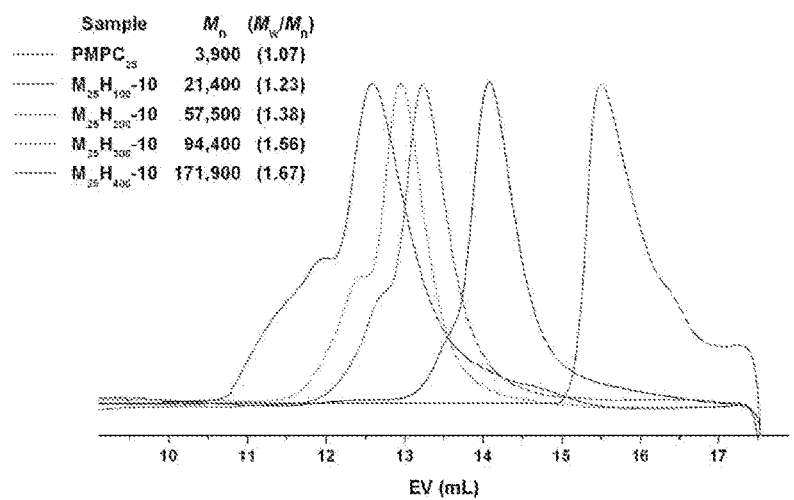

FIG. 13 shows GPC curves for the RAFT dispersion polymerisation of HPMA from PMPC$_{25}$ macroCTA. The aqueous dispersion polymerisation of HPMA from PMPC$_{25}$ macroCTA at target degrees of polymerisation of 100 to 400 in water at 70° C.: PMPC$_{25}$ macroCTA (0.25 g, 0.0326 mmol); [PMPC$_{25}$ macroCTA]$_0$/[V-501]$_0$=4.0; total solids content=10 w/w %.

This PMPC$_{25}$ homopolymer was then used as a so-called 'macroCTA' for the second-stage RAFT polymerisation of HPMA, which was conducted under aqueous dispersion polymerisation conditions.

Using the same PMPC$_{25}$ macroCTA, we prepared various PMPC$_{25}$-PHPMA$_x$ diblock copolymers directly in water while also varying the total solids content of the formulation. The combined mass of HPMA and PMPC$_{25}$ macroCTA (the mass of the free radical initiator is considered negligible)

was initially fixed at 10 w/w %. We use the copolymer notation $M_{25}H_m$-Y, where M stands for PMPC, H stands for PHPMA, m is the target DP of the PHPMA block in each case and Y denotes the total solids content used for each formulation. Both the $PMPC_{25}$ macroCTA and the HPMA monomer are initially fully soluble in the aqueous reaction solution, but the aqueous dispersion polymerisation of HPMA leads to in situ phase separation and self-assembly, with the final morphology of the $PMPC_{25}$-$PHPMA_m$ diblock copolymer particles dictated solely by the initial reaction conditions. Very high HPMA conversions are observed within 2 h, as judged by $^1$H NMR spectroscopy. The $PMPC_{25}$-$PHPMA_x$ diblock copolymer molecular weight distribution is shifted to significantly higher molecular weight relative to the $PMPC_{25}$ macroCTA, with little evidence for any unreacted PMPC homopolymer, regardless of the target block composition (see FIG. 13). However, there is a prominent high molecular weight shoulder, particularly if targeting higher DP PHPMA chains. This is due to a small amount (<0.2 mol %) dimethacrylate impurity known to be present in HPMA monomer[42]. However, this impurity only causes relatively light branching rather than cross-linking, since no $PMPC_{25}$-$PHPMA_x$ diblock copolymer particles can be detected in methanol (which is a good solvent for both the PMPC and PHPMA blocks) as judged by dynamic light scattering.

All polymerisation data are summarised in FIG. 13 and Table 2 below.

TABLE 2

Molecular Characterisation of $PMPC_{25}$-$PHPMA_x$ Block Copolymers Prepared by RAFT Dispersion Polymerisation in Water at 70° C.[a]

| sample code[b] | solids (w/w %)[c] | $N_{PHPMA}$[d] | $W_{PMPC}$[e] | $M_n$(kg/mol)[f] | PDI[f] | Morphology[g] |
|---|---|---|---|---|---|---|
| $M_{25}H_{100}$-10 | 10.0 | 98 | 0.34 | 2.14 | 1.23 | S |
| $M_{25}H_{100}$-15 | 15.0 | 101 | 0.34 | 2.20 | 1.27 | S |
| $M_{25}H_{100}$-20 | 20.0 | 100 | 0.34 | 2.26 | 1.27 | S |
| $M_{25}H_{100}$-25 | 25.0 | 99 | 0.34 | 2.30 | 1.23 | S |
| $M_{25}H_{150}$-10 | 10.0 | 152 | 0.25 | 3.99 | 1.23 | S |
| $M_{25}H_{150}$-15 | 15.0 | 151 | 0.25 | 3.98 | 1.24 | S |
| $M_{25}H_{150}$-20 | 20.0 | 152 | 0.25 | 3.85 | 1.25 | S |
| $M_{25}H_{150}$-25 | 25.0 | 148 | 0.26 | 3.71 | 1.22 | S |
| $M_{25}H_{200}$-10 | 10.0 | 200 | 0.20 | 5.80 | 1.36 | S |
| $M_{25}H_{200}$-15 | 15.0 | 201 | 0.20 | 5.30 | 1.35 | S |
| $M_{25}H_{200}$-20 | 20.0 | 202 | 0.20 | 5.75 | 1.38 | S |
| $M_{25}H_{200}$-25 | 25.0 | 207 | 0.20 | 5.10 | 1.33 | S, R |
| $M_{25}H_{220}$-25 | 25.0 | 220 | 0.19 | 5.99 | 1.38 | R |
| $M_{25}H_{250}$-10 | 10.0 | 251 | 0.17 | 6.82 | 1.27 | S |
| $M_{25}H_{250}$-13 | 13.0 | 255 | 0.17 | 6.65 | 1.26 | S |
| $M_{25}H_{250}$-15 | 15.0 | 251 | 0.17 | 7.01 | 1.29 | S, R |
| $M_{25}H_{250}$-20 | 20.0 | 256 | 0.17 | 6.99 | 1.29 | S, R |
| $M_{25}H_{275}$-25 | 25.0 | 278 | 0.16 | 7.20 | 1.29 | R |
| $M_{25}H_{300}$-10 | 10.0 | 301 | 0.15 | 9.44 | 1.56 | S |
| $M_{25}H_{300}$-15 | 15.0 | 294 | 0.15 | 9.76 | 1.49 | S, R |
| $M_{25}H_{300}$-20 | 20.0 | 298 | 0.15 | 8.64 | 1.50 | S, R |
| $M_{25}H_{300}$-25 | 25.0 | 299 | 0.15 | 9.99 | 1.48 | R, V |
| $M_{25}H_{320}$-25 | 25.0 | 321 | 0.14 | 11.00 | 1.56 | R, V |
| $M_{25}H_{350}$-10 | 10.0 | 354 | 0.13 | 13.22 | 1.42 | S |
| $M_{25}H_{350}$-15 | 15.0 | 351 | 0.13 | 12.51 | 1.44 | S, R |
| $M_{25}H_{350}$-20 | 10.0 | 349 | 0.13 | 12.40 | 1.46 | R |
| $M_{25}H_{370}$-25 | 25.0 | 372 | 0.12 | 14.24 | 1.61 | V |
| $M_{25}H_{400}$-10 | 10.0 | 397 | 0.11 | 17.19 | 1.67 | S |
| $M_{25}H_{400}$-12.5 | 12.5 | 395 | 0.11 | 17.32 | 1.73 | S, R |
| $M_{25}H_{400}$-15 | 15.0 | 401 | 0.11 | 18.56 | 1.66 | S, R |
| $M_{25}H_{400}$-16.2 | 16.2 | 399 | 0.11 | 17.43 | 1.38 | R |
| $M_{25}H_{400}$-17.5 | 17.5 | 399 | 0.11 | 18.14 | 1.39 | R, V |
| $M_{25}H_{400}$-20 | 20.0 | 401 | 0.11 | 17.26 | 1.69 | R, V |
| $M_{25}H_{400}$-22.5 | 22.5 | 398 | 0.11 | 17.63 | 1.51 | V |
| $M_{25}H_{400}$-23 | 23.0 | 401 | 0.11 | 17.30 | 1.71 | V |
| $M_{25}H_{400}$-25 | 25.0 | 398 | 0.11 | 17.20 | 1.70 | V |

[a]All these entries were used to construct the phase diagram shown in FIG. 3: $PMPC_{25}$ macroCTA (0.25 g, 0.0326 mmol); [$PMPC_{25}$ macroCTA]$_0$/[V-501]$_0$ = 4.0; polymerisation time = 20 h.
[b]The individual PMPC and PHPMA blocks are denoted by (M) and (H), respectively.
[c]100 × [$PMPC_{25}$ macroCTA (g) + HPMA (g)]/[all reaction mixtures (g)].
[d]Determined by $^1$H NMR in $d_4$-methanol based on $PMPC_{25}$ macroCTA: conversion >99%.
[e]Weight fraction of PMPC block in the latex.
[f]Determined by GPC (PMMA standards, 3:1 CHCl$_3$:methanol eluent with 2 mM LiCl).
[g]Aggregation morphologies formed in water identified by TEM and tapping-mode AFM: S = spheres, R = worms/rods, V = vesicles. Coexisting structures are indicated by two letters, where appropriate.

Figure 14:
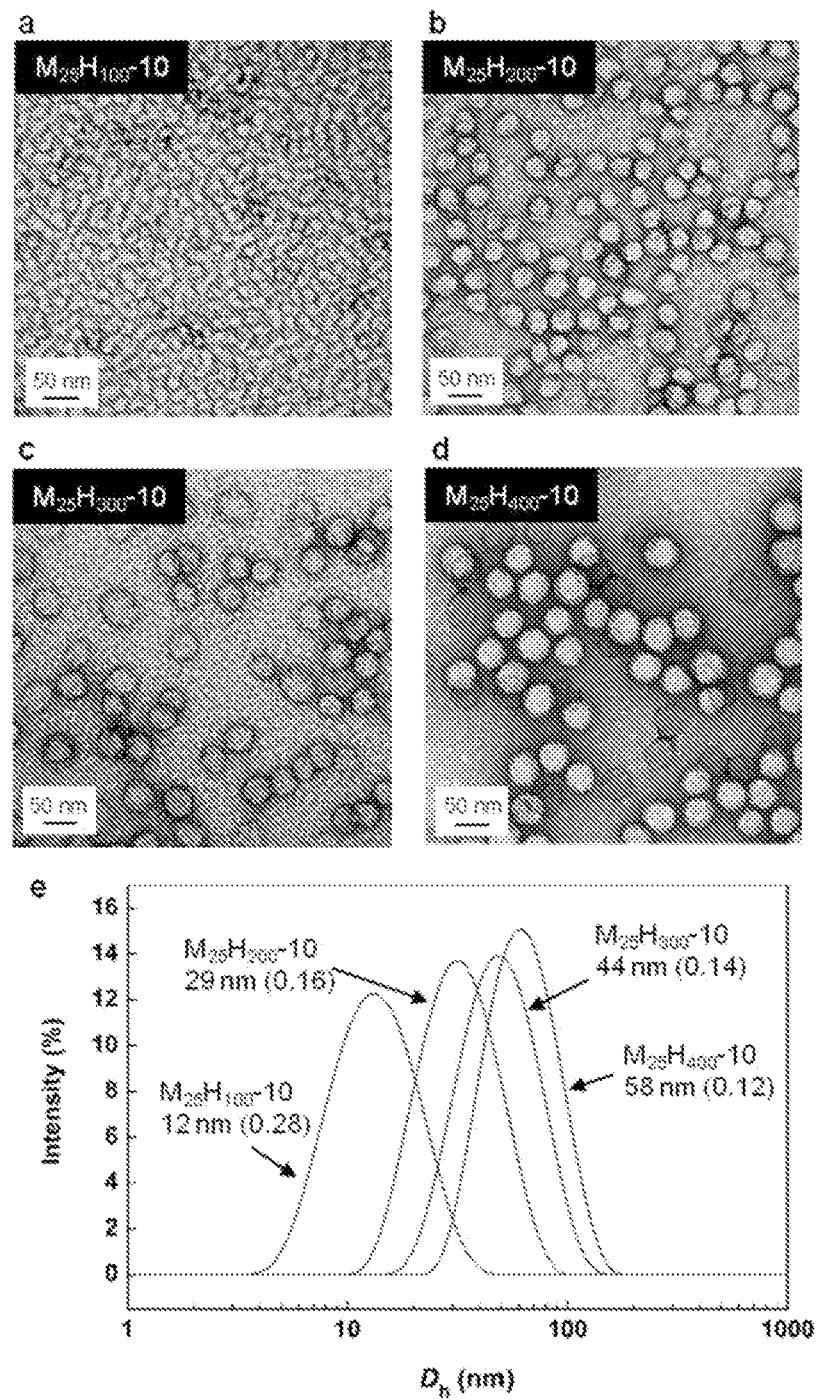

Representative TEM image and DLS results for various $PMPC_{25}$-$PHPMA_x$ diblock copolymer particles ($M_{25}H_{100}$-10, $M_{25}H_{200}$-10, $M_{25}H_{300}$-10 and $M_{25}H_{400}$-10) are shown in FIG. 14.

FIG. 14 shows various spherical morphologies obtained from $M_{25}H_m$-10. a-d, TEM images obtained for a series of $M_{25}H_m$-10 block copolymer spheres prepared by RAFT aqueous dispersion polymerisation (total solids content: 10 w/w %): (a) $M_{25}H_{100}$-10, (b) $M_{25}H_{200}$-10, (c) $M_{25}H_{300}$-10, and (d) $M_{25}H_{400}$-10. In each case the PMPC block length is fixed at 25 units and the PHPMA block length is systematically varied. e, Dynamic light scattering (DLS) particle size distributions (intensity vs mean hydrodynamic diameter, $D_h$) obtained for the same series of block copolymer spheres, $M_{25}H_m$-10 (m=100-400). The inset values indicate the mean diameter and polydispersity index (in parentheses) for each sample, as calculated by cumulants analysis.

A systematic increase in the target DP of the PHPMA block from 100 to 400 leads to a monotonic increase in the intensity-average particle diameter from 12 to 58 nm, as judged by DLS. In each case TEM studies confirmed exclusively spherical particle morphologies and estimated TEM diameters were consistent with the DLS data.

Figure 15:
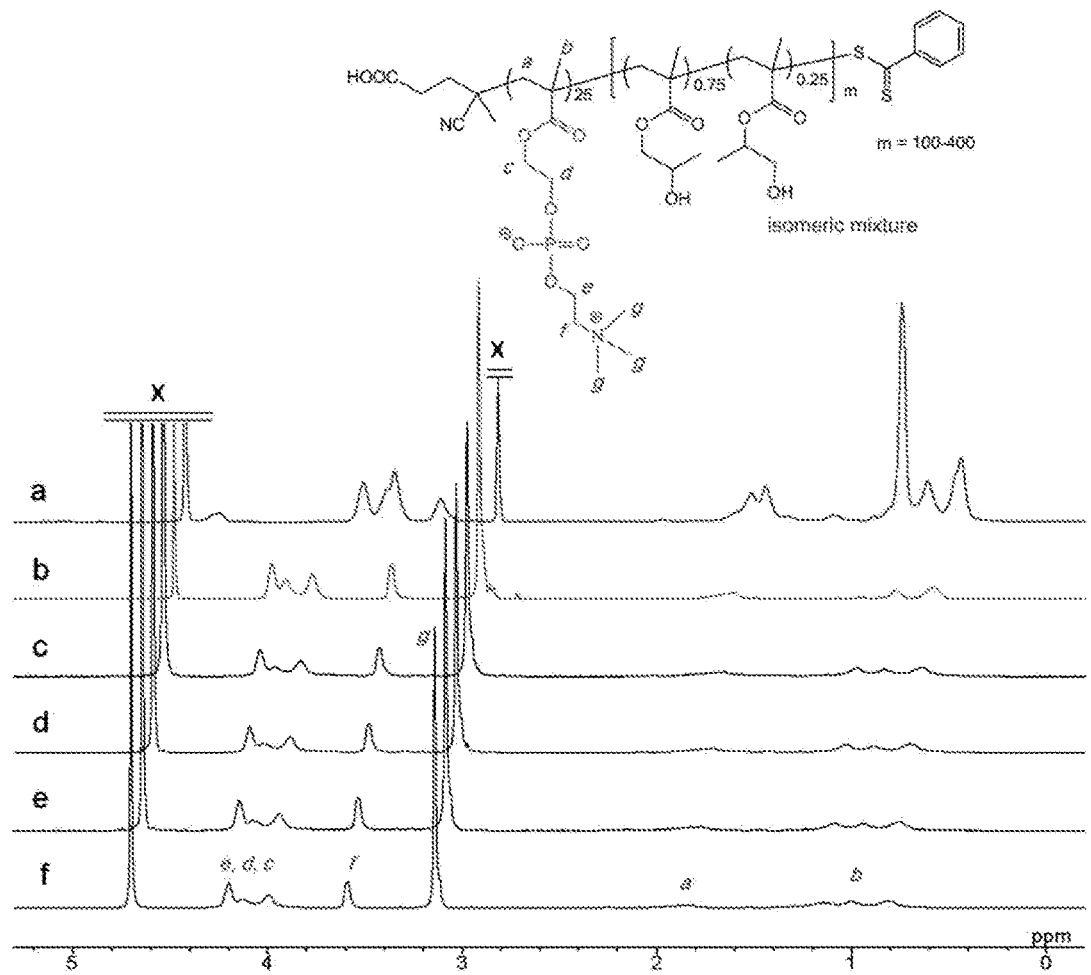
Figure 16:
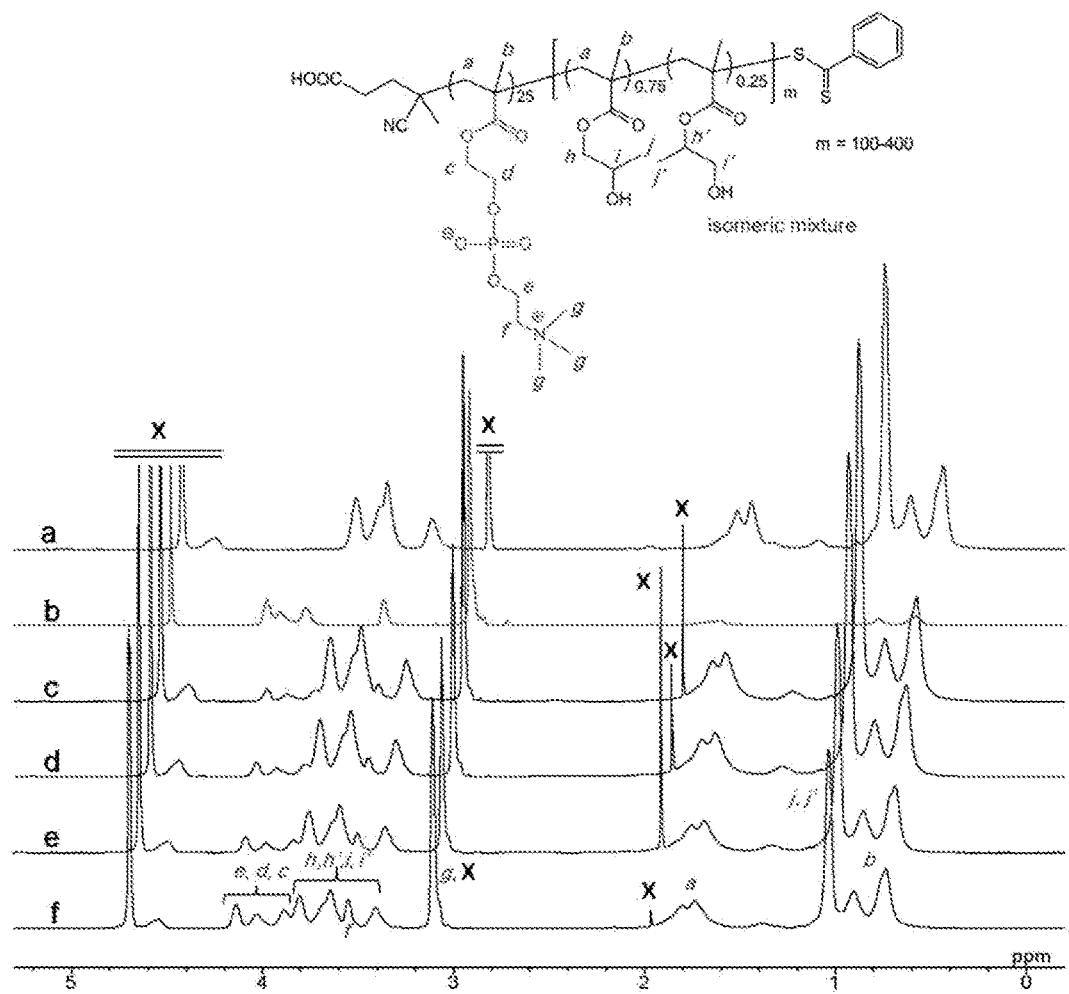

$^1$H NMR spectra were recorded for the PMPC$_{25}$ macroCTA dissolved in D$_2$O, a RAFT-synthesised PHPMA$_{50}$ homopolymer control in d$_4$-methanol and M$_{25}$H$_m$-10 (m=100 to 400) particles redispersed in both D$_2$O and d$_4$-methanol (see FIGS. 15 and 16, respectively).

FIG. 15 shows $^1$H NMR spectra for M$_{25}$H$_m$-10 diblock copolymer spheres in D$_2$O at 25° C. a, PHPMA homopolymer in d$_4$-methanol as a reference (M$_n$=8,000, M$_w$/M$_n$=1.17 (eluent: THF, PMMA calibration standards), DP=50; This PHPMA homopolymer was prepared by RAFT polymerisation in acetonitrile using CTP and V-501 at 24 h: HPMA (1.298 g, 9.0 mmol, 15 w/w %); CTP (0.051 g, 0.183 mmol), V-501 (0.010 mg, 0.035 mmol), water (7.302 g); b, PMPC macroCTA in D$_2$O as a reference; c-f, M$_{25}$H$_m$-10 diblock copolymer spheres in D$_2$O: c, d, e, and f for m=400, 300, 200, and 100, respectively. The inset shows the chemical structure of M$_{25}$H$_m$-10 and with representative peak assignments (a-g). No peaks attributable to the PHPMA chains are observed in D$_2$O. For clarity, spectra are displaced by ~0.1 ppm relative to f, and X indicates a solvent peak.

FIG. 16 shows $^1$H NMR spectra for M$_{25}$H$_m$-10 diblock copolymers in d$_4$-methanol at 25° C.a, PHPMA homopolymer in d$_4$-methanol as a reference (the same homopolymer shown in Figure S4); b, PMPC macroCTA in D$_2$O as a reference; c-f, M$_{25}$H$_x$-10 diblock copolymers in d$_4$-methanol: c, d, e, and f for m=400, 300, 200, and 100, respectively. The inset shows the chemical structure of M$_{25}$H$_m$-10 and with full peak assignments including in PHPMA isomeric impurities. Here, all peaks expected for the PHPMA chains are observed. For clarity, spectra are displaced by ~0.1 ppm relative to f, and X indicates a solvent peak.

All the signals associated with the PMPC$_{25}$ macroCTA are observed in each of the spectra recorded in D$_2$O. In contrast, none of the PHPMA signals are visible in this solvent, regardless of the PHPMA block length, whereas all the signals expected for the PMPC and PHPMA blocks are visible in the spectra recorded in d$_4$-methanol. Thus these NMR observations suggest that the PMPC$_{25}$ chains act as the solvated steric stabilizer, while the PHPMA chains form the non-solvated nanolatex cores.

Dramatic changes in block copolymer morphology were observed when the aqueous dispersion polymerisation of HPMA was conducted in aqueous solution under increasingly concentrated conditions. For example, either spheres, worms (or more accurately worm-like aggregates) or vesicles were observed for the M$_{25}$H$_{400}$-Y series: spheres were obtained at Y=10%, both spheres and rods at 12.5 and 15%, a pure worm phase at 16.2%, both worms and vesicles at 17 and 20%, and purely vesicles for Y≥22.5% (see FIG. 17 and Table 2).

Figure 17:
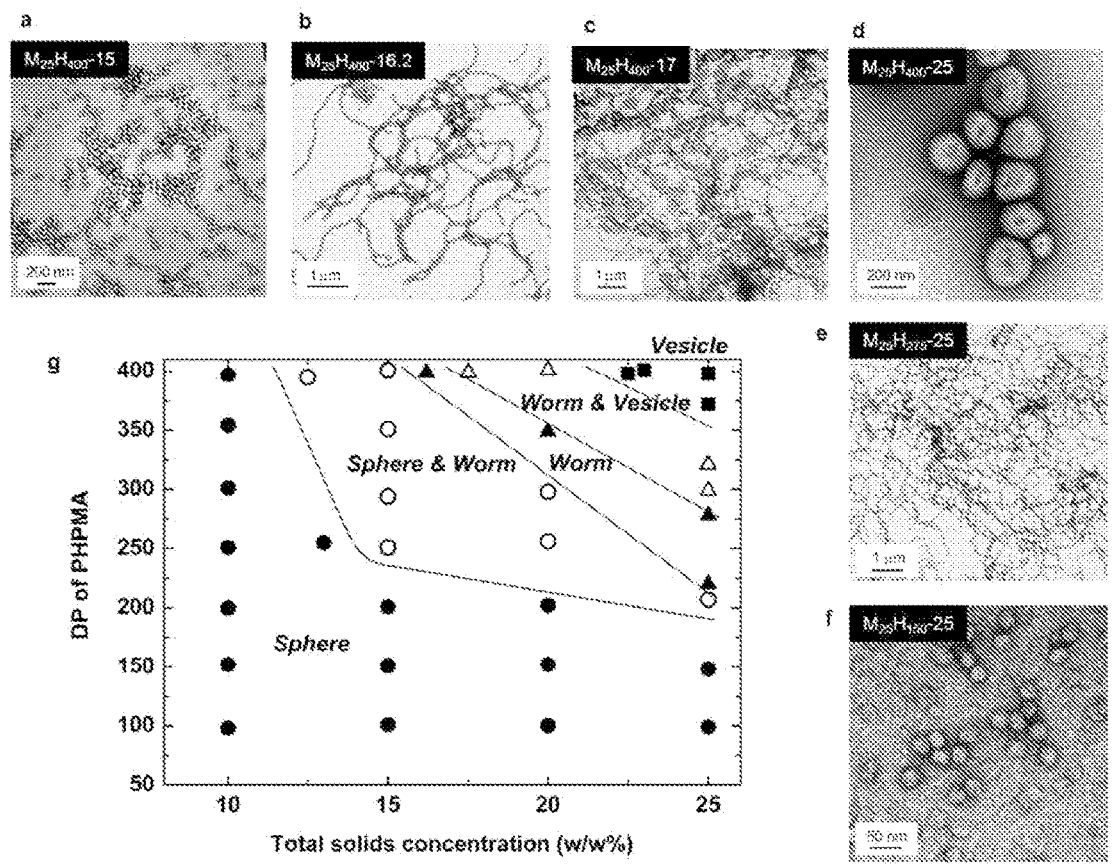

FIG. 17 shows a morphology diagram constructed for M$_{25}$Hx-Y by systematic variation of the mean target degree of polymerisation of PHPMA (x) and the total solids concentration (Y) used for each synthesis. a-f, TEM images for representative morphologies: (a) M$_{25}$H$_{400}$-15 (spheres & worms), (b) M$_{25}$H$_{400}$-16.2 (worms), (c) M$_{25}$H$_{400}$-17 (worms & vesicles), and (d) M$_{25}$H$_{400}$-25 (vesicles), which are latexes with the same composition and structure, M$_{25}$H$_{400}$, (e) M$_{25}$H$_{275}$-25 and (d) M$_{25}$H$_{150}$-25, which are different latexes prepared at the same solid contents, 25 w/w %.

For a given block copolymer, the morphology formed in aqueous solution depends on the relative pervaded volumes and cross-sectional areas of the chains that dictates the spontaneous curvature of the interfaces. Given that PHPMA is hydrophobic, its volume is not particularly affected by the concentration whereas the pervaded volume of the PMPC chain is sensitive to its solvation. Previously Ishihara[51] has reported that each MPC repeat unit is associated with up to 24 water molecules. Thus an increase in copolymer concentration reduces the activity of the water and causes a reduction in the pervaded volume of the PMPC block. In dilute solution the interfacial curvature is concave with respect to PMPC which leads to micelles, whereas in the bulk the spontaneous curvature of M$_{25}$H$_{400}$ is convex, forming PMPC spheres in a PHPMA matrix. At some intermediate concentration, the interfaces are essentially flat and vesicles form. Varying the target DP of the PHPMA block at a fixed Y=25% leads to similar morphological control. Thus for the M$_{25}$H$_m$-25 series, pure phases of either spheres, worms or vesicles were observed for m=150, 275, and 400, respectively. All of our morphological observations are summarised in the form of a detailed phase diagram shown in FIG. 17. Using uranyl formate as a negative stain, five distinct phases (three pure and two mixed) have been identified by TEM. For HPMA polymerisations conducted at relatively high concentration, a pure vesicle phase was observed when targeting a high DP (e.g. M$_{25}$H$_{400}$-25; average diameter=140 nm by TEM; P$_h$=186 nm (PDI=0.18) by DLS, see FIG. 17 and FIG. 18).

Figure 18:
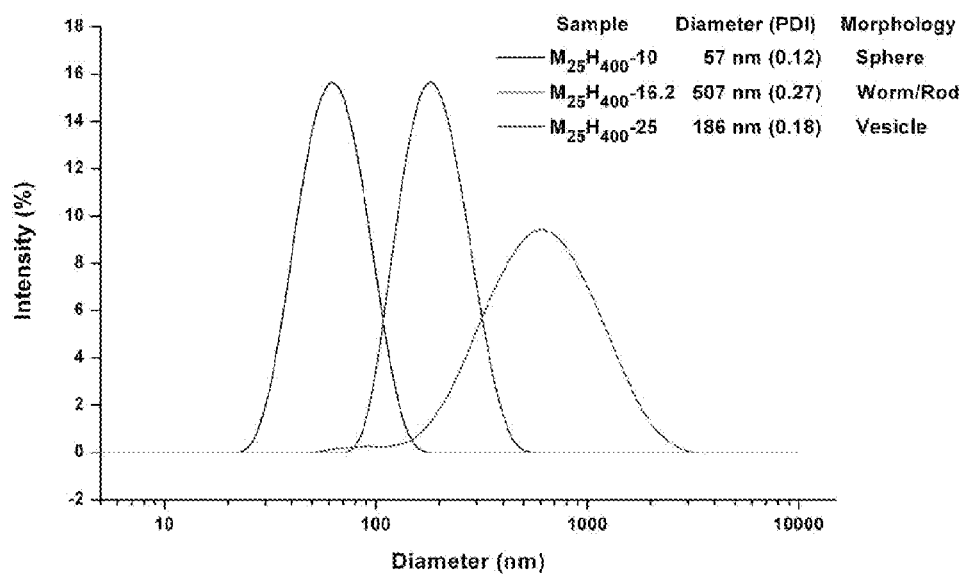

FIG. 18 shows dynamic light scattering particle size distribution obtained for M$_{25}$H$_{400}$-Y in water. Typical DLS data obtained for the three pure block copolymer phases dispersed in water at 25° C.; spheres, worms/rods, and vesicles observed for M$_{25}$H$_{400}$-10, M$_{25}$H$_{400}$-16.2 and M$_{25}$H$_{400}$-25, respectively.

These vesicles were also examined after drying from dilute aqueous solution onto a mica substrate using atomic force microscopy (AFM). The average vesicle diameter of 145 nm agrees well with TEM data. More importantly, the hollow nature of such vesicles was confirmed, since the height of the central domain was much lower than that at the edge. However, the average vesicle dimensions determined by TEM and AFM were somewhat lower than the hydrodynamic diameters reported by DLS, since the latter technique is sensitive to both hydration and polydispersity.

Figure 19:
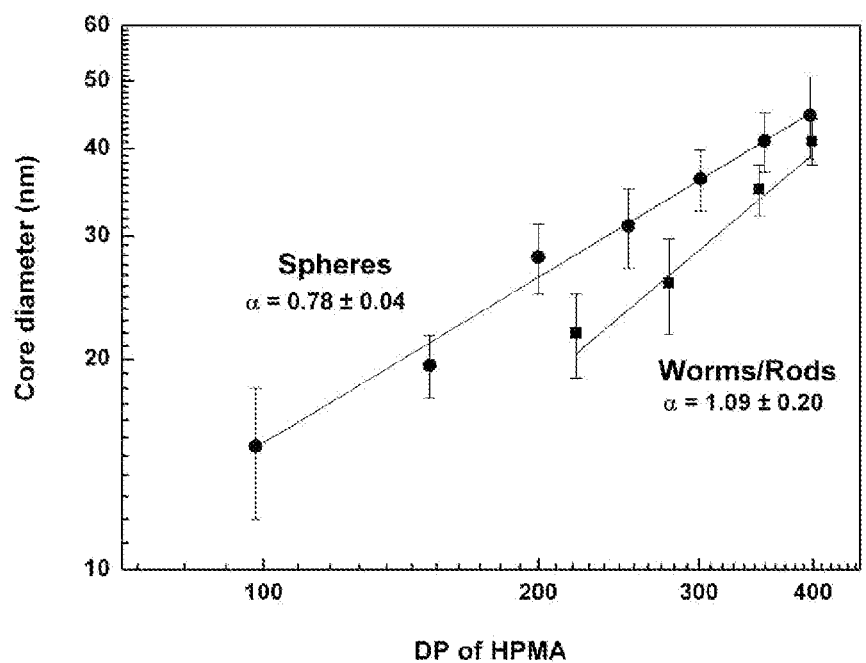

Close inspection of the various worm phases observed by TEM for M$_{25}$H$_{220}$-25, M$_{25}$H$_{275}$-25, M$_{25}$H$_{350}$-20 and M$_{25}$H$_{400}$-16.2 indicated mean 'inner core' (i.e. PHPMA block only) worm widths of 22, 26, 35 and 41 nm, respectively, with worm lengths exceeding 1 μm in most cases (see FIG. 17). Thus the 'inner core' worm width varies monotonically with the DP of the core-forming PHPMA chains, as expected. These TEM observations are also consistent with our AFM data. The mean worm core widths were estimated from TEM images and plotted against the mean DP of the core-forming PHPMA block (FIG. 19). These data can be fitted to a power law that relates the core diameter, d, to the mean DP of the hydrophobic PHPMA blocks, N, such that: d=kN$^\alpha$, where k is a constant that depends on the Flory-Huggins parameter and N scales with an exponent a of unity (within experimental error)[52]. This indicates that the PHPMA chains within the worms are fully extended. In contrast, the α value obtained for a series of block copolymer spheres is approximately 0.78, which suggests that the conformation of the PHPMA chains is intermediate between the fully stretched and fully collapsed states. These exponents are consistent with those reported by Förster et al.[53] Furthermore, DLS studies indicate that these block copolymer worms give rise to more intense light scattering and significantly larger 'sphere-equivalent' diameters than the block copolymer spheres and vesicles. As-synthesised worm phases such as $M_{25}H_{400}$-22.5 and $M_{25}H_{350}$-25 were sufficiently viscous to cause physical gelation, as judged by the tube inversion method. Previously, both block copolymer rods and vesicles have been reported by Pan et al.[39] and Charleux et al.[54] using either alcoholic dispersion or aqueous emulsion polymerisation. We have recently described many examples of diblock copolymer spheres (nanolatexes) and also a single example of a block copolymer vesicle via aqueous dispersion polymerisation[55]. However, these literature examples were simply achieved by varying the diblock copolymer composition. A highly significant aspect of the present study is the realisation that the total solids concentration offers a second highly effective means of varying the diblock copolymer morphology, since this insight allows the construction of a predictive phase diagram for a given diblock copolymer.

Figure 20:
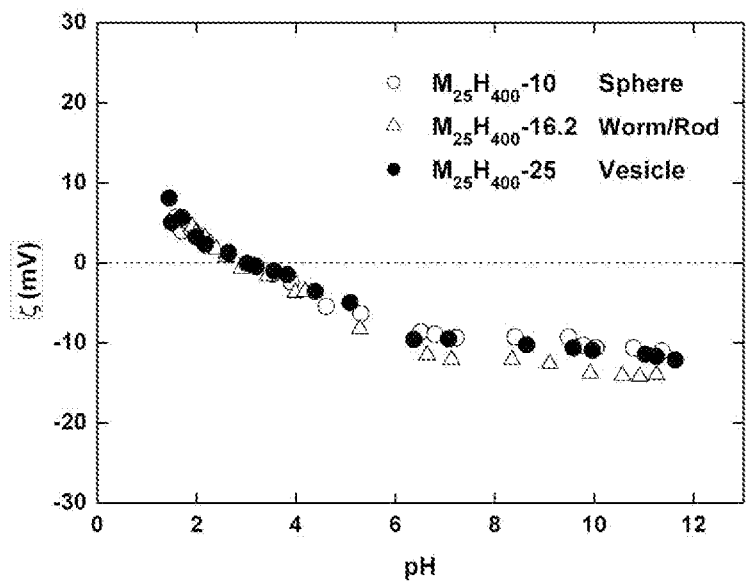

The zwitterionic nature of the PMPC chains effectively shields any underlying surface charge, leading to a relatively flat zeta potential vs. pH curve for the PMPC-PHPMA diblock copolymer particles, regardless of their morphology (see FIG. 20).

FIG. 20 shows aqueous electrophoresis data obtained for $M_{25}H_{400}$-Y latexes with various morphologies. Zeta potential vs. pH curves for dilute (0.1 g/L) aqueous solutions of $M_{25}H_{400}$-Y particles with the following morphologies: (○) spheres, $M_{25}H_{400}$-10; (Δ) worms/rods, $M_{25}H_{400}$-16.2; (●) vesicles, $M_{25}H_{400}$-25.

As discussed above, the PMPC-PHPMA worm phase readily forms soft, free-standing gels in aqueous solution while in principle the PMPC-PHPMA vesicles can encapsulate various actives such as dyes. Given that such block copolymers are efficiently prepared directly in water and have already been demonstrated to be both highly biocompatible[56] and also anti-bacterial[57], these novel particles are likely to have interesting biomedical applications.

Formulations that produce pure vesicle and worm phases such as $M_{25}H_{400}$-25 and $M_{25}H_{275}$-25 were dissolved in methanol (which is a good solvent for both blocks), and then dialysed against water. Intriguingly, their original morphologies were lost and purely spherical phases were obtained, as judged by TEM (see Figure S12).

Figure 21:
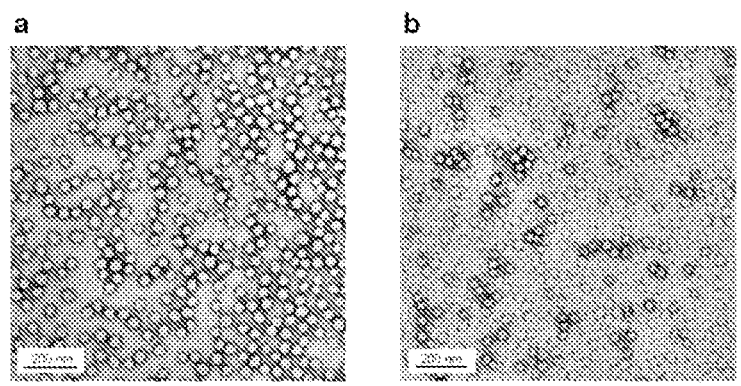

FIG. 21 shows morphological changes after dilution with methanol, followed by dialysis against water. TEM images were obtained as follows: vesicle ($M_{25}H_{400}$-25) and worm/rod ($M_{25}H_{275}$-25) phases were diluted in methanol to 1.0 w/w % solids and were then dialysed against water. (a) $M_{25}H_{400}$-25, (b) $M_{25}H_{275}$-25. In both cases the original non-spherical morphologies were replaced with spheres, because methanol is a good solvent for both the PMPC and PHPMA blocks. However, merely diluting these vesicles or worms/rods with water did not lead to any morphological changes due to the non-ergodic (frozen) nature of these aggregates in the absence of methanol.

Moreover, DLS studies indicate that the spherical DLS diameter obtained for $M_{25}H_{400}$-25 after this processing step is 55 nm, which corresponds closely to that observed for the same diblock copolymer prepared at 10 w/w % solids in water (53 nm). On the other hand, mere dilution of the $M_{25}H_{400}$-25 vesicles (or $M_{25}H_{275}$-25 worms) with water did not lead to any change in block copolymer morphology.

These results suggest that our in situ self-assembly synthetic route produces frozen, non-ergodic structures in aqueous solution.

For pseudo-living polymerisations such as RAFT, it is well known that the molecular weight of the polymer chains increases linearly with conversion[6,46]. Thus, during the aqueous dispersion polymerisation of HPMA via RAFT, the mean DP of the majority of the PHPMA chains gradually increases. However, as we have seen, this DP is a critical parameter in determining the block copolymer morphology. If a relatively high final DP is targeted so as to produce a purely vesicular phase (e.g. $M_{25}H_{400}$-25; see FIG. 17), then in principle all the various block copolymer phases should be generated in situ during the HPMA polymerisation. Thus, the synthesis of $M_{25}H_{400}$-25 was revisited in a detailed kinetic study, see FIG. 22a (for the evolution of $M_n$ and $M_w/M_n$ with conversion, see FIG. 23).

Figure 22:
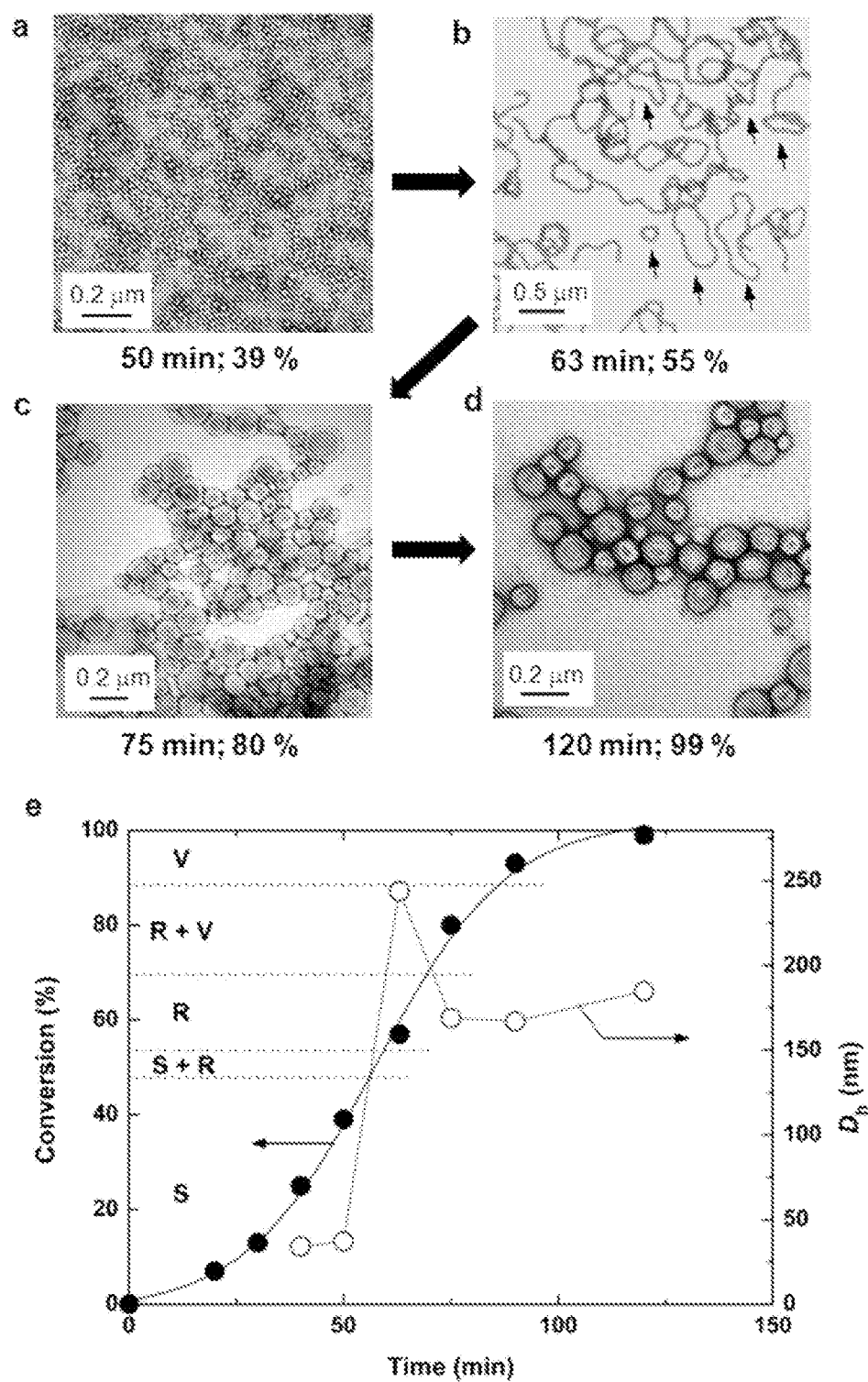

FIG. 22 shows the in situ morphological changes that occur during aqueous dispersion polymerisation. a-d, TEM images of the various block copolymer morphologies obtained after specific polymerisation times when targeting a final block copolymer with a $M_{25}H_{400}$-25 composition: (a) 50 min, 39% conversion (spheres), (b) 63 min, 55% conversion (worms or toroids and loops; see arrows), (c) 75 min, 80% conversion (rods and vesicles), and (d) 120 min, 99% conversion (vesicles), e, Kinetic data for the targeted $M_{25}H_{400}$-25 composition at 70° C. and the DLS hydrodynamic particle diameter ($D_h$) as a function of polymerisation time. The separate phase regions are estimated from a series of $M_{25}H_m$-25 syntheses (see phase diagram shown in FIG. 3): S=spheres, R=rods, V=vesicles. Polymerisation conditions: $PMPC_{25}$ macroCTA (0.250 g, equivalent to 0.847 mmol of MPC repeat units), HPMA (1.954 g, 13.552 mmol; target DP 400), V-501 initiator (2.3 mg, 0.0082 mmol; CTA/initiator molar ratio=4.0) and water (6.610 g).

Figure 23:
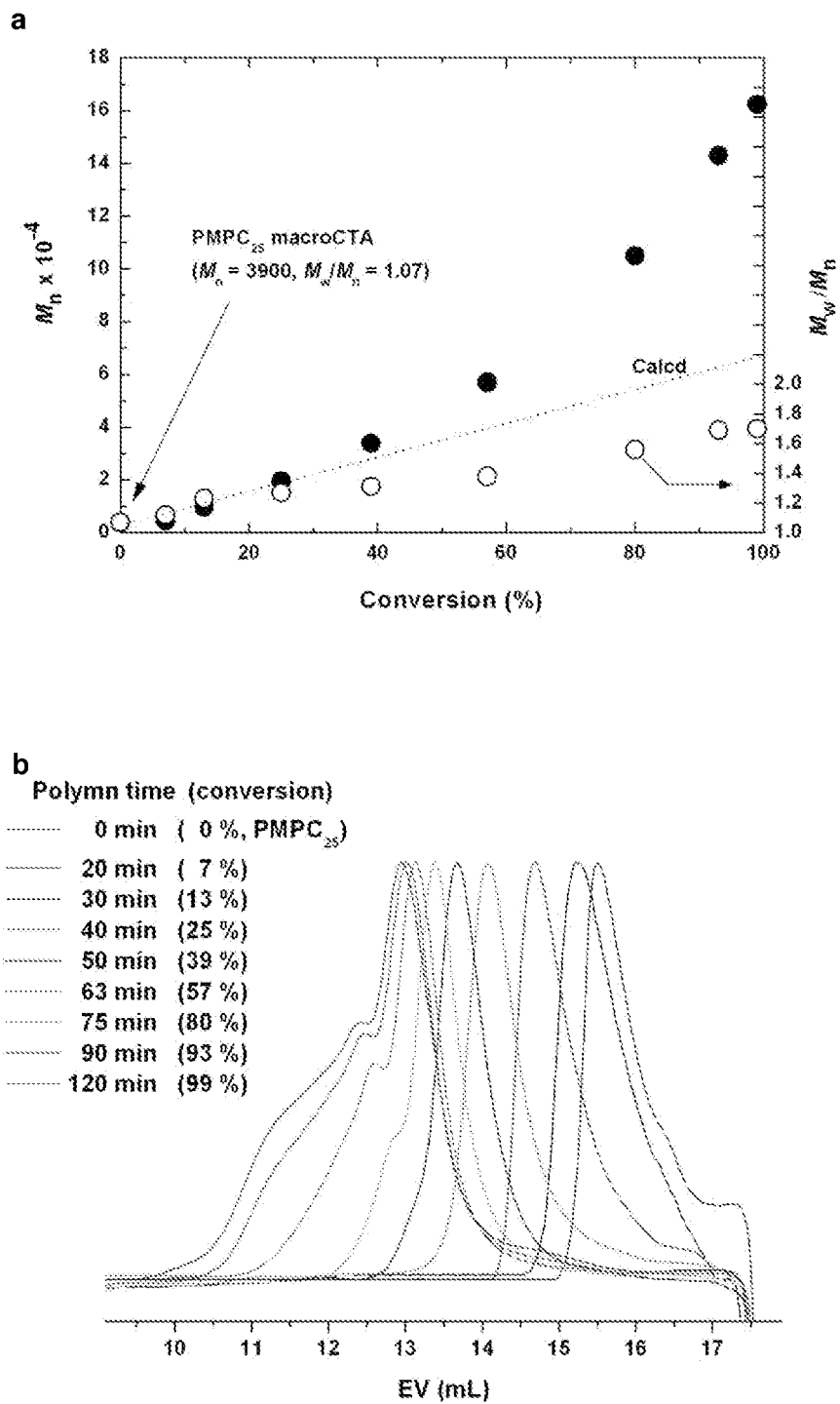

FIG. 23 shows HPMA polymerisation kinetic data obtained using $PMPC_{25}$ macroCTA. (a) Evolution of $M_n$ and $M_w/M_n$ with conversion and (b) GPC curves for the RAFT dispersion polymerisation of HPMA using the $PMPC_{25}$ macroCTA for a target degree of polymerisation of 400 in water at 70° C.: $PMPC_{25}$ macro-CTA (0.25 g, 0.0326 mmol); $[PMPC_{25}$ macro-CTA$]_0/[V-501]_0$=4.0; solids content=25 w/w %.

Initially, the reaction solution was transparent. However, as the polymerisation proceeded, the aqueous phase gradually became more turbid (the pink colour derived from the RAFT CTA was retained) and the solution viscosity increased, passing through a maximum after around 60-65 minutes as the PHPMA chains continued to grow (Figure S14); the HPMA polymerisation was essentially complete within 2 h.

Figure 24:
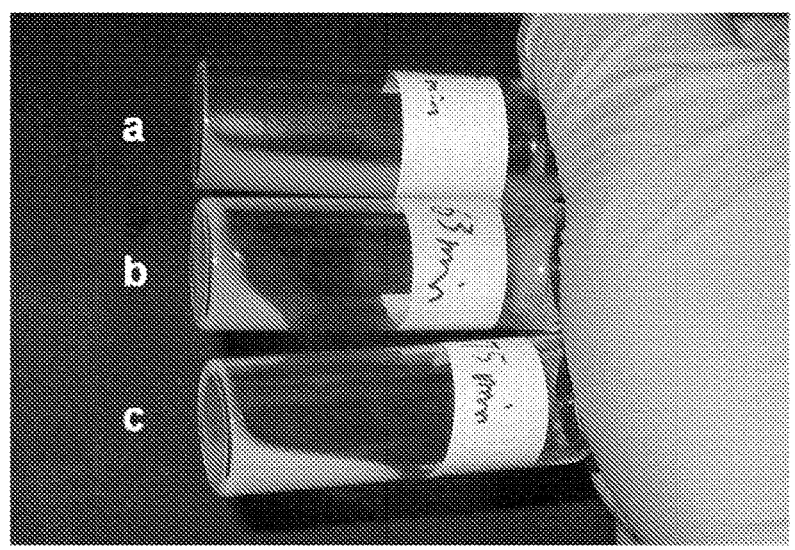

FIG. 24 shows changes in solution viscosity during aqueous dispersion polymerisation. a-c, Digital photographs obtained for inclined sample tubes of PMPC-PHPMA block copolymer solutions after quenching at the following polymerisation times: (a) 50 min, (b) 63 min, and (c) 75 min. These three samples exhibit sphere, worm/rod and vesicle morphologies after 50, 63, and 75 min, respectively. For polymerisation conditions, see Figure S13. The solution viscosity observed at 63 min is the highest for these three samples and corresponds to the worm/rod phase.

TEM studies confirmed that the block copolymer morphology changed from spheres to worms to vesicles during the polymerisation, as expected. Moreover, if the monomer conversion obtained by NMR at any given time is used to estimate the mean DP for the PHPMA block, then the block copolymer morphology observed by TEM corresponds to that expected from the phase diagram shown in FIG. 17, thus the co-solvent effect of the HPMA monomer on the block copolymer morphology is negligible. Finally, for the rod phase observed after 63 min (conversion=55%, which approximately corresponds to $M_{25}H_{220}$ on the basis of $^1$H NMR spectroscopy), the mean TEM inner rod core width was 21 nm. Moreover, both toroids and loops are clearly present in this sample, which may represent important intermediates in the worm/rod-to-vesicle transition.

Example 22

PGMA-PHPMA—Latex Synthesis and Alternative Morphologies

This example provides mechanistic insights into the sphere-to-worm and worm-to-vesicle transitions, occurring during polymerisation, through monitoring intermediate morphologies formed during the growth of the water-insoluble PHPMA chains when generating PGMA-PHPMA block copolymers.
i) Materials
Glycerol monomethacrylate (GMA; 99.8%) was donated by Cognis Performance Chemicals (Hythe UK) and used without further purification. 2-Hydroxypropyl methacrylate (HPMA) was donated by Cognis Performance Chemicals and was also purchased from Aldrich; in each case monomer was passed through a DHR-4 inhibitor removal column (Scientific Polymer Products, Ontario, USA) prior to use. 2-Cyano-2-propyldithiobenzoate (CPDB), 4,4'-azobis(4-cyanopentanoic acid) (ACVA; V-501; 99%) $D_2O$, $CDCl_3$, anhydrous ethanol (99%) and dialysis tubing (1 kD molecular weight cut-off) were purchased from Aldrich and were used as received. In the case of the CPDB, the manufacturer's stated purity was 97% but $^1$H NMR analysis indicated a purity of only 75%. This reduced purity was taken in account when calculating the target degree of polymerisation for the PGMA block. The water-soluble internal standard used in the NMR experiments, sodium 2,2 dimethyl-2-silapentane-5-sulphonate (DSS) and $CD_3OD$ were purchased from Goss Scientific (Nantwich, U.K.). All solvents were of HPLC quality and purchased from Fisher.
ii) RAFT Homopolymerisation of GMA (Synthesis of Macro-CTA)
CPDB RAFT agent (1.5 mmol, 0.33 g) and GMA monomer (89.6 mmol, 14.35 g) were weighed into a 50 mL round-bottomed flask and purged under $N_2$ for 20 min. ACVA (0.30 mmol, 83.7 mg, CTA/ACVA molar ratio=5:1) and anhydrous ethanol (40 w/v %), which had been purged with $N_2$ for 30 min, were then added and the resulting red solution was purged for a further 10 min. The sealed flask was immersed into an oil bath set at 70° C. for 80 min (GMA conversion ~50%) and quenched in liquid nitrogen. Methanol (50 mL) was added to the reaction solution, followed by precipitation into a ten-fold excess of cyclohexane (1 L). The precipitated PGMA macro-CTA was washed three times with cyclohexane, then dialysed against methanol overnight (with three changes of methanol).
iii) Aqueous Dispersion Polymerisation of HPMA (In Situ Experiments)
A typical protocol for in situ sampling during the synthesis of $PGMA_{47}$-$PHPMA_{160}$ is as follows: $PGMA_{47}$ macro-CTA (0.150 g, 0.019 mmol) and HPMA monomer (0.4462 g, 3.1 mmol, Aldrich) were weighed into a 25 mL round-bottomed flask and purged with $N_2$ for 20 min. ACVA was added (1.8 mg, 0.0063 mmol, CTA/ACVA=3:1) and purged with $N_2$ for a further 5 min. De-ionised water (5.4 mL, 10 w/v %), which had been purged with $N_2$ for 30 min., was then added and the solution was degassed for a further 5 min. prior to immersion in an oil bath set at 70° C. The reaction solution was stirred overnight (~16 h) to ensure complete HPMA monomer conversion.
iv) Aqueous Dispersion Polymerisation of HPMA with Added Dimethacrylate
The RAFT synthesis of a $PGMA_{112}$-$PHPMA_{1000}$ diblock copolymer via aqueous dispersion polymerisation both in the presence and absence of additional 2-methyl-1,3-bismethacryloylethane was conducted and the following example is representative. $PGMA_{112}$ macro-CTA (0.200 g, 0.011 mmol), HPMA monomer (1.5867 g, 11.0 mmol, Aldrich) and 2-methyl-1,3-bismethacryloylethane (0.06 wt %, 0.0010 g, 0.0047 mmol) were weighed into a 25 mL round-bottomed flask and purged with $N_2$ for 20 min. ACVA was added (1.0 mg, 0.0037 mmol, CTA/ACVA molar ratio=3:1) and purged with $N_2$ for a further 5 min. Deionised water (16.1 mL, 10 w/v %), which had been purged with $N_2$ for 30 min., was then added and the solution was degassed for a further 5 min. prior to immersion into an oil bath set at 70° C. The reaction solution was stirred overnight (~16 h) to ensure complete HPMA monomer conversion.
v) Kinetics of the Aqueous Dispersion Polymerisation of HPMA for the Sphere-to-Worm-to-Vesicle Transitions when Targeting $PGMA_{47}$-$PHPMA_{200}$
$PGMA_{47}$ macro-CTA (0.200 g, 0.026 mmol), HPMA monomer (0.7437 g, 5.2 mmol, Aldrich) and sodium 2,2 dimethyl-2-silapentane-5-sulphonate (DSS) (0.0225 g, 0.10 mmol, HPMA/DSS molar ratio=50:1) were weighed into a 25 mL round-bottomed flask and purged with $N_2$ for 20 min. ACVA was added (1.2 mg, 0.004 mmol, CTA/ACVA molar ratio=6:1) and purged with $N_2$ for a further 5 min. De-ionised water (8.5 mL, 10 w/v %), which had been purged with $N_2$ for 30 min., was then added, a sample was immediately taken for $^1$H NMR analysis and the solution was degassed for a further 5 min prior to immersion in an oil bath set at 70° C. The 'zero time' (t=0 min) for this polymerisation was arbitrarily taken to be the point when the degassed reaction solution was first immersed in an oil bath set at 70° C., rather than the time taken for the reaction solution to attain this temperature. Aliquots were then removed via syringe at various time intervals for $^1$H NMR and TEM analysis. $^1$H NMR samples were quenched by dilution in $D_2O$, rapid cooling to 20° C. and freezing in liquid $N_2$. Monomer conversions were normalised using the DSS as an internal standard and are expressed relative to the ratio of monomer to DSS observed at 'zero time'. For TEM analysis, aliquots were diluted fifty-fold with water at 20° C. to generate 0.20 wt % dispersions.
vi) Characterisation Methods
$^1$H NMR. All NMR spectra were recorded on a 400 MHz Bruker Avance-400 spectrometer.
Gel Permeation Chromatography (GPC). Copolymer molecular weights and polydispersities were determined using a DMF GPC set-up operating at 60° C. and comprising two Polymer Laboratories PL gel 5-μm Mixed-C columns connected in series to a Varian 390-LC multi-detector suite (refractive index detector) and a Varian 290-LC pump injection module. The GPC eluent was HPLC grade DMF containing 10 mM LiBr at a flow rate of 1.0 mL min$^{-1}$. DMSO was used as a flow-rate marker. Calibration was conducted using a series of ten near-monodisperse poly (methyl methacrylate) standards ($M_n$=625-618,000 g mol$^{-1}$). The chromatograms were analysed using Varian Cirrus GPC software (version 3.3).

Dynamic Light Scattering. Intensity-average hydrodynamic diameters of the dispersions were obtained by DLS using a Malvern Zetasizer NanoZS instrument. Aqueous dispersions of 0.20 w/v % were analysed using disposable cuvettes and all data were averaged over three consecutive runs.

Transmission Electron Microscopy (TEM). Aggregate solutions were diluted fifty-fold at 20° C. to generate 0.20 w/v % dispersions. Copper/palladium TEM grids (Agar Scientific) were surface-coated in-house to yield a thin film of amorphous carbon. The grids were then plasma glow-discharged for 30 seconds to create a hydrophilic surface. Individual samples (0.20 w/v %, 12 µL) were adsorbed onto the freshly glow-discharged grids for one minute and then blotted with filter paper to remove excess solution. To stain the aggregates, uranyl formate (0.75 w/v %) solution was added to the sample-loaded grid as a 9 µL droplet for 20 seconds and then carefully blotted to remove excess stain. The grids were then dried using a vacuum hose. Imaging was performed on a Phillips CM100 instrument at 100 kV, equipped with a Gatan 1 k CCD camera.

vii) Discussion

Poly(glycerol monomethacrylate) (PGMA) was chosen as the hydrophilic block due to both its excellent water solubility at elevated temperatures and biocompatibility. The RAFT polymerisation of GMA was conducted in ethanol at 70° C. using CPDB as the chain transfer agent (CTA), to generate a PGMA macro-CTA. In order to retain dithiobenzoate end-group fidelity, the GMA polymerisation was terminated at 50% conversion by quenching in liquid nitrogen. This approach led to the generation of a near-monodisperse PGMA$_{47}$ macro-CTA ($M_w/M_n$=1.13) after purification (FIG. 25).

Figure 25:
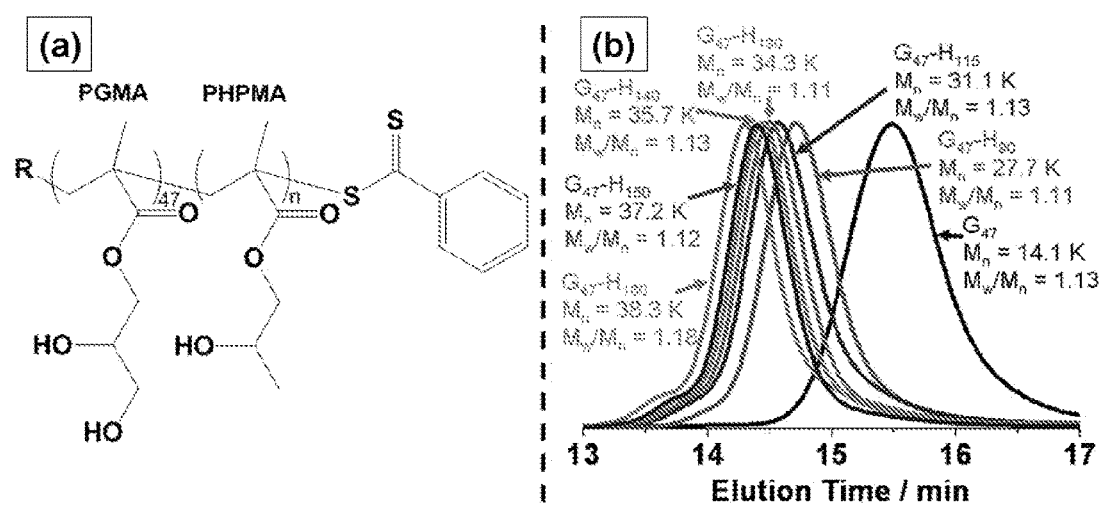

FIG. 25 shows (a) Chemical structure of the poly(glycerol monomethacrylate)-poly(2-hydroxypropyl methacrylate) (PGMA$_m$-PHPMA$_n$) diblock copolymers synthesised by RAFT under aqueous dispersion polymerisation conditions at 70° C. using CPDB as the CTA. (b) DMF gel permeation chromatograms obtained for a series of six PGMA$_{47}$-PHPMA$_x$ diblock copolymers (and the corresponding PGMA$_{47}$ macro-CTA) synthesised via RAFT aqueous dispersion polymerisation at 70° C. and 10 w/v % solids.

This PGMA$_{47}$ macro-CTA was then utilised for the in situ aqueous dispersion polymerisation of HPMA at 10 w/v % to produce a series of $G_{47}$-$H_x$ diblock copolymers (where G denotes GMA, H denotes HPMA and x=90, 115, 130, 140, 150 and 160). In order to achieve HPMA conversions of more than 99% (as judged by $^1$H NMR), polymerisations were conducted for around 16 h at 70° C. (although after 2 h over 99% HPMA conversion is measured).

The $G_{47}$-$H_x$ diblock copolymers were analysed using gel permeation chromatography (GPC) (FIG. 25b). Near-monodisperse diblock copolymers were obtained ($M_w/M_n$<1.18) with very high blocking efficiencies (no PGMA macro-CTA contaminant is observed in the diblock copolymer GPC traces). GPC molecular weights increase monotonically as longer PHPMA blocks are targeted, as expected. We emphasise that these results are a significant improvement on our initial report, in which much higher polydispersities were observed ($M_w/M_n$=1.55, 2.21 and 3.63 for $G_{65}$-$H_x$, where x=100, 200 & 300) as well as macro-CTA contamination[55]. Our improved blocking efficiency is likely to be due to restricting the GMA conversion during the synthesis of the PGMA macro-CTA, which ensures greater chain-end functionality. However, HPMA monomer is known to contain a dimethacrylate impurity, 2-methyl-1,3-bismethacryloyl ethane[42]. This contaminant inevitably leads to some branching of the PHPMA chains[55], resulting in much higher polydispersities and high molecular weight shoulders in the GPC traces. In the present work, uv HPLC analysis indicated a dimethacrylate impurity of 0.11 mol % in HPMA sourced from Aldrich. This is significantly lower than the HPMA batch sourced from Cognis reported by Li and Armes[55], which had a dimethacrylate content of 0.26 mol %. To examine the effect of these differing levels of dimethacrylate impurity in our aqueous dispersion polymerisation formulation, $G_{112}$-$H_{1000}$ was synthesised using both the Aldrich and Cognis batches of HPMA. Here a relatively high degree of polymerisation for the core-forming block was deliberately targeted in order to exacerbate the branching problem. GPC analysis indicates that the final polydispersity of $G_{112}$-$H_{1000}$ synthesised using Aldrich HPMA is 1.48, whereas that obtained with Cognis HPMA is 2.75 (with the latter sample having a prominent high molecular weight shoulder in its GPC trace). Moreover, 'spiking' the Aldrich HPMA batch with 0.06 wt. % 2-methyl-1,3-bismethacryloyl ethane (prepared by reacting HPMA with methacrylic anhydride) resulted in a final copolymer polydispersity of 3.10, which is close to that observed for $G_{47}$-$H_{1000}$ prepared using the Cognis HPMA batch. Thus these control experiments confirm the importance of dimethacrylate content in determining copolymer polydispersity in this study. It is emphasised that, provided the target degree of polymerisation for the PHPMA block is less than 310, then the final copolymer polydispersities are always less than 1.20 when using Aldrich-sourced HPMA. Thus this batch was used for the rest of this study.

The resulting PGMA$_{47}$-PHPMA$_x$ particles were subsequently analysed by TEM and DLS to assess their morphology (see FIG. 26).

Figure 26:
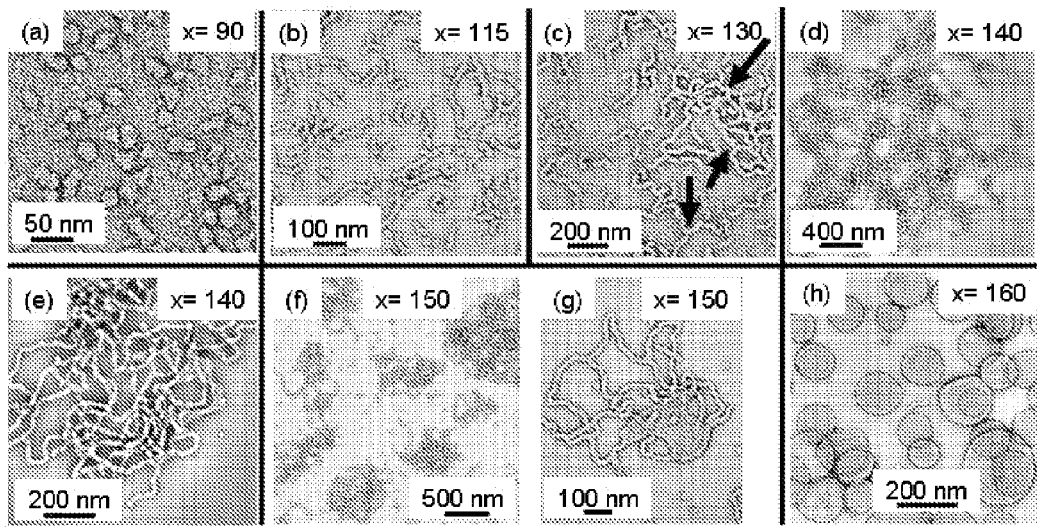

FIG. 26 shows representative TEM images of the series of six PGMA$_{47}$-PHPMA$_x$ diblock copolymers, where x corresponds to (a) 90, (b) 115, (c) 130, (d, e) 140, (f, g) 150 and (h) 160. Systematically increasing the PHPMA block length leads to structural evolution from spherical micelles to worm-like micelles to vesicles, as expected due to the progressive reduction in molecular curvature.

$G_{47}$-$H_{90}$ generated exclusively spherical micelles (intensity-average diameter, d=20 nm by DLS; see FIG. 26a). Increasing the targeted PHPMA block length leads to a mixture of (mainly) short, linear worm-like micelles and some remaining spherical micelles for $G_{47}H_{115}$ (see FIG. 26b). Targeting a block composition of $G_{47}$-$H_{130}$ leads to longer worm-like micelles, with some worms now containing y-junctions or 'branch points' (as indicated by arrows; see FIG. 26c). A modest increase of just ten HPMA units results in the generation of highly branched, worm-like micelle networks for $G_{47}$-$H_{140}$ (FIGS. 26d, 26e). $G_{47}$-$H_{150}$ forms an intriguing intermediate phase comprising highly branched worm-like micelles that have partially coalesced to form nascent bilayers (FIGS. 26f and 26g). This observation provides a useful insight regarding the mechanism of vesicle formation (see later). Finally, a pure vesicle phase is observed when targeting $G_{47}$-$H_{160}$. This is unsurprising, as the reduction in molecular curvature obtained when targeting longer PHPMA chains now favours bilayer formation, with vesicles being the three-dimensional manifestation of curved bilayers. In a further experiment, vesicles were also formed by $G_{47}$-$H_{310}$, which suggests that this synthesis route allows the facile preparation of vesicles with tunable membrane thicknesses.

Interestingly, the physical properties of the aqueous dispersions formed by each $G_{47}$-$H_x$ copolymer at 10 w/v % solids differ significantly, depending on the particle morphology.

Figure 27:
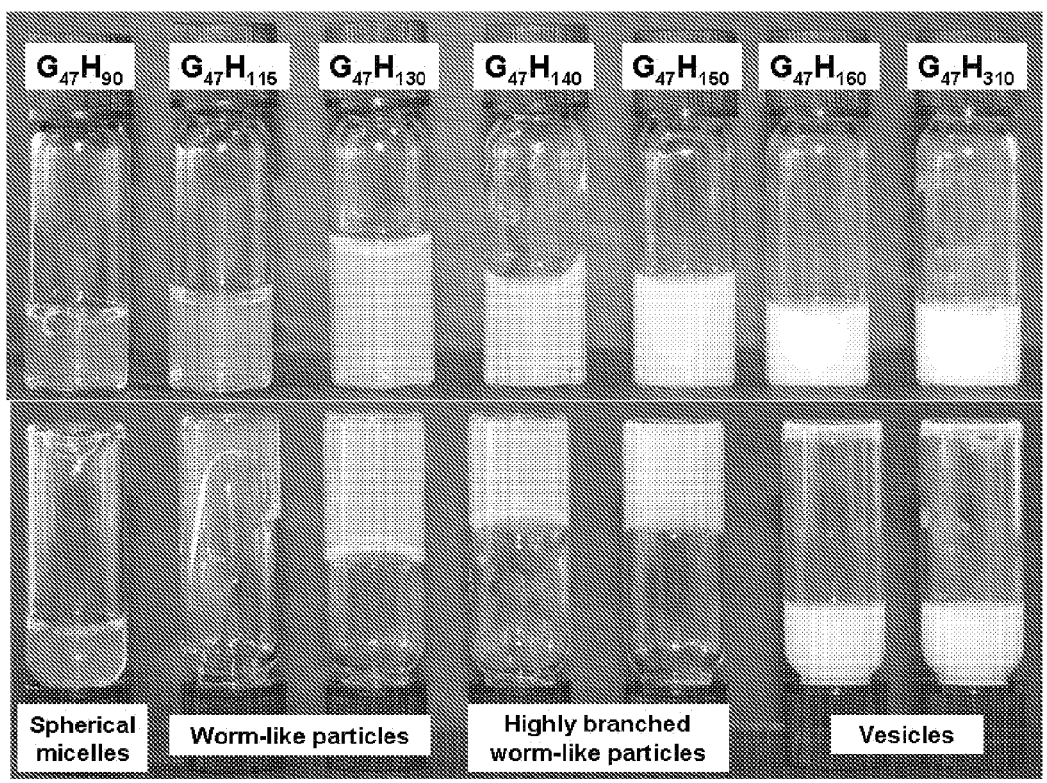

FIG. 27 shows a digital photograph illustrating the physical appearance (fluid or gel) of 10 w/v % aqueous dispersions of a series of PGMA$_{47}$-PHPMA$_x$ (x=90 to 310) diblock copolymers. No gelation was observed at the polymerisation temperature of 70° C., but on cooling to 20° C. the worm-like micelles form soft, free-standing gels (note inverted tubes), whereas the dispersions comprising spheres ($G_{47}H_{90}$) and vesicles ($G_{47}H_{160}$ and $G_{47}H_{310}$) remain free-flowing. The pink colouration is due to the RAFT chain transfer agent at the end of the copolymer chains.

As expected, the solution becomes progressively more turbid for the higher-order aggregates, due to additional light scattering (see FIG. 27). However, in the case of the worm-like micelles, the stirred reaction solutions remain fluid at 70° C. but form soft, free-standing gels at 10 w/v % after cooling to 20° C. and leaving to stand for at least 16 h (see FIG. 27). This suggests that gelation is due to inter-worm entanglements. Preliminary rheological studies (data not shown) indicate that these gels are shear-thinning, suggesting that magnetic stirring during polymerisation provides sufficient shear to inhibit gelation. Moreover, increased branching of the worm-like micelles produces stronger gels, presumably due to additional entanglements. The relatively short, linear worms formed by $G_{47}$-$H_{115}$ produce only a relatively weak gel, which slowly flows upon tube inversion (see FIG. 27).

To assess the in situ structural evolution that occurs when the $G_{47}$-$H_{200}$ copolymer forms vesicles at 10 w/v % and 70° C., the polymerising solution was sampled periodically, quenched by a fifty-fold dilution with water at 20° C. and subsequently analysed by TEM. In this experiment, the macro-CTA/initiator molar ratio was increased from three to six. This has the effect of reducing the rate of polymerisation, which facilitates sampling of the reaction solution.

Figure 28:
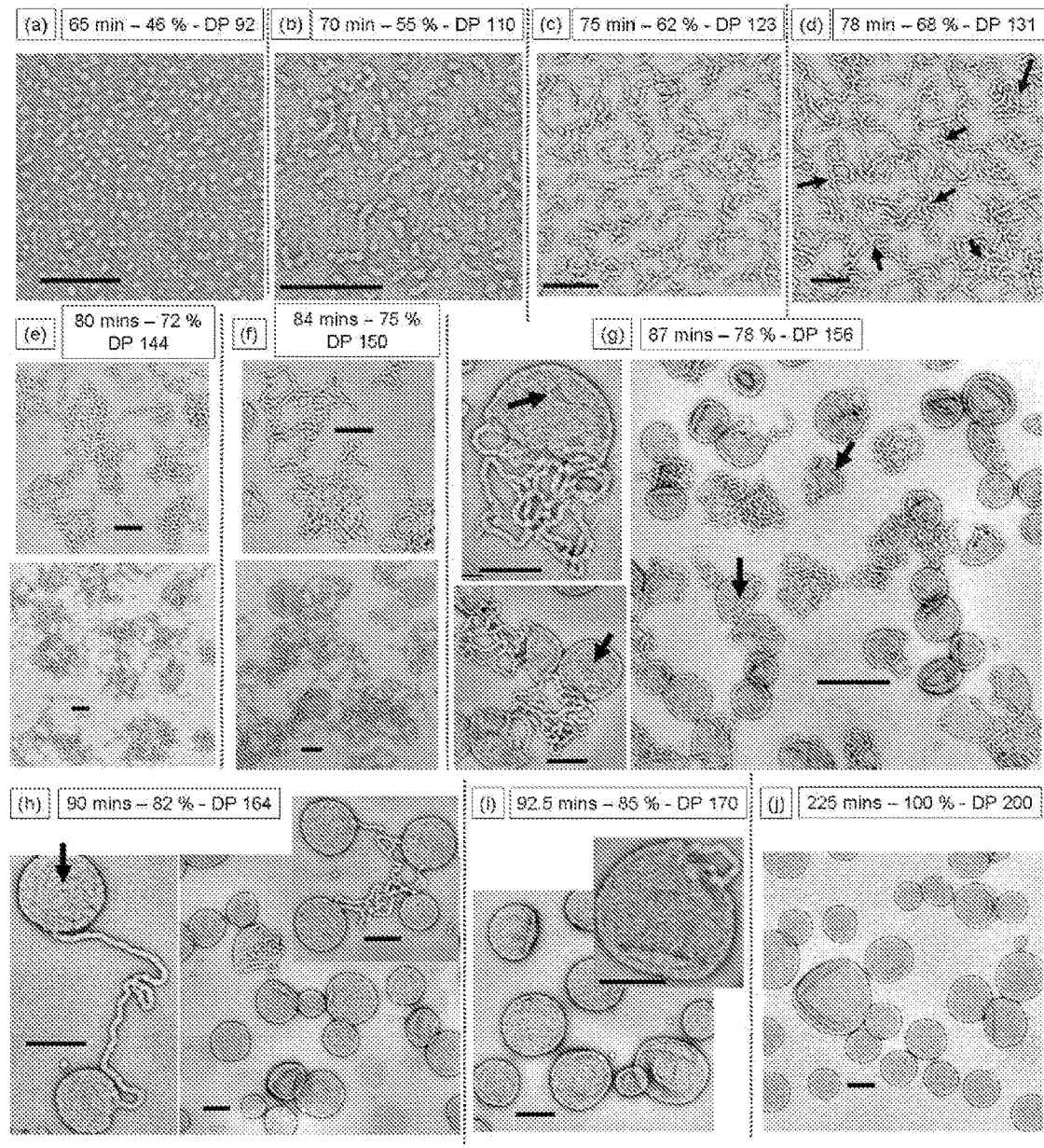

FIG. 28 shows transmission electron micrographs (TEM) of the various nanostructures (spheres, short worms, long worms, branched worms, jellyfish and vesicles) generated in situ at various time intervals when targeting a diblock copolymer composition of PGMA$_{47}$-PHPMA$_{200}$ by RAFT aqueous dispersion polymerisation at 70° C. and 10 w/v % solids. HPMA monomer conversions and the corresponding mean degrees of polymerisation for the PHPMA chains are stated for each image. Each scale bar represents 200 nm.

Initially, no turbidity was visible by eye for the HPMA polymerisation. However, at around 60 min a blue colouration is observed in the reaction medium, which is indicative of the onset of aggregation. At 65 min (or 46% conversion, corresponding to $G_{47}$-$H_{92}$) spherical micelles are observed by both DLS (20 nm diameter) and TEM analysis (See FIG. 28a). A mixture of spherical micelles and very short worm-like micelles are formed after 70 min (55% conversion; $G_{47}$-$H_{110}$). Upon closer inspection of FIG. 28b, these short worms seem to be formed by the fusion of spherical micelles into dimers and trimers. Both spherical micelles and linear worm-like micelles are still present after 75 min (62% conversion; $G_{47}$-$H_{123}$), but the former are reduced in number while the latter become more anisotropic (see FIG. 28c). After 78 min (68% conversion; $G_{47}$-$H_{131}$) worm-like micelles constitute the primary morphology, with minimal evidence for spherical micelles. However, at this point the worms begin to form branch points (primarily y-junctions; see arrows in FIG. 28d). A further morphological development occurs after 80 min (72% conversion; $G_{47}$-$H_{144}$). The number of worm branch points now increases significantly, with worm clustering observed (see FIG. 28e). FIG. 28f shows how these highly-branched micellar 'mesh' structures begin to develop bilayer-type characteristics, whereby the micelle 'arms' protrude from the nascent bilayers after 84 min (75% conversion; $G_{47}$-$H_{150}$). Perhaps the most striking nano-structures are observed after 87 min (78% conversion; $G_{47}$-$H_{156}$) (see FIG. 28g). Most of the aggregates observed here are intermediate structures between highly-branched worm-like micellar networks and the final vesicular morphology. There are many examples of 'jellyfish' structures with various degrees of complexity, octopi-type bilayer aggregates and vesicles. In essence, the jellyfish are hemispherical vesicles with worm-like micelles protruding from the periphery and this phase appears to be the last stage before vesicle formation. Further HPMA conversion after 90 min (82% conversion; $G_{47}$-$H_{164}$) leads to mainly vesicles. However, there is some evidence for the jellyfish-type structures in the form of vesicles with inter-connecting worm-like micelle arms (see FIG. 28h). At 92.5 min (85% conversion; $G_{47}$-$H_{170}$) almost pure vesicles are obtained, with no jellyfish structures observed (see FIG. 4i). There is now only minimal evidence for any final pre-vesicle intermediate structures, with those observed having nominal complexity (see inset FIG. 28i). After 225 min (~100% conversion; $G_{47}$-$H_{200}$) full conversion of the HPMA monomer is attained, leading to a pure vesicular phase (see FIG. 28j).

One very important observation is that, for the kinetic study of structural evolution during the synthesis of $G_{47}$-$H_{200}$, the in situ morphologies obtained at a given time (and hence mean DP for the growing PHPMA block) correspond closely to the final post mortem morphologies observed at full conversion when targeting the equivalent DP. For example, spherical micelles are obtained when targeting $G_{47}$-$H_{90}$ (see FIG. 26a), which is the same morphology as that observed after 65 min (or 46% conversion, which corresponds to an in situ block composition of $G_{47}$-$H_{92}$) during the synthesis of $G_{47}$-$H_{200}$. Similarly, worm-like micelles are observed for $G_{47}$-$H_x$ diblocks at full conversion, where x=115, 130 and 140 (see FIGS. 26b-26e). Hence, for the in situ synthesis of $G_{47}$-$H_{200}$, worm-like micelles should be expected at reaction times of 75 to 78 min (62% conversion, DP=123 and 68% conversion, DP=131, respectively) and this anisotropic morphology is indeed observed. Furthermore, the highly branched, partially coalesced worms observed for $G_{47}$-$H_{150}$ at full conversion are also obtained after 80 to 87 min (72-78% conversion, $G_{47}$-$H_{144-156}$). Finally, only vesicles are obtained for $G_{47}$-$H_{160}$ at full conversion (see FIG. 2f) and this is also the only phase observed for reaction times exceeding 90 min (82% conversion, $G_{47}$-$H_{164}$) when targeting $G_{47}$-$H_{200}$.

This structural evolution of spheres to worms to vesicles (via various intermediate structures) is due to the progressive reduction in molecular curvature during the synthesis of $G_{47}$-$H_{200}$[58,59]. Initially, the relatively high copolymer curvature leads to the formation of spherical micelles. As the PHPMA chains increase in length, it appears that the spheres undergo micellar fusion resulting in the formation of micellar dimers and trimers (see FIG. 28b). Further decreasing the copolymer curvature with higher HPMA conversion leads to the evolution of worm-like micelles (see FIG. 28c). However, various studies of the aqueous self-assembly of amphiphilic block copolymers indicate that micellar fusion does not occur, even when curvature favours mixing[60,61]. Moreover, in these cases the aggregates are non-ergodic, with little or no exchange of individual copolymer chains occurring between these kinetically frozen structures. Nevertheless, there are also literature examples detailing the fusion of spherical micelles into higher order structures (such as worms), as highlighted by Denkova et al.[62]. It has also been demonstrated that unimer exchange can occur between copolymer aggregates (with mediating interactions), which can aid micellar fusion[63]. These apparently contradictory findings reflect significant differences in the chemical structure (and hence hydrophobic character) of the core-forming block.

The non-ergodic aggregates mentioned above were based on highly hydrophobic polybutadiene-based block copolymers[60,61]. In this case the core-forming block has negligible hydration and this, when coupled with coronal repulsion, prevents micellar fusion. However, micellar fusion has been observed for significantly more hydrated core-forming blocks (such as Pluronics™)[63] or when conducting a 'solvent-switch'[64]. Micellar fusion appears to be aided by the presence of a co-solvent, whether ethanol in the case of the Pluronic™ copolymer[63], or 1,4-dioxane for a polystyrene-poly(acrylic acid) (PS-PAA) diblock copolymer[64]. These observations suggest that micellar fusion can be achieved by partial solvation of the core-forming chains. Furthermore, it has been reported that fusion can be facilitated by unimer exchange.[45] In the present invention, the PHPMA chains are relatively solvated by the HPMA monomer at intermediate conversions and hence are presumably highly mobile. Moreover, the hydroxyl groups on this core-forming block ensure at least some degree of hydration by the water, particularly at shorter block lengths[45]. Hence the sphere-to-worm transition is favored during PGMA-PHPMA copolymer synthesis, possibly through both sphere fusion and unimer exchange.

However, as the HPMA monomer is progressively used up, the PHPMA chains become less mobile (but never immobile, since the reaction temperature is always higher than the $T_g$ of the core-forming PHPMA block). Hence, if this polymerisation is sampled at intermediate conversions, dilution of each extracted aliquot causes any unreacted water-miscible HPMA monomer to immediately diffuse into the aqueous continuous phase, thus quenching the polymerisation. Since rapid cooling to 20° C. also occurs during sampling, the intermediate particle morphology is rendered non-ergodic (i.e. frozen) and is hence preserved.

Further HPMA conversion leads to longer worms and the formation of branch points (y-junctions). According to the literature, such branching is due to a reduction in molecular curvature and apparently is favoured at higher copolymer molecular weights[60,65,66]. Partial coalescence of these branch points then occurs at higher monomer conversions (see FIGS. 28e & 28f and FIG. 29).

Figure 29:
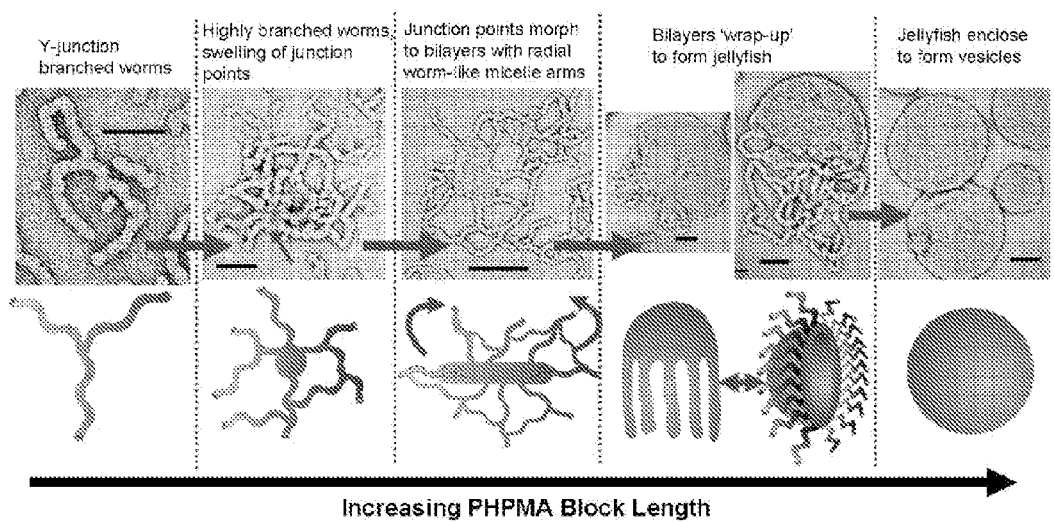

FIG. 29 shows a suggested mechanism (supported by TEM images) for the worm-to-vesicle transformation observed during the synthesis of the PGMA$_{47}$-PHPMA$_{200}$ diblock copolymer prepared via RAFT aqueous dispersion polymerisation at 70° C. and 10 w/v % solids. Each scale bar represents 100 nm.

This structural rearrangement leads to the formation of 'pseudo bilayers' with many radial worms, generating octopus-like structures (see FIGS. 28f and 29). Similar octopus-like morphologies have been previously reported for a binary mixture of two poly(ethylene oxide)-polybutadiene diblock copolymers[60]. Individually, these copolymers generate either worms or vesicles, whereas a binary mixture can produce octopus-like structures at certain compositions. The present work suggests that this high order structure is an intrinsic intermediate morphology between worms and bilayers formed by polymerisation-induced self-assembly of a single copolymer, as well as for a binary mixture of two diblock copolymers.

At intermediate HPMA conversions, the growing PHPMA chains within the micellar aggregates are solvated by excess monomer and hence are presumably highly mobile. As chain growth leads to a reduction in molecular curvature, the particle morphology progressively evolves from spheres to higher order nano-structures (worms or vesicles). As the HPMA monomer is progressively used up, the PHPMA chains become less mobile. Hence, if this polymerisation is sampled at intermediate conversions, dilution of each extracted aliquot causes any unreacted water-miscible HPMA monomer to immediately diffuse into the aqueous continuous phase, thus quenching the polymerisation. Since rapid cooling to 20° C. also occurs during dilution, the intermediate particle morphology is rendered non-ergodic (i.e. frozen).

The octopi structures then undergo partial wrap-up and form 'jellyfish' (see FIG. 29) with surface pores and defects that are believed to be due to incomplete worm/bilayer fusion (highlighted by arrows in FIGS. 28g & 28h). As the PHPMA molecular weight increases further, the jellyfish 'tentacles' undergo fusion and, coupled with the closure of the surface pores, vesicular morphologies are generated. FIG. 27h illustrates these final stages, with some vesicles interlinked with remaining worm-arms. However, high conversions (>85%) after 100 min results in the generation of defect-free vesicles (see FIG. 28j).

These observations are consistent with previous studies of the worm-to-vesicle transition when rapidly diluting PS-PAA copolymers in dioxane/water mixtures with further water[67]. A two-step transition was observed, in which the rods/worms first flatten to form lamellae, followed by closing of the lamellae to produce vesicles. Again, these observations are generally consistent with the results presented herein. However, the additional intermediate morphologies observed in the present work, which are only observed over a very narrow range of block compositions, provide an enhanced understanding of the mechanism of vesicle formation. Moreover, our observations suggest that, in principle, these vesicles might be efficiently loaded with various water-soluble actives during their synthesis in concentrated aqueous solution.

Our aqueous dispersion polymerisation formulation offers a number of advantages for polymerisation-induced self-assembly compared to the aqueous emulsion[4b,56,68,70] or alcoholic dispersion[71-75] polymerisation formulations reported in the literature. In the former case, the higher order worm or vesicle phases are typically contaminated with spheres and, although monomer conversions are relatively high, they often do not exceed 97%. Moreover, relatively polydisperse copolymers are often obtained, especially when targeting higher order structures (typical $M_w/M_n$ values range from 1.50 to more than 2.0). In the latter case, the RAFT dispersion polymerisation of styrene in methanol using various macro-CTAs has been reported by Pan and co-workers[71-75]. In this system low polydispersities ($M_w/M_n$<1.25) are routinely achieved and relatively pure phases can be obtained (i.e. solely spheres, worms or vesicles). The gradual evolution of spheres to worms to vesicles was also observed, but none of the complex intermediate morphologies observed herein were reported[73,75]. However, one major disadvantage with this alcoholic formulation are the very low styrene conversions typically obtained, especially given that the initial styrene concentrations are as high as 50 w/w %. For example, final monomer conversions are invariably below 10% when using either a poly(ethylene oxide)[74] or a poly(2-(dimethylamino)ethyl methacrylate)[75] macro-CTA. Thus extremely high molecular weights (e.g. DP=25,000) have to be targeted to obtain sufficiently long core-forming polystyrene chains to drive self-assembly. Clearly, such poor conversions are likely to preclude industrial scale-up of such formulations.

Figure 30:
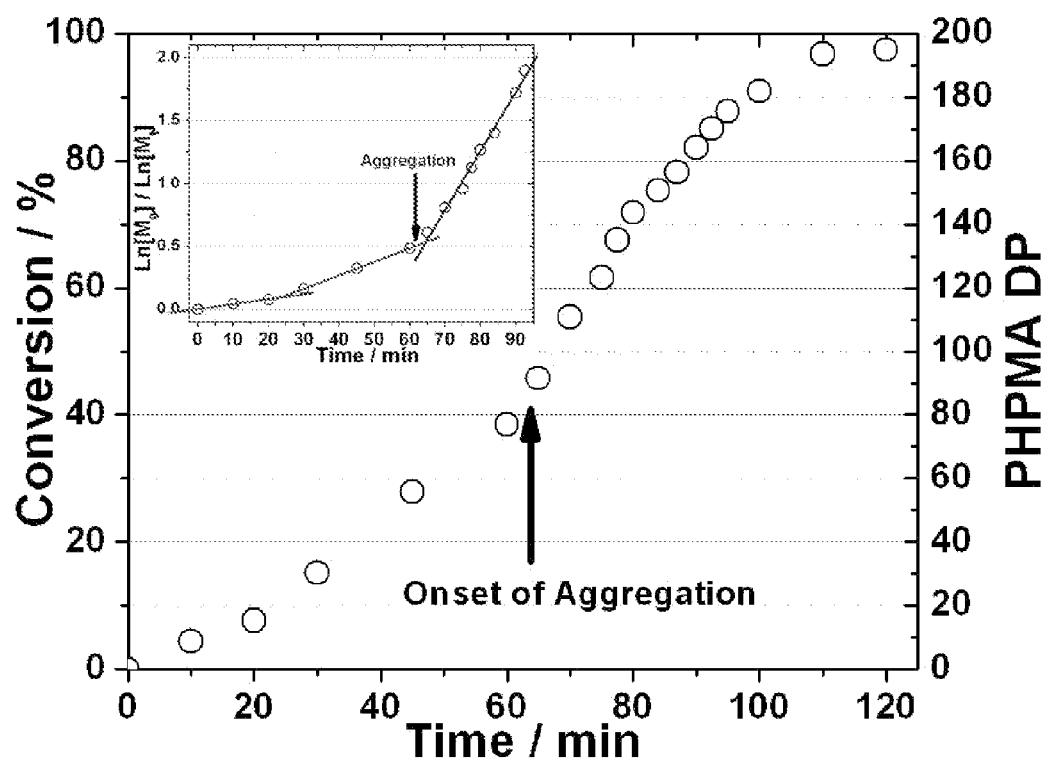

The monomer conversion vs. time plot obtained for the aqueous dispersion polymerisation of HPMA at 70° C. when targeting PGMA$_{47}$-PHPMA$_{200}$ at 10 w/v % provides further mechanistic insight (see FIG. 30).

FIG. 30 shows HPMA polymerisation kinetics obtained for the targeted PGMA$_{47}$-PHPMA$_{200}$ diblock copolymer prepared via RAFT aqueous dispersion polymerisation at 70° C. and 10 w/v %. The inset shows a semi-logarithmic plot for a sub-set of these data, which confirms the rate enhancement observed upon micellar aggregation (as judged by visual inspection).

Three distinct regimes are observed. The first regime (green line, see inset) suggests mild retardation, which is commonly observed (but not fully understood) for RAFT polymerisation[76,77]. From 20 to 60 min (red line) there is an increase in the slope of the semi-logarithmic plot, but just after 60 min the rate of polymerisation increases significantly (blue line). The onset of this third regime corresponds to the appearance of a blue tinge in the reaction solution, which is indicative of micellar aggregation. This interpretation is consistent with our DLS and TEM studies of the in situ polymerisation. Moreover, it is also consistent with earlier work by Madsen et al.[45], who recently reported the self-assembly behaviour of PMPC$_{25}$-PHPMA$_x$ diblock copolymers [PMPC=poly(2-(methacryloyloxy)ethyl phosphorylcholine)] to form PHPMA-core micelles in dilute aqueous solution. For x=39 to 90, only weak aggregation was observed since these relatively short PHPMA chains remain hydrated. However, when x>90 these copolymers form partially dehydrated spherical micelles. It is emphasised that the observed micellar nucleation occurs at a diblock composition of approximately PGMA$_{47}$-PHPMA$_{90}$ in the present study (see right-hand axis in FIG. 30). In this context, we also note that the molecular weight of the MPC repeat unit is approximately twice that of GMA, so PMPC$_{25}$≈PGMA$_{47}$. We suggest that the remaining HPMA monomer quickly enters these nascent micelles and solvates the growing PHPMA chains, thus leading to a relatively high local concentration of monomer and hence an enhanced rate of polymerisation.

Example 23

PMPC$_n$-(PHPMA-EGDMA$_x$) Latex Synthesis and Lumpy Rod Morphologies i) Materials All chemicals were purchased from Aldrich at the highest available purity and were used as received unless otherwise noted. 2-(Methacryloyloxy)ethyl phosphorylcholine (MPC; >99%) was kindly donated by Biocompatibles Ltd. (Farnham, UK). 2-Hydroxypropyl methacrylate (HPMA) was also purchased from Aldrich. This monomer comprises an isomeric mixture of 75 mol % HPMA and 25 mol % 2-hydroxyisopropyl methacrylate.[48] 4,4'-Azobis(4-cyanopentanoic acid) (V-501) was purchased from Aldrich and purified by recrystallisation from methanol. 4-Cyanopentanoic acid dithiobenzoate (CADB) was synthesised according to a literature protocol.[49]

ii) PMPC macroCTA Synthesis and Characterisation

For the synthesis of the PMPC$_{50}$ macroCTA, MPC (14.764 g, 50.0 mmol, 15.0 w/w %), 4-cyanopentanoic acid dithiobenzoate (CTP; 0.280 g, 1.00 mmol), 4,4'azobis(4-cyanopentanoic acid) (V-501, 0.056 g, 0.20 mmol), deionised water (76.045 g), and 5.0 w/w aqueous NaHCO$_3$ solution (6.720 g) were added to a Schlenk flask, which was equipped with a magnetic stir bar. The reaction mixture was then stirred until all the CTP had dissolved in an ice bath. The solution was purged with nitrogen for approximately 30 min and then placed in a pre-heated oil bath at 70° C. The polymerisation was terminated after 3 h for PMPC$_{50}$ and 5 h for PMPC$_{150}$, via rapid cooling in an ice bath and exposure to air. The crude PMPC homopolymer (or PMPC macroCTA) was then purified by dialysis against deionised water using semi-permeable cellulose tubing (SPECTRA/POR, corresponding to a molecular weight cut-off of 1,000) with at least six changes of deionised water, followed by lyophilisation. For the synthesis of the PMPC$_{150}$ macroCTA, essentially the same protocol was adopted, but the synthesis was conducted on a smaller scale. Thus MPC (4.429 g, 15 mmol, 15.0 w/w %), CTP (0.028 g, 0.10 mmol), V-501 (0.0056 g, 0.020 mmol), deionised water (24.342 g), and 5.0 w/w % aqueous NaHCO$_3$ solution (0.672 g) were used in this second formulation. Gel permeation chromatography (GPC) analysis of these two PMPC macro-CTAs was performed using a mixed 3:1 chloroform/methanol eluent, a refractive index detector and a series of near-monodisperse poly(methyl methacrylate) calibration standards (see below for further instrument details). This set-up indicated the following data: $M_n$=10,200 and $M_w/M_n$=1.14 for PMPC$_{50}$ and $M_n$=24,500 and $M_w/M_n$=1.13 for PMPC$_{150}$. The same GPC protocol was also used to assess the molecular weights of the various linear PMPC-PHPMA nanolatexes. The actual mean degrees of polymerisation (DP) of the PMPC$_{50}$ and PMPC$_{150}$ macro-CTAs were determined by $^1$H NMR spectroscopy using the aromatic end-groups of the CTP CTA as a convenient label, which indicates that the CTA efficiency is at least 95%.

iii) PMPC-PHPMA Nanolatex Syntheses

The PMPC$_{50}$ macroCTA (0.50 g, equivalent to 1.69 mmol MPC repeat units) was mixed with V-501 (1.8 mg, 0.0068 mmol; macroCTA/initiator molar ratio=5.0), varying amounts of HPMA (0.4873-1.9492 g, 3.380-13.520 mmol; target DP 100-400), and deionised water (8.884-22.041 g) at 10 w/w % solids concentration in a round-bottomed flask, which was equipped with a magnetic stir bar. These solutions were stirred in an ice-bath until all reagents had dissolved. After sparging with nitrogen for approximately 30 min, each polymerisation was allowed to proceed at 70° C. and then quenched after 24 h via rapid cooling in an ice bath and exposure to air.

iv) PMPC-(PHPMA-stat-EGDMA) 'Lumpy Rod' Syntheses

The PMPC$_{50}$ macroCTA (0.50 g, equivalent to 1.69 mmol MPC repeat units) was mixed with V-501 (1.8 mg, 0.0082 mmol; macroCTA/initiator molar ratio=5.0), HPMA (1.9492 g, 13.520 mmol; target DP 400), varying amounts of EGDMA (4.5 mg-17.9 mg, 0.023-0.090 mmol; 2-8 units per PHPMA chain) and deionised water (22.082-22.202 g) for 10 w/w % solids concentration in a round-bottomed flask, which was equipped with a magnetic stir bar. These solutions were stirred in an ice-bath until all reagents had dissolved. After sparging with nitrogen for approximately 30 min, each polymerisation was allowed to proceed at 70° C. and then quenched after 30 h via rapid cooling in an ice bath and exposure to air.

v) Polymer Characterisation

Molecular weight distributions were assessed by gel permeation chromatography (GPC) using a Hewlett-Packard HP1090 Liquid Chromatograph pumping unit and two Polymer Laboratories PL Gel 5 μm Mixed-C (7.5×300 mm) columns in series with a guard column at 40° C. connected to a Gilson Model 131 refractive index detector. The eluent was a 3:1 v/v % chloroform/methanol mixture containing 2 mM LiBr at a flow rate of 1.0 mL min$^{-1}$. The number-average molecular weight ($M_n$) and $M_w/M_n$ were calculated from GPC curves using near-monodisperse poly(methyl methacrylate) calibration standards. $^1$H NMR spectra were recorded in either D$_2$O or d$_4$-methanol mixture using a Bruker AV1-400 MHz spectrometer. DLS studies were performed using a Zetasizer Nano-ZS instrument (Malvern Instruments, UK) at 25° C. at a scattering angle of 173°. Copolymer solutions/dispersions were prepared at the desired concentration and ultrafiltered prior to dynamic light scattering studies. The intensity-average hydrodynamic diameter and polydispersity of the micelles were calculated by cumulants analysis of the experimental correlation function using Dispersion Technology Software version 5.03. Electrophoresis measurements were also conducted using the same Zetasizer Nano-ZS instrument. Zeta potentials were calculated from mobilities using the Henry equation and determined as a function of solution pH at 25° C. Atomic force microscopy (AFM) measurements were performed using tapping mode at ambient conditions with a Nanoscope IIIa (Veeco Instrument) scanning probe microscope. Samples for AFM imaging were prepared by placing a 20 μL drop of the aqueous dispersion (typically 0.10 wt. % solids) on freshly cleaved mica and allowing it to dry in air at 20° C. Transmission electron microscopy (TEM) studies were conducted using a Philips CM 100 instrument operating at 100 kV equipped with a Gatan 1 k CCD camera. Carbon-coated copper grids were used for TEM measurement and then glow-discharged for 20-30 sec to create a hydrophilic surface. Grids were immersed in aqueous copolymer dispersions for 1 min and then negatively stained by immersion in a 0.75 w/v % uranyl formate solution for 20 s. Each grid was then blotted with filter paper and dried using a vacuum hose.

vi) Discussion

The above methodology demonstrates the synthesis of a new nano-scale morphology based on a cross-linked diblock copolymer, comprising a poly(2-(methacryloyloxy)ethyl phosphorylcholine) (PMPC) stabilising block and a highly cross-linked poly(2-hydroxypropyl methacrylate) (PHPMA) core-forming block using reversible addition-fragmentation chain transfer (RAFT) polymerisation. The highly hydrophilic PMPC block is prepared first and the second PHPMA block is grown in situ under aqueous dispersion polymerisation conditions at 70° C., as described in a recent communication.[55] The relatively high solubility of HPMA monomer in water (around 13% at 25° C.) is critical for the success of such formulations. Conventional spherical micelles are obtained for linear polymerisations, since the growing PHPMA chains become increasingly hydrophobic and hence drive in situ self-assembly. However, the addition of ethylene glycol dimethacrylate (EGDMA) cross-linker leads to a new non-spherical morphology which we have termed 'lumpy rods' (see FIG. 31).

Figure 31:
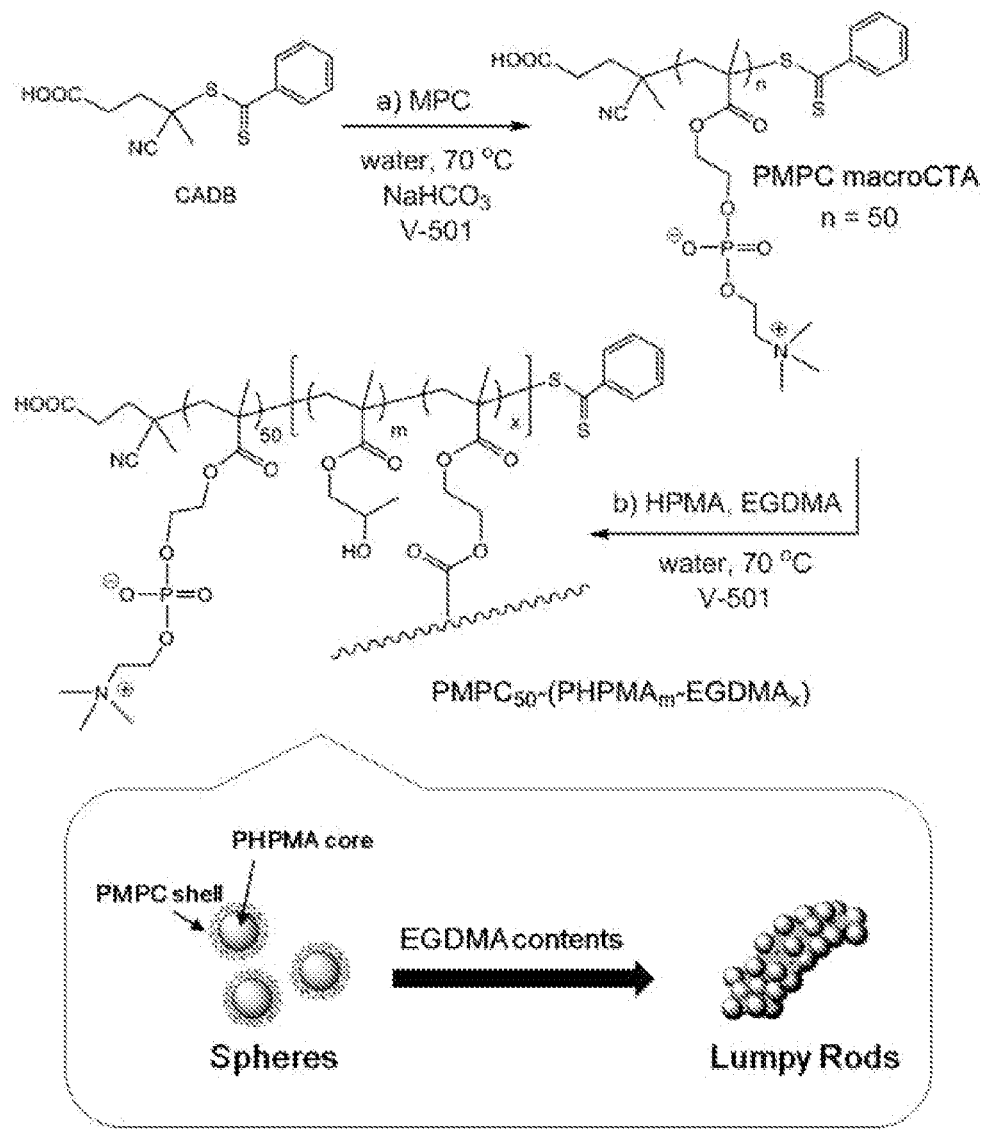

FIG. 31 shows the synthesis of PMPC$_n$-(PHPMA$_m$-stat-EGDMA$_x$) nanoparticles with spherical, worm-like and 'lumpy rod' morphologies by RAFT aqueous dispersion polymerisation at 70° C. In each case the extent of cross-linking dictates the final particle morphology that is obtained.

This concept has also been utilised recently to prepare poly(glycerol monomethacrylate)-PHPMA block copolymer nanolatexes.[55] We recently reported that PMPC-PHPMA block copolymers are highly biocompatible[56] and also exhibit intrinsic anti-bacterial properties,[57] hence these novel 'lumpy rod' particles may have biomedical applications.

First, near-monodisperse PMPC homopolymer was prepared using 4-cyanopentanoic acid dithiobenzoate (CTP) as a RAFT chain transfer agent (CTA) in water at approximately pH 8 using a V-501 azo-based initiator.[78] The RAFT polymerisation of MPC proceeded smoothly and was almost complete after 3 to 5 h for target degrees of polymerisation (DP) ranging from 50 to 150. Actual DP values were estimated by $^1$H NMR spectroscopy using the aromatic RAFT chain-ends as a convenient label and were typically close to those targeted. Furthermore, the final copolymer polydispersities (Mw/Mn) were relatively narrow as judged by gel permeation chromatography (GPC; see Table 3).

TABLE 3

Molecular Characteristics of Linear PMPC-PHPMA Diblock Copolymers Prepared by Aqueous RAFT Dispersion Polymerisation at 70° C.

| Copolymer ID | Actual DP of PMPC$^a$ | Actual DP of PHPMA$^b$ | $M_n$ (kg/mol)$^c$ | PDI$^c$ |
|---|---|---|---|---|
| PMPC$_{50}$ | 53 | N/A | 1.02 | 1.14 |
| PMPC$_{150}$ | 155 | N/A | 2.45 | 1.13 |
| PMPC$_{50}$-PHPMA$_{50}$ | 53 | 50 | 1.99 | 1.20 |
| PMPC$_{50}$-PHPMA$_{100}$ | 53 | 108 | 2.90 | 1.25 |
| PMPC$_{50}$-PHPMA$_{200}$ | 53 | 203 | 4.90 | 1.23 |
| PMPC$_{50}$-PHPMA$_{300}$ | 53 | 296 | 10.90 | 1.48 |
| PMPC$_{50}$-PHPMA$_{400}$ | 53 | 404 | 20.00 | 1.78 |
| PMPC$_{150}$-PHPMA$_{200}$ | 155 | 204 | 6.20 | 1.35 |

$^a$Estimated by $^1$H NMR spectroscopy in D$_2$O using the DP of the PMPC macro-CTA.
$^b$Determined by $^1$H NMR (CD$_3$OD) based on the corresponding PMPC macro-CTA (conversion >99%).
$^c$Determined by GPC (PMMA standards, 3:1 CHCl$_3$:methanol eluent with 2 mM LiCl at 1.0 ml min$^{-1}$)

Using these PMPC homopolymers as so-called 'macroCTAs', the second-stage RAFT copolymerisation of HPMA and EGDMA was conducted under aqueous dispersion polymerisation conditions, with the combined mass of HPMA, EGDMA and PMPC macroCTA being initially fixed at 10 w/w %. For a targeted PMPC$_{50}$-PHPMA$_{400}$ linear diblock copolymer prepared in the absence of any EGDMA, the reaction solution was initially homogeneous, but as the polymerisation progressed the reaction mixture became opaque with no visible signs of precipitation. The hydrodynamic diameter (D$_h$) and polydispersity index ($\mu_2/\Gamma^2$, or PDI) determined by dynamic light scattering (DLS) were monitored as the HPMA polymerisation progressed; the D$_h$ increased progressively up to 145 nm and the PDI was reduced to 0.015, respectively. The final colloidally stable dispersion comprised spherical PHPMA-core micelles (FIG. 32d), whose mean TEM diameter of approximately 132 nm corresponded fairly well with that observed by DLS (allowing for polydispersity effects and the shell of hydrated PMPC chains). For a fixed PMPC block length, the particle dimensions are dictated by the target DP of the core-forming PHPMA block, as expected (see FIG. 32 and Table 3).

Figure 32:
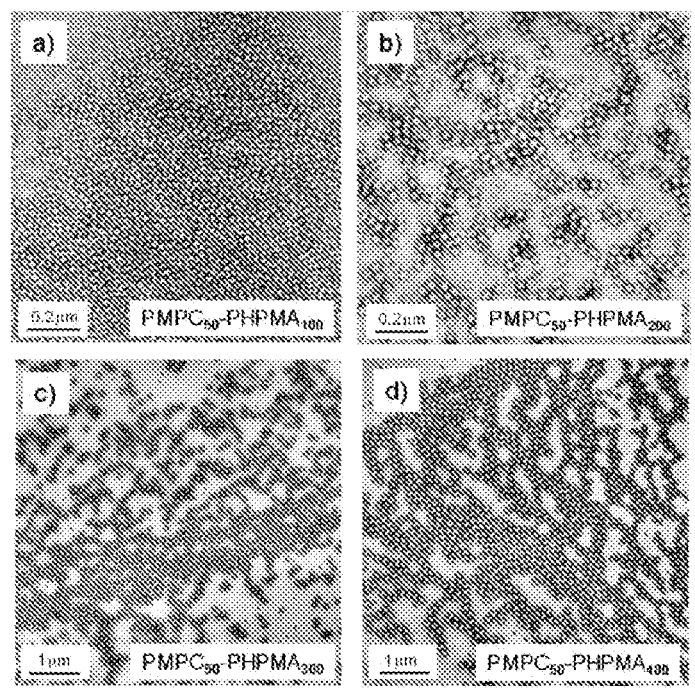

FIG. 32 shows TEM images obtained from linear PMPC$_{50}$-PHPMA$_m$ diblock copolymers prepared by RAFT aqueous dispersion polymerisation at 70° C. Images (a) to (d) have target DP (m) values of 100, 200, 300, and 400.

$^1$H NMR spectra were recorded for the PMPC$_{50}$ macroCTA dissolved in D$_2$O, a RAFT-synthesised PHPMA$_{50}$ homopolymer control in d$_4$-methanol and PMPC$_{50}$-PHPMA$_m$ (m=50 to 400) particles redispersed in both D$_2$O and d$_4$-methanol. All the signals associated with the PMPC$_{50}$ macroCTA are observed in each of the spectra recorded in D$_2$O. In contrast, none of the PHPMA signals are visible in D$_2$O, regardless of the PHPMA block length. Nano-sized particles were detected by DLS for PMPC$_{50}$-PHPMA$_{100}$ (and all longer PHPMA blocks) but not for PMPC$_{50}$-PHPMA$_{50}$, hence a target DP of around 50 for the core-forming block probably corresponds to the threshold value required to drive self-assembly. However, all the proton signals expected for both the PMPC and PHPMA blocks were visible in $^1$H NMR spectra recorded in d$_4$-methanol, since this is a good solvent for both blocks. These $^1$H NMR observations suggest that the PMPC$_{50}$ chains act as the solvated steric stabiliser, while the PHPMA (DP>50) chains form the non-solvated micelle cores.

These block copolymer syntheses were then extended to produce nanoparticles that exhibit a unique non-spherical 'lumpy rod' morphology by conducting the second-stage HPMA polymerisation in the presence of varying levels of EGDMA cross-linker under otherwise identical conditions. At relatively low levels of EGDMA (e.g. 0.50 mol % based on HPMA, or a target block composition of PMPC$_{50}$-(PHPMA$_{400}$-stat-EGDMA$_2$), only spherical nanoparticles were obtained (48 nm diameter by TEM diameter, 52 nm by DLS; see FIG. 32a for a TEM image). After freeze-drying and redissolution in methanol, these lightly cross-linked particles become appreciably swollen; D$_h$=87 nm by DLS. If cross-linking had been unsuccessful, no particles should exist in methanol since both PMPC and PHPMA blocks are soluble in this solvent, hence particle dissociation should occur. However, the sizes observed in both water and in methanol are much smaller than that obtained for the linear PMPC$_{50}$-PHPMA$_{400}$. This is because EGDMA cross-linking leads to increased compaction and reduced hydration of the growing nanoparticles.

Intriguingly, as the EGDMA content is increased from 0.50 up to 1.25 mol %, the DLS particle diameter observed in water increases from 52 to 130 nm.

Figure 33:
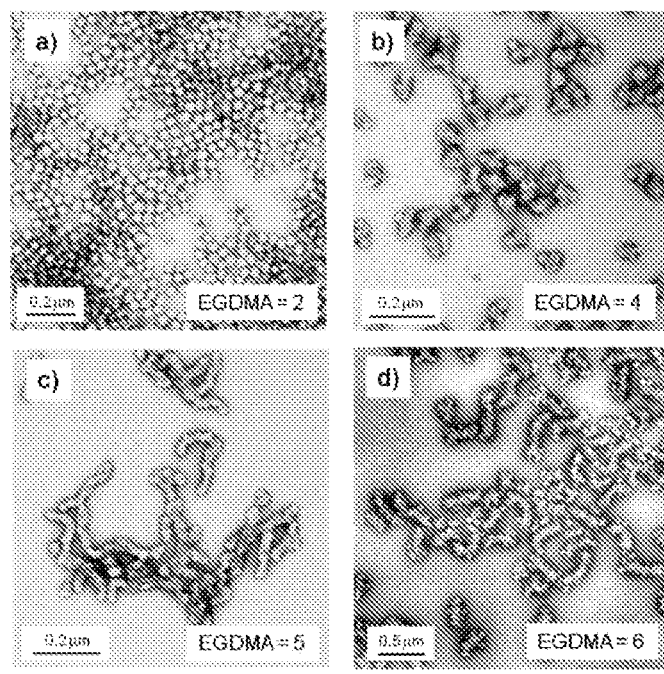

FIG. 33 shows representative TEM images obtained from PMPC$_{50}$-(PHPMA$_{400}$-stat-EGDMA$_x$) prepared by RAFT aqueous dispersion polymerisation at 70° C. Images (a), (b), (c), and (d) were obtained for x=0.50, 1.0, 1.25 or 1.50 mol % EGDMA.

FIG. 33 compares the effect of varying the EGDMA content on the particle morphology. At 1.0 mol % EGDMA, somewhat misshapen nanostructures of relatively low anisotropy were observed (FIG. 33b). Close inspection reveals that each composite particle (or colloidal cluster[79]) is composed of typically 3-5 spherical particles each of approximately 44 nm diameter, which closely corresponds to the size of the lightly cross-linked spherical particles obtained using 0.50 mol % EGDMA. At 1.25 mol % EGDMA, a higher degree of aggregation is observed for these primary particles: a "segmented worm" morphology is observed, with a mean worm width of 43 nm and a characteristic worm length of more than 200 nm in most cases. Again, this observed worm width is consistent with the mean diameter of the lightly cross-linked spheres obtained when using 0.50 mol % EGDMA based on HPMA. At 1.50 mol % EGDMA, a distinctive 'lumpy rod' morphology was observed for PMPC$_{50}$-(PHPMA$_{400}$-stat-EGDMA$_6$) particles, see FIG. 33d. The primary features observed within these highly anisotropic aggregates correspond to the dimensions of the lightly cross-linked spherical particles prepared using 0.50 mol % EGDMA.

The sphere-equivalent DLS diameters of these anisotropic 'lumpy rods' were 241 nm in water and 344 nm in methanol (in the latter case sample preparation simply involved freeze-drying from water, followed by redispersion in methanol). These 'lumpy rod' particles were also deposited onto mica from water at ambient temperature for tapping-mode atomic force microscopy (AFM) studies. The mean height of the 'lumpy rods' on mica is around 90 nm, which is consistent with the TEM image shown in FIG. 33d and suggests that the extent of cross-linking is sufficient to prevent significant particle deformation/flattening occurring on drying. Finally, at 2.0 mol % EGDMA, macro-gelation of the formulation was observed, so the effective upper limit EGDMA content for this particular formulation appears to lie between 1.50 and 2.0 mol %. On the basis of the above observations, introducing an EGDMA cross-linker into the second-stage polymerisation during the synthesis of PMPC$_{50}$-PHPMA$_{400}$ particles via aqueous dispersion polymerisation leads to a range of particle morphologies, with greater levels of cross-linking favouring higher order structures. It is emphasised that, in the case of the 'lumpy rod' morphology, the final particles are colloidally stable in water with no traces of precipitation. Moreover, no morphology changes are observed by TEM even after swelling the 'lumpy rods' in methanol, dialysing against water, freeze-drying overnight, followed by redispersion in water. Furthermore, only the proton signals expected for the PMPC$_{50}$ chains are observed in the $^1$H NMR spectrum recorded for 'lumpy rod' particles redispersed in D$_2$O. In contrast, all the signals expected for both blocks are visible in the $^1$H NMR spectrum recorded in d$_4$-methanol, despite the relatively high level of cross-linking of the PHPMA chains.

Figure 34:
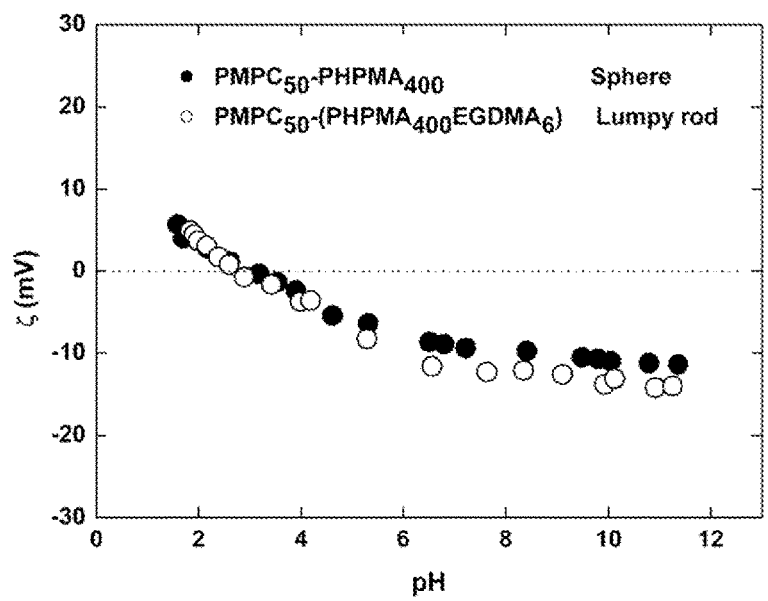

FIG. 34 shows zeta potential vs. pH curves obtained for dilute (ca. 0.1 g/L) aqueous dispersions of spherical linear PMPC$_{50}$-PHPMA$_{400}$ particles and PMPC$_{50}$-(PHPMA$_{400}$-stat-EGDMA$_6$) 'lumpy rod' particles. The similar nature of these electrophoretic curves suggests that the surface compositions of the linear and cross-linked particles are almost identical in aqueous solution.

Aqueous electrophoresis studies of these 'lumpy rod' particles revealed a relatively flat zeta potential vs. pH curve (see FIG. 34), since the zwitterionic nature of the PMPC chains effectively shield the underlying surface charge. To further investigate the influence of cross-linking in this formulation, the effect of systematically varying the polymerisation concentration, the cross-linker type and the DP of the PMPC stabiliser chains was investigated. Unfortunately, reproducible results could not be obtained for PMPC$_{50}$-(PHPMA$_{400}$-stat-EGDMA$_6$) syntheses conducted at 20 w/w % due to the limited water solubility of the EGDMA comonomer under these conditions. However, for syntheses conducted at 5.0 w/w %, spherical particles with a mean TEM diameter of approximately 42 nm were reproducibly obtained for PMPC$_{50}$-(PHPMA$_{400}$-stat-EGDMA$_2$), see FIG. 35a.

Figure 35:
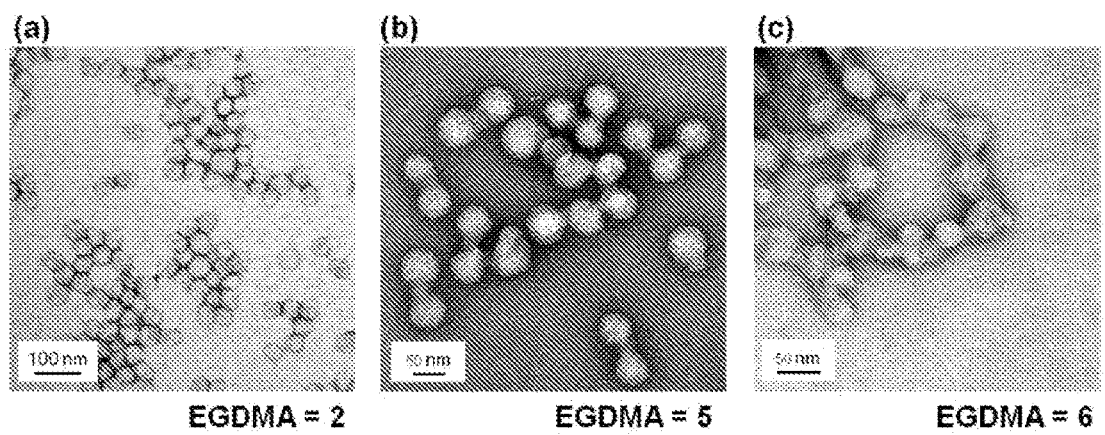

FIG. 35 shows TEM images obtained for: (a) PMPC$_{50}$-(PHPMA$_{400}$-stat-EGDMA$_2$), (b) PMPC$_{50}$-(PHPMA$_{400}$-stat-EGDMA$_5$), and (c) PMPC$_{50}$-(PHPMA$_{400}$-stat-EGDMA$_6$) prepared by RAFT aqueous dispersion polymerisation at 70° C. using the PMPC$_{50}$ macro-CTA at 5.0 w/w % solids.

At 1.25 mol % EGDMA, dumbbell-shaped particles comprising two cross-linked spherical particles were observed (see FIG. 35b). At 1.50 mol % EGDMA, relatively short 'lumpy rods' were obtained (see FIG. 35c), but macro-gelation occurred at 1.75 mol % EGDMA. Thus, the anisotropic character of the 'lumpy rods' formed at 5.0 w/w % is limited, presumably because the more dilute reaction conditions are not conducive to the formation of higher order nano-structures. If EGDMA is replaced with the more hydrophilic poly(ethylene glycol)dimethacrylate (PEGDMA, average $M_n$=750) no 'lumpy rods' could be obtained even when using 1.50 mol % PEGDMA. Thus, for a target composition of $PMPC_{50}$-$(PHPMA_{400}$-stat-$PEGDMA_x)$, where x ranges from 3 to 6, DLS diameters were only 43-44 nm, which merely corresponds to the spherical primary particles. The effect of varying the block composition was also explored. Thus a longer PMPC block and/or a shorter PHPMA block were targeted such that the copolymer composition was $PMPC_{150}$-$(PHPMA_{200}$-stat-$EGDMA_3)$. However, even at 1.50 mol % EGDMA, only spherical particles of 34 nm diameter were obtained (see FIG. 36), which correspond fairly well to the linear nanoparticles of 44 nm diameter obtained from the same formulation in the absence of EGDMA.

Figure 36:
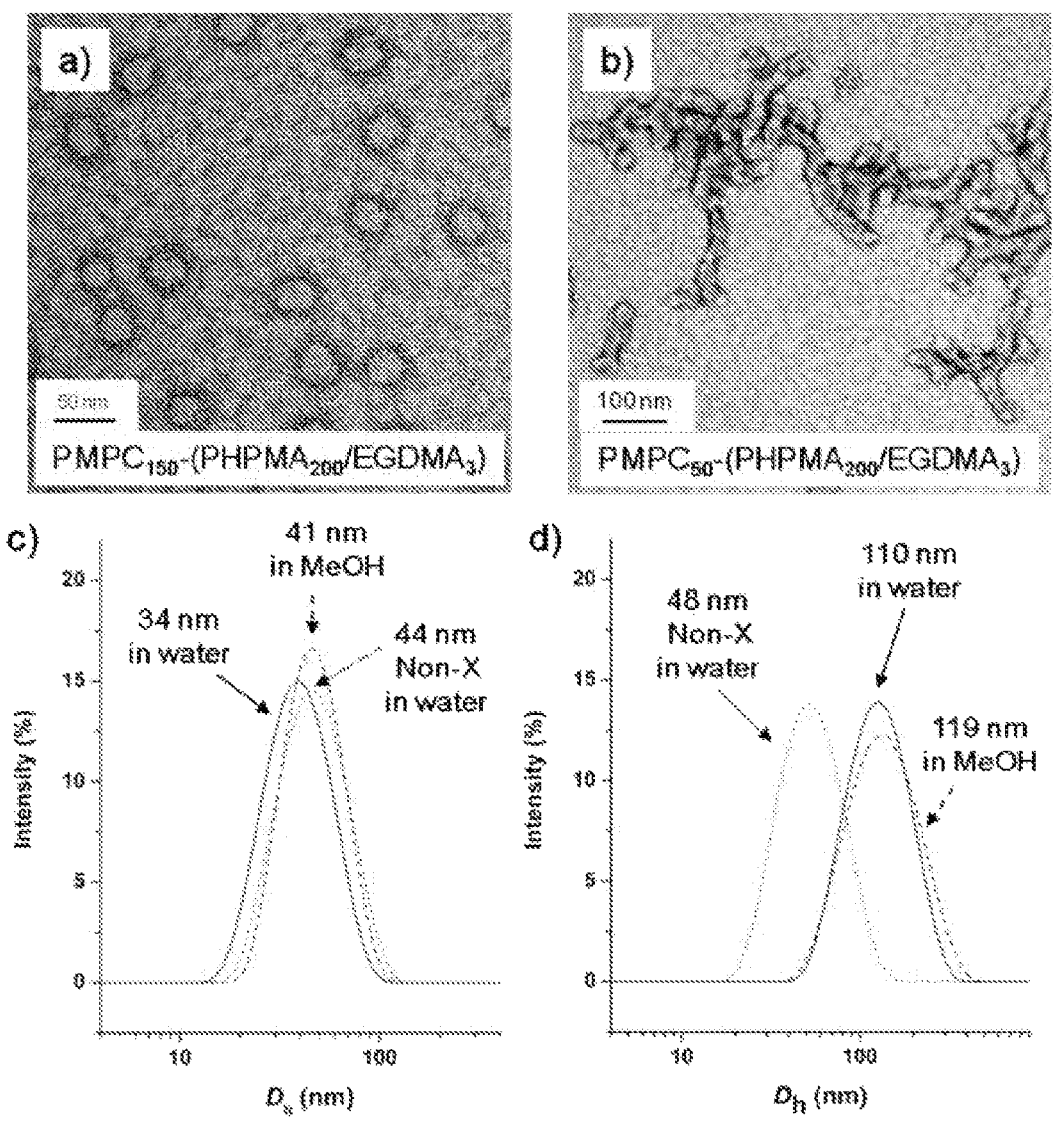

FIG. 36 shows TEM images (a), (b) and the corresponding DLS size distributions at 25° C. (c), (d) obtained when targeting $PMPC_{150}$-$(PHPMA_{200}$-stat-$EGDMA_3)$ and $PMPC_{50}$-$(PHPMA_{200}$-stat-$EGDMA_3)$ using RAFT under aqueous dispersion polymerisation conditions at 70° C. Aqueous dispersions were redispersed in methanol. For comparison, the DLS diameters of the equivalent linear $PMPC_{50}$-$PHPMA_{200}$ nanolatexes prepared in the absence of any EGDMA cross-linker are also shown.

The size of these swollen particles in methanol is 41 nm; this confirms that cross-linking has occurred, since dissolution would otherwise be expected. Presumably, the longer $PMPC_{150}$ chains are a more effective steric stabiliser in this formulation, thus preventing fusion between primary particles and hence the formation of higher order nano-structures (i.e. worms or 'lumpy rods'). Finally, a $PMPC_{150}$-$(PHPMA_{200}$-stat-$EGDMA_3)$ composition was also explored. However, this formulation only led to the formation of worm-like micelles at 1.50 mol % EGDMA cross-linker. Thus the phase space for the 'lumpy rod' particle morphology seems to be relatively narrow. Nevertheless, this new aqueous formulation is robust, reproducible and allows the convenient synthesis of various anisotropic nano-particles directly in water at 10% solids.

In summary, the RAFT synthesis of $PMPC_{50}$-$PHPMA_m$ (m=100 to 400) block copolymer particles under aqueous dispersion polymerisation conditions has been explored. At zero or relatively low levels of EGDMA cross-linker, only spherical morphologies are observed. However, higher levels of EGDMA (up to 1.50 mol % based on HPMA) lead to increasing particle anisotropy, with both worm-like morphologies and a novel 'lumpy rod' morphology being observed. These higher order structures are composed of aggregates of the primary spherical particles that are obtained at zero or relatively low levels of EGDMA cross-linker.

Example 24

Synthesis of PGMA-P(HEMA-stat-HBMA) Diblock Copolymers (i) Materials

2-Hydroxyethyl methacrylate (HEMA) is a fully water-miscible monomer but it forms only a weakly hydrophilic (water-swellable) polymer. HEMA monomer was donated from Cognis and used as received.

4-Hydroxybutyl methacrylate (HBMA) is water-miscible up to 3 w/v % at 20° C. and 2 w/v % at 70° C. PHBMA is a water-insoluble polymer. HBMA monomer was purchased from Sigma Aldrich and passed through a basic alumina column before use.

(ii) Synthesis

A typical synthesis for the dispersion polymerisation of $PGMA_{58}$-$P(HEMA_{100}$-stat-$HBMA_{100})$ is given below. $PGMA_{58}$ macro-CTA (0.200 g, 0.021 mmol), HBMA monomer (0.3326 g, 0.21 mmol) and HEMA monomer (0.2735 g, 0.21 mmol) were weighed into a 25 mL round-bottomed flask and purged with $N_2$ for 20 min. ACVA was added (0.0020 g, 0.0063 mmol, CTA/ACVA molar ratio=3:1) and purged with $N_2$ for a further 5 min. De-ionised water (7.3 mL, 10 w/v % total solids), which had been purged with $N_2$ for 30 min., was then added and the solution was degassed for a further 5 min. prior to immersion in an oil bath set at 70° C. The reaction solution was stirred overnight (~16 h) before removal from the oil bath. The reaction solution was analysed by $^1$H NMR, confirming complete monomer conversion. A small sample (~0.5 g) was extracted, freeze-dries and analysed by DMF GPC (vs. PMMA standards).

Figure 37:
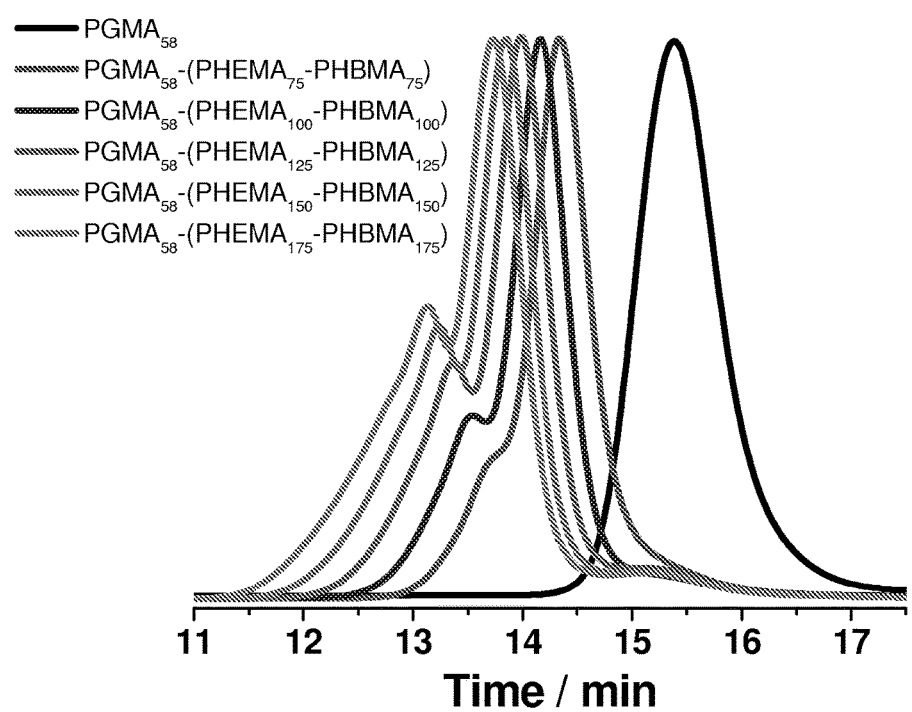

(iii) Results and Discussion:

FIG. 37 shows DMF gel permeation chromatograms for a series of five $PGMA_{58}$-$P(HEMA_x$-stat-$HBMA_y)$ copolymers (and the corresponding $PGMA_{58}$ macro-CTA, see Table 4) synthesised via RAFT aqueous dispersion polymerisation at 70° C. and 10 w/v % solids.

Figure 38:
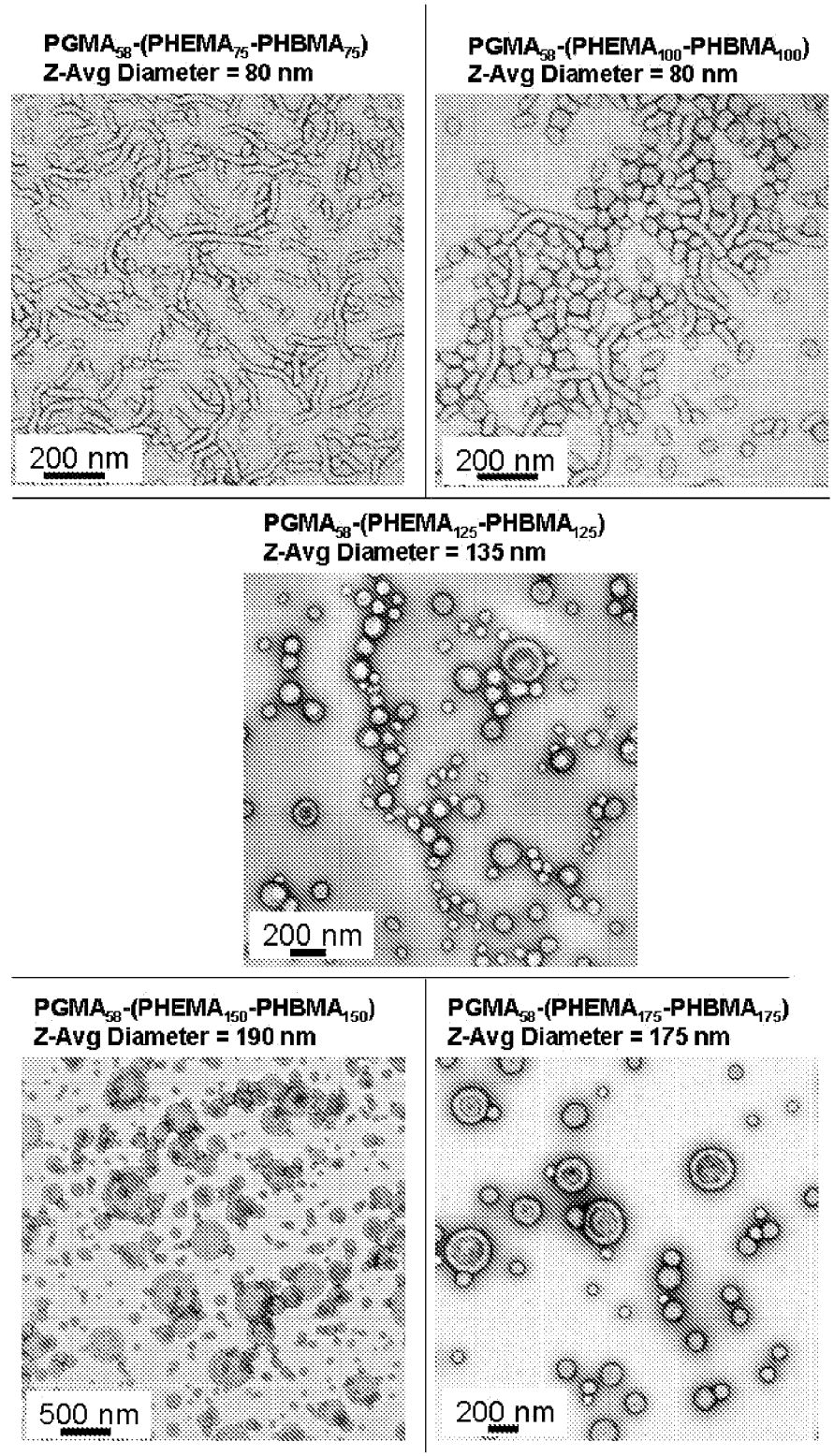

FIG. 38 shows representative TEM images and corresponding DLS intensity-average diameters of the five $PGMA_{58}$-$P(HEMA_x$-stat-$HBMA_y)$ diblock copolymer dispersions, where x and y are equal and range from 75 to 175.

Figure 39:
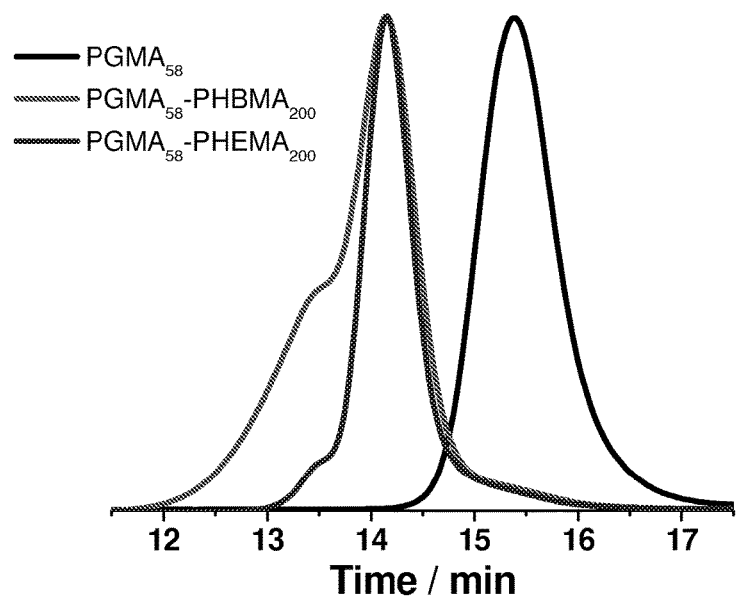

FIG. 39 shows DMF gel permeation chromatograms for the $PGMA_{58}$-$PHBMA_{200}$ and $PGMA_{58}$-$PHEMA_{200}$ diblock copolymers (and the corresponding $PGMA_{58}$ macro-CTA, see Table 4) synthesised via RAFT aqueous dispersion polymerisation at 70° C. at 10 w/v % solids.

Figure 40:
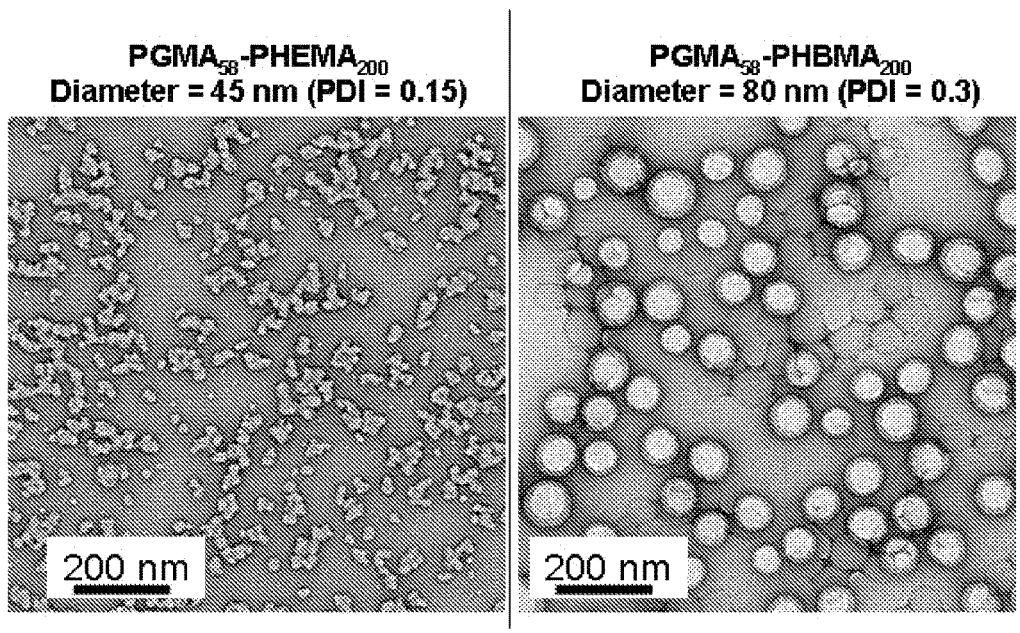

FIG. 40 shows representative TEM images and corresponding DLS intensity-average diameters for the $PGMA_{58}$-$PHEMA_{200}$ and $PGMA_{58}$-$PHBMA_{200}$ copolymer particles.

Seven copolymers were targeted for dispersion polymerisation with varying PHEMA and PHBMA compositions at 10 w/v % total solids (see Table 4). $^1$H NMR measurements were conducted on the final dispersions by diluting a small amount of the resulting reaction liquor in $CD_3OD$, with each sample indicating complete monomer conversion. Increasing the targeted DP of the core-forming P(HEMA-stat-HBMA) copolymer chains leads to higher polydispersities (see Table 4) and also some macro-CTA contamination (see FIG. 37), which suggests imperfect blocking efficiency. The high molecular weight shoulder for the HBMA-containing copolymers is due to a minor dimethacrylate impurity, which can lead to light branching at higher degrees of polymerisation. The HEMA monomer was distilled by the manufacturer; this minimises the dimethacrylate impurity leading to more well-defined copolymers (FIG. 39).

TABLE 4

Table 4. Summary of the DMF GPC molecular weights and polydispersities for the various copolymers synthesised by RAFT aqueous dispersion polymerisation at 70° C.

| Copolymer | $M_n$ (g mol$^{-1}$)[1] | $M_w/M_n$[1] |
|---|---|---|
| $PGMA_{58}$ | 15,800 | 1.14 |
| $PGMA_{58}$-$PHBMA_{200}$ | 56,000 | 1.44 |

TABLE 4-continued

Table 4. Summary of the DMF GPC molecular weights and polydispersities for the various copolymers synthesised by RAFT aqueous dispersion polymerisation at 70° C.

| Copolymer | $M_n$ (g mol$^{-1}$)[1] | $M_w/M_n$[1] |
|---|---|---|
| PGMA$_{58}$-PHEMA$_{200}$ | 45,900 | 1.18 |
| PGMA$_{58}$-P(HEMA$_{75}$-HBMA$_{75}$) | 43,200 | 1.18 |
| PGMA$_{58}$-P(HEMA$_{100}$-HBMA$_{100}$) | 54,500 | 1.23 |
| PGMA$_{58}$-P(HEMA$_{125}$-HBMA$_{125}$) | 62,400 | 1.37 |
| PGMA$_{58}$-P(HEMA$_{150}$-HBMA$_{150}$) | 73,900 | 1.47 |
| PGMA$_{58}$-P(HEMA$_{175}$-HBMA$_{175}$) | 81,000 | 1.69 |

[1]As measured by DMF GPC calibrated with near-monodisperse PMMA standards

TEM and DLS analysis of the seven copolymer dispersions indicated the formation of various nano-structures depending on the copolymer composition (see FIG. 37). Relatively ill-defined, weakly flocculated particles were indicated by TEM for PGMA$_{58}$-PHEMA$_{200}$ (see FIG. 40), with DLS measurements corroborating these observations (d=45 nm). TEM analysis of the PGMA$_{58}$-PHBMA$_{200}$ copolymer dispersion indicated spherical particles (see FIG. 40) with a DLS intensity-average diameter of around 80 nm but with a relatively high polydispersity (0.30). However, this sample is colloidally unstable, since macroscopic precipitation was observed on standing. Worm-like micelles were obtained for PGMA$_{58}$-P(HEMA$_{75}$-stat-HBMA$_{75}$). Increasing the core-forming block length further to PGMA$_{58}$-P(HEMA$_{100}$-stat-HBMA$_{100}$) etc. leads to the formation of mixtures of worms and spheres (see FIG. 38). In summary, the best results were obtained from judicious mixtures of HEMA and HBMA for the core-forming copolymer chains, with inferior results being obtained for either pure PHEMA or PHBMA core-forming chains. HEMA acts as a co-solvent for the less water-soluble HBMA monomer at the beginning of the polymerisation, whereas HBMA increases the hydrophobic character of the core-forming chains, which are otherwise too hydrophilic for self-assembly of well-defined copolymer particles.

Example 25

Preparation of Polydimethylacrylamide (PDMAA)-poly(2-methoxyethyl acrylate) (PMEA) Particles Synthesis of 2-(phenylethylthiocarbonothioylthio)-2-methylpropanoic acid (PETMP)

2-Phenylethanethiol (10.0 g, 72.5 mmol) and potassium triphosphate (32.1 g, 144.9 mmol) were added to acetone (200 mL). After 30 minutes vigorous stirring, carbon disulfide (13.8 g, 181.2 mmol) was added to the suspension. The reaction mixture was stirred for 1 h, then 2-bromo-2-methylpropanoic acid (13.3 g, 79.7 mmol) was added dropwise and the reaction mixture was stirred at 20° C. for a further 30 h. The reaction mixture was filtered and acetone was removed under reduced pressure. The residual oil was dissolved in diethyl ether (200 mL) and this solution was washed twice with 10% HCl aqueous solution (200 mL) and three times with deionised water (200 mL). The ether phase was dried with magnesium sulfate and the ether was removed under reduced pressure. The crude product was recrystallised from ethyl acetate:hexane 1:10 to produce 15.1 g (50.25 mmol) of pure PETMP RAFT agent (69% yield).

$^1$H NMR (400.13 MHz, CDCl$_3$, 298 K) δ (ppm): 1.72 (6H, CH$_3$), 2.91-2.97 (t, 2H, SCH$_2$CH$_2$Ph), 3.47-3.54 (t, 2H, SCH$_2$CH$_2$Ph), 7.18-7.31 (m, 5H, Ph).

$^{13}$C NMR (400.13 MHz, CD$_2$Cl$_2$, 298 K) δ (ppm): 25.3 (CH$_3$), 34.3 (CH$_2$Ph), 38.1 (SCH$_2$CH$_2$Ph), 55.8 (C(CH$_3$)$_2$), 126.8, 128.7, 139.6 (Ph), 179.3 (C=O), 220.4 (C=S).

Synthesis of poly(N,N-dimethylacrylamide) Macro-RAFT Agent (PDMAA)

In a typical experiment, N,N-dimethylacrylamide (10 g, 100.9 mmol), PETMP (0.55 g, 1.8 mmol) and 4,4'-azobis(4-cyanopentanoic acid) (51.4 mg, 0.18 mmol) were dissolved into toluene (34.7 g) to give a N,N-dimethylacrylamide concentration of 2.49 mol dm$^{-3}$. The reaction vessel was placed in an ice bath and the solution was degassed by nitrogen bubbling for 20 minutes. The reaction vessel was then immersed in a pre-heated oil bath at 70° C. for 70 min. The resulting PDMAA was purified by precipitating twice into excess petroleum ether (40-60) and then dried under vacuum at 50° C. overnight (overall DMAA conversion=55%; $M_n$=3,000 g mol$^{-1}$, $M_w$=3,300 g mol$^{-1}$, $M_w/M_n$=1.12.

Synthesis of poly(N,N-dimethylacrylamide)-poly(2-methoxyethyl acrylate) (PDMAA-PMEA) Diblock Copolymer In a typical aqueous dispersion polymerization at 15% solids, 2-methoxyethyl acrylate (0.50 g, 3.8 mmol), ACVA (0.54 mg, 0.0019 mmol) and PDMAA$_{32}$macro-CTA (67 mg, 0.019 mmol) was dissolved in deionised water (3.22 g). The reaction mixture was sealed in a round-bottomed flask, degassed by nitrogen bubbling for 10 minutes and then placed in a pre-heated oil bath at 70° C. for 16 h (final MEA conversion=99%; $M_n$=25,500 g mol$^{-1}$, $M_w$=34,500 g mol$^{-1}$, $M_w/M_n$=1.35).

N.B. The DMF GPC traces indicate relatively efficient re-initiation (no evidence for a residual PDMAA macro-CTA), but a higher molecular weight shoulder (or, in some cases, a distinct secondary peak) is observed. This may be due to either (i) termination of the polymer radicals by combination at 70° C. under monomer-starved conditions, or (ii) some degree of backbone branching, which is known to be an intrinsic side-reaction in the case of acrylic monomers. In both cases, shorter reaction times are likely to provide more well-defined diblock copolymers.

TABLE 5

Table 5. Summary of the PDMAA$_{32}$-PMEA$_x$ diblock copolymer nanoparticles prepared by RAFT aqueous dispersion polymerisation at 70° C. using a PDMAA$_{32}$ macro-CTA (where x represents the mean target DP of the PMEA block).

| Target DP of PMEA block | Solids content (%) | M$_n$ (g mol$^{-1}$) | M$_w$ (g mol$^{-1}$) | M$_w$/M$_n$ | Visual appearance at 20° C. | Intensity-average diameter (nm) | PDI | Viscosity |
|---|---|---|---|---|---|---|---|---|
| 100 | 15 | 13,200 | 15,900 | 1.21 | Transparent | 24 | 0.072 | Fluid |
| 200 | 15 | 25,500 | 34,500 | 1.35 | Milky, | 473 | 0.321 | Viscous |
| 300 | 15 | 30,700 | 48,000 | 1.56 | Milky | 404 | 0.029 | Fluid |
| 500 | 15 | 41,800 | 82,500 | 1.97 | Milky | 232 | 0.047 | Fluid |
| 100 | 20 | 12,900 | 15,200 | 1.18 | Transparent | 15 | 0.231 | Viscous |
| 200 | 20 | 22,300 | 30,200 | 1.35 | Milky | 260 | 0.384 | Fluid |
| 300 | 20 | 32,600 | 50,500 | 1.55 | Milky | 595 | 0.372 | Fluid |
| 500 | 20 | 47,500 | 88,500 | 1.86 | Milky | 250 | 0.023 | Fluid |

N.B. MEA monomer was not fully soluble at 70° C. for the syntheses conducted at 20% solids.

Example 26

Preparation of P(KSPMA-co-HEMA)-b-PHPMA Diblock Copolymer Particles

Synthesis of poly(potassium 3-sulfopropyl methacrylate) Homopolymer macroCTA, PKSPMA$_{34}$ In a typical experiment a round-bottomed flask was charged with KSPMA (5.0 g, 20 mmol), PETTC (0.197 g, 0.58 mmol; dissolved in 1.0 mL 1,4-dioxan), ACVA (33 mg, 0.22 mmol) and 4.0 g buffer (pH 5.5). The sealed reaction vessel was purged with nitrogen and placed in a preheated oil bath at 70° C. for 2 h. The resulting PKSPMA polymer (96% conversion; M$_n$=9,800 g mol$^{-1}$, M$_w$=11,500 g mol$^{-1}$, M$_w$/M$_n$=1.18) was purified using dialysis against water/methanol and isolated by lyophilisation. The degree of polymerisation (DP) of this macroCTA was calculated to be 34 from its $^1$H NMR spectrum by comparing the integrals of the signals corresponding to the aromatic protons at 7.2-7.4 ppm with those of the polymer backbone at 0.4-2.5 ppm.

Synthesis of poly(potassium 3-sulfopropyl methacrylate-co-2-hydroxyethyl methacrylate) Copolymer Macro-CTA, P(KSPMA$_6$-co-HEMA$_{29}$)

A round-bottomed flask was charged with KSPMA (1.0 g, 4.1 mmol), HEMA (2.64 g, 20.3 mmol), PETTC (0.27 g, 0.80 mmol, dissolved in 1.0 mL 1,4-dioxan), ACVA (45.5 mg, 0.16 mmol) and 3.0 g buffer (pH 5.5). The sealed reaction vessel was purged with nitrogen and placed in a preheated oil bath at 70° C. for 2 h. The resulting polymer (97% conversion; M$_n$=13,300 gmol$^{-1}$, M$_w$=15,600 gmol$^{-1}$, M$_w$/M$_n$=1.17) was purified using dialysis against water/methanol and isolated by lyophilisation. The overall DP of the macro-CTA of 35 was calculated as described above after its purification.

Synthesis of poly(potassium 3-sulfopropyl methacrylate-co-2-hydroxyethyl methacrylate) Copolymer Macro-CTA, P(KSPMA$_{11}$-co-HEMA$_{24}$)

A round-bottomed flask was charged with KSPMA (1.0 g, 4.1 mmol), HEMA (1.06 g, 8.1 mmol), PETTC (0.14 g, 0.41 mmol, dissolved in 1.0 mL 1,4-dioxane), ACVA (22.8 mg, 0.08 mmol) and 3.0 g buffer (pH 5.5). The sealed reaction vessel was purged with nitrogen and placed in a preheated oil bath at 70° C. for 2 h. The resulting polymer (95% conversion) was dialysed against water/methanol and isolated by lyophilisation. The DP of this purified macroCTA was calculated using $^1$H NMR as described above.

Synthesis of poly(potassium 3-sulfopropyl methacrylate-co-2-hydroxyethyl methacrylate) Copolymer Macro-CTA, P(KSPMA$_{25}$-co-HEMA$_{11}$)

A round-bottomed flask was charged with KSPMA (2.0 g, 8.1 mmol), HEMA (0.53 g, 4.1 mmol), PETTC (0.14 g, 0.41 mmol, dissolved in 1.0 mL 1,4-dioxan), ACVA (22.8 mg, 0.08 mmol) and 3.0 g buffer (pH 5.5). The sealed reaction vessel was purged with nitrogen and placed in a preheated oil bath at 70° C. for 2 h. The resulting polymer (96% conversion) was dialysed against water/methanol and isolated by lyophilisation. The DP of this purified macroCTA was calculated using $^1$H NMR as described above.

Synthesis of P(KSPMA$_6$-co-HEMA$_{29}$)-b-PHPMA$_{300}$ Diblock Copolymer Particles Via Aqueous Dispersion Polymerisation In an aqueous dispersion polymerisation conducted at 10% solids, HPMA (1.0 g, 6.9 mmol), ACVA (1.3 mg, 0.004 mmol), P(KSPMA$_6$-co-HEMA$_{29}$) macroCTA (MS-192; 0.12 g, 0.023 mmol) was dissolved in 0.10 M aqueous NaCl (11.23 g). The reaction mixture was sealed in a round-bottomed flask, purged with nitrogen for 20 min. and then placed in a preheated oil bath at 70° C. for 24 h. DLS diameter=76 nm.

Figure 41:
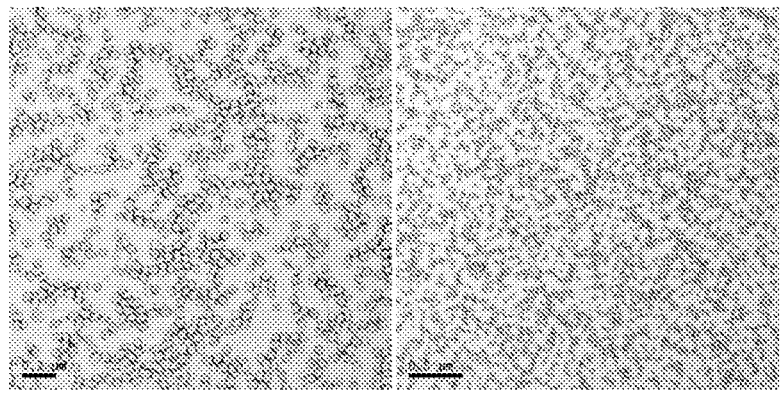

FIG. 41 shows a TEM image of the resulting P(KSPMA$_6$-co-HEMA$_{29}$)-b-PHPMA$_{300}$ diblock copolymer particles.

Synthesis of P(KSPMA$_{11}$-co-HEMA$_{24}$)-b-PHPMA$_{500}$ Diblock Copolymer Particles Via Aqueous Dispersion Polymerisation In an aqueous dispersion polymerisation conducted at 10% solids, HPMA (1.0 g, 6.9 mmol), ACVA (0.78 mg, 0.003 mmol), P(KSPMA$_{11}$-co-HEMA$_{24}$)macro-CTA (MS-059) (81 mg, 0.014 mmol) was dissolved in 0.20 M NaCl (10.82 g). The reaction mixture was sealed in a round-bottomed flask, purged with nitrogen for 20 min. and then placed in a preheated oil bath at 70° C. for 24 h. DLS diameter=80 nm.

Figure 42:
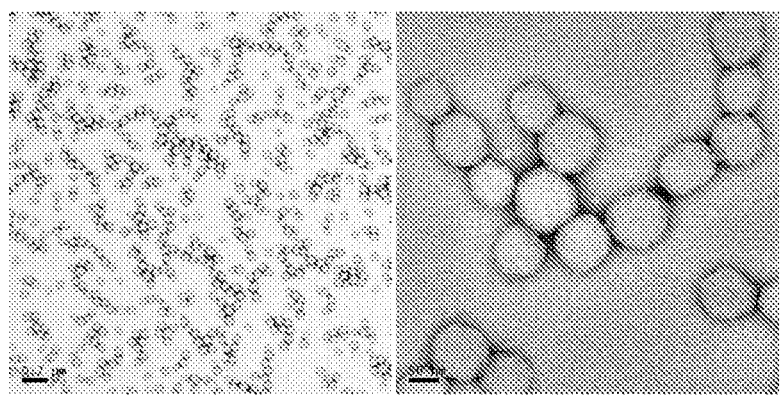

FIG. 42 shows TEM images of the resulting P(KSPMA$_{11}$-co-HEMA$_{24}$)-b-PHPMA$_{500}$ diblock copolymer particles.

Synthesis of P(KSPMA$_{25}$-co-HEMA$_{11}$)-b-PHPMA$_{500}$ Diblock Copolymer Particles Via Aqueous Dispersion Polymerisation In an aqueous dispersion polymerisation conducted at 10% solids, HPMA (1.0 g, 6.9 mmol), ACVA (0.78 mg, 0.003 mmol), P(KSPMA$_{25}$-co-HEMA$_{11}$) macro-CTA (MS-058) (110 mg, 0.014 mmol) was dissolved in 0.30 M NaCl (11.10 g). The reaction mixture was sealed in a round-bottomed flask, purged with nitrogen for 20 min. and then placed in a preheated oil bath at 70° C. for 24 h. DLS diameter=65 nm.

Figure 43:
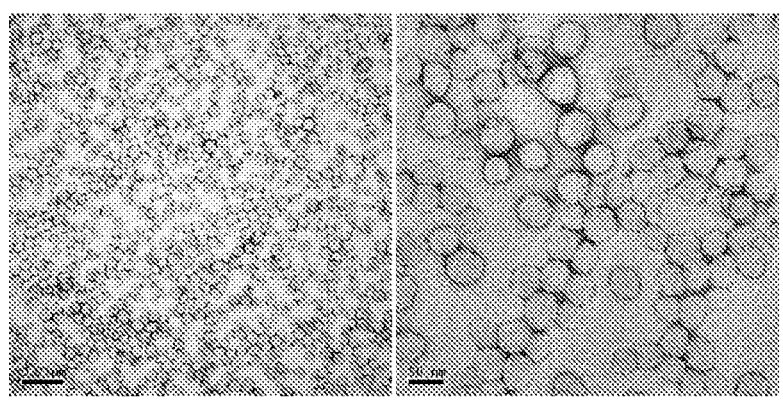

FIG. 43 shows TEM images of the resulting P(KSPMA$_{25}$-co-HEMA$_{11}$)-b-PHPMA$_{500}$ diblock copolymer particles.

Conclusion

The above examples describe the syntheses of a series of anionic spherical diblock copolymer nanoparticles of approximately constant particle diameter but variable anionic surface charge. This is achieved by systematically varying the anionic charge density of the stabiliser macro-CTA and also judiciously adjusting synthesis parameters such as salt concentration, target degree of polymerisation for the core-forming PHPMA chains, to keep the particle diameter approximately constant.

Figure 44:
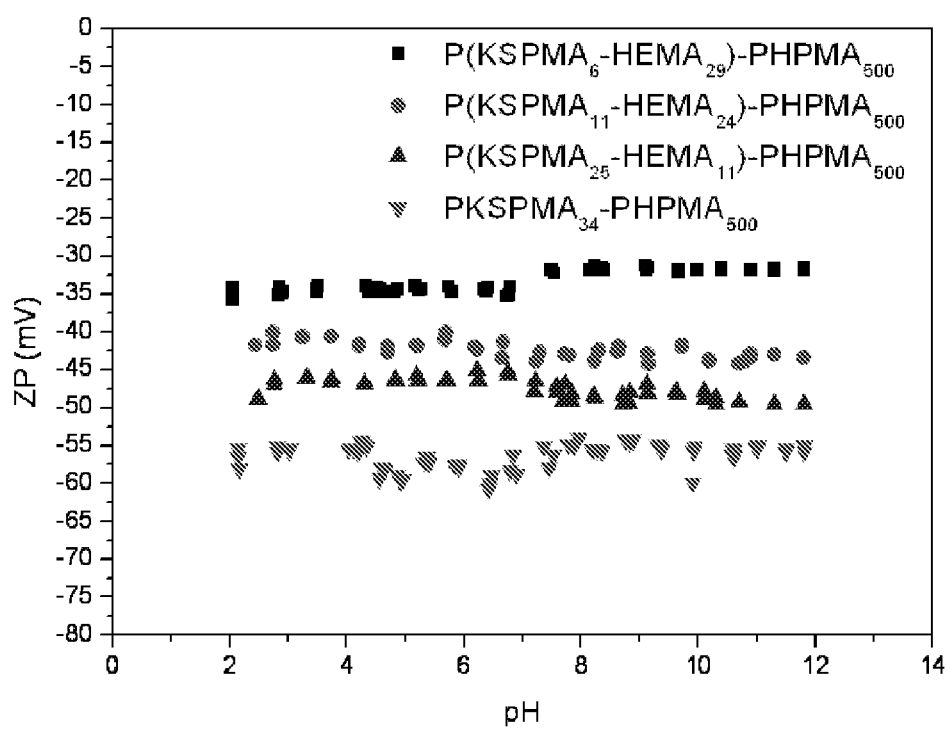

FIG. 44 shows zeta potential vs. pH curves for anionic polyelectrolyte-stabilised PHPMA nanolatexes of comparable particle diameter. As the proportion of anionic KSPMA comonomer in the stabiliser chains is increased, the zeta potential becomes more negative, regardless of the solution pH.

Example 27

Preparation of P(QDMA-stat-GMA)-b-PHPMA Diblock Copolymer Particles

Synthesis of poly(methyl iodide quaternised 2-(dimethylamino)ethyl methacrylate-stat-glycerol monomethacrylate) macroCTA, P(QDMA$_{10}$-stat-GMA$_{115}$)

A round-bottomed flask was charged with GMA (12.0 g, 0.075 mol), QDMA (2.04 g, 6.8 mmol) PETTC (0.23 g, 0.68 mmol; dissolved in 5.0 mL 1,4-dioxan), ACVA (19.1 mg, 0.068 mmol) and pH 5.5 buffer (9.0 g). The sealed reaction vessel was purged with nitrogen and placed in a preheated oil bath at 70° C. for 2 h. The resulting cationic copolymer (99% conversion) was purified by dialysis against water and isolated by lyophilisation. The overall degree of polymerisation (DP) of this macroCTA was calculated to be 125 from its $^1$H NMR spectrum by comparing the integrals due to the aromatic proton signals of the PETTC chain-ends at 7.2-7.4 ppm with those due to the copolymer.

Synthesis of Spherical Cationic Diblock Copolymer Particles Via Aqueous Dispersion Polymerisation, P(QDMA$_{10}$-stat-GMA$_{115}$)-b-PHPMA$_{400}$ A round-bottomed flask was charged with HPMA (7.5 g, 0.05 mol), ACVA (7.3 mg, 0.026 mmol) and P(QDMA$_{10}$-stat-GMA$_{115}$) macroCTA (MS-381; 2.84 g, 0.13 mmol) dissolved in 0.30 M NaCl (103.5 g). The reaction mixture was sealed in a round-bottomed flask, purged with nitrogen for 90 min. and then placed in a preheated oil bath at 70° C. for 24 h. DLS diameter=53 nm (PDI=0.021).

Figure 45:
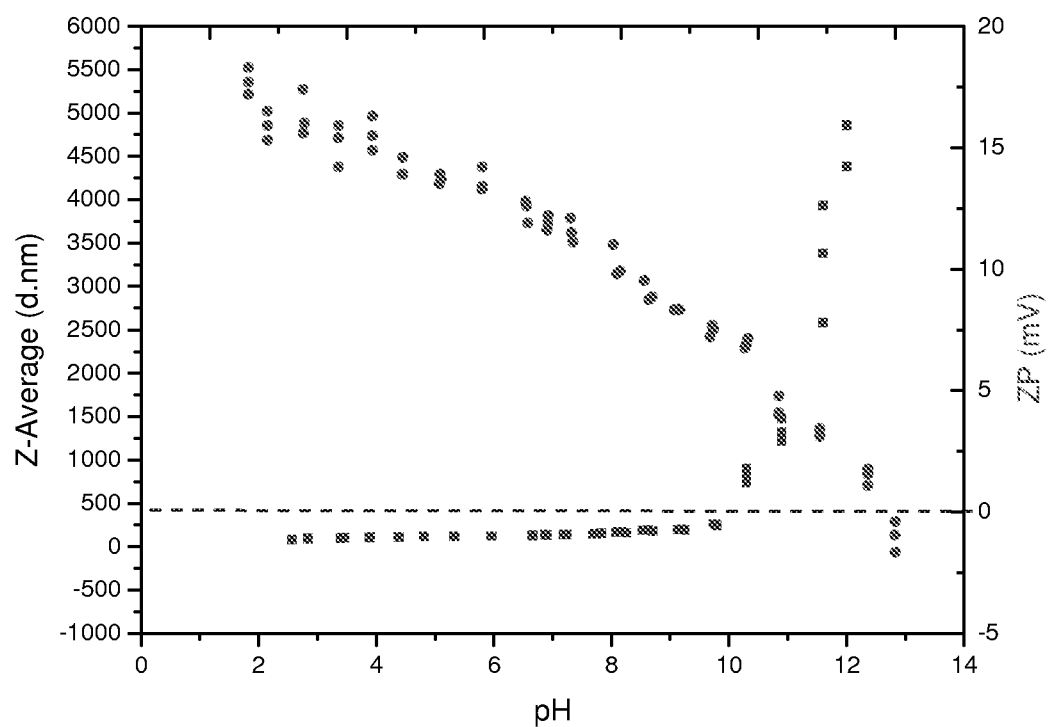

FIG. 45 shows a zeta potential vs. pH curve for the resulting P(QDMA$_{10}$-stat-GMA$_{115}$)-b-PHPMA$_{400}$ particles.

Figure 46:
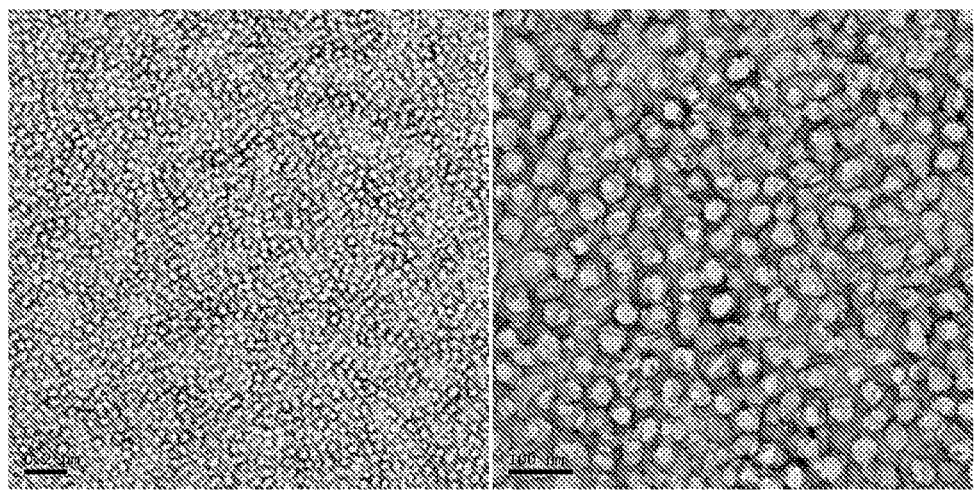

FIG. 46 shows TEM images of the resulting P(QDMA$_{10}$-stat-GMA$_{115}$)-b-PHPMA$_{400}$ particles.

Synthesis of Spherical Cationic Diblock Copolymer Particles Via Aqueous Dispersion Polymerisation, P(QDMA$_{10}$-stat-GMA$_{115}$)-b-PHPMA$_{500}$ A round-bottomed flask was charged with HPMA (8.0 g, 55.5 mmol), ACVA (6.2 mg, 0.022 mmol), P(QDMA$_{10}$-stat-GMA$_{115}$) macroCTA (MS-381; 2.43 g 0.11 mmol) dissolved in 0.30 M NaCl (104.3 g). The reaction mixture was sealed in a round-bottomed flask, purged with nitrogen for 90 min. and then placed in a preheated oil bath at 70° C. for 24 h. DLS diameter=62 nm (PDI=0.027)

Figure 47:
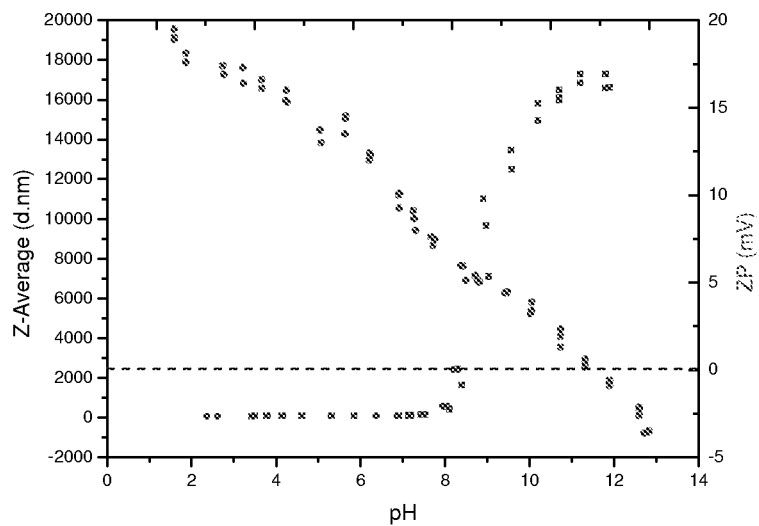

FIG. 47 shows zeta potential vs. pH curve for the resulting P(QDMA$_{10}$-stat-GMA$_{115}$)-b-PHPMA$_{500}$ particles.

Figure 48:
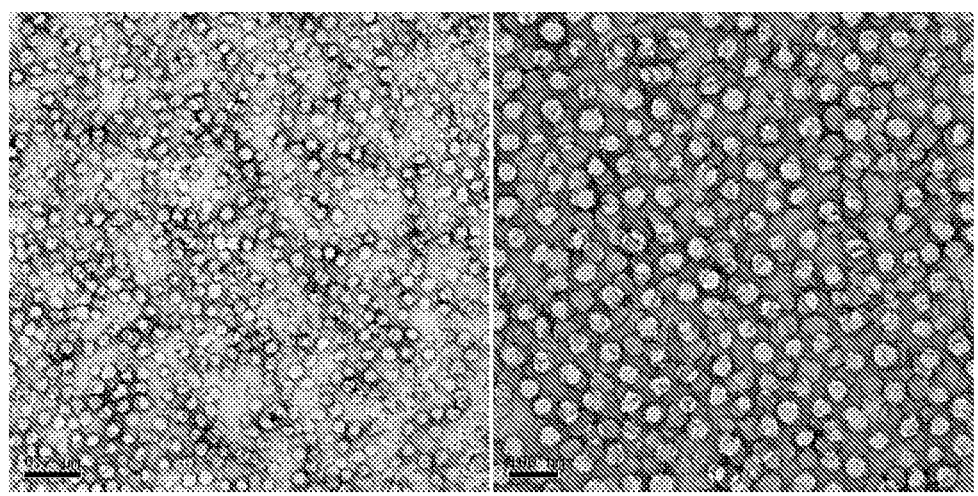

FIG. 48 shows TEM images of the resulting P(QDMA$_{10}$-stat-GMA$_{115}$)-b-PHPMA$_{500}$ particles.

Synthesis of Spherical Cationic Diblock Copolymer Particles Via Aqueous Dispersion Polymerisation, P(QDMA$_{10}$-stat-GMA$_{115}$)-b-PHPMA$_{600}$ A round-bottomed flask was charged with HPMA (8.0 g, 55.5 mmol), ACVA (5.2 mg, 0.018 mmol) and P(QDMA$_{10}$-stat-GMA$_{115}$) macroCTA (MS-381; 2.02 g, 0.09 mmol) dissolved in 0.30 M NaCl (100.3 g). The reaction mixture was sealed in a round-bottomed flask, purged with nitrogen for 90 min. and then placed in a preheated oil bath at 70° C. for 24 h. DLS diameter=71 nm (PDI=0.020)

Figure 49:
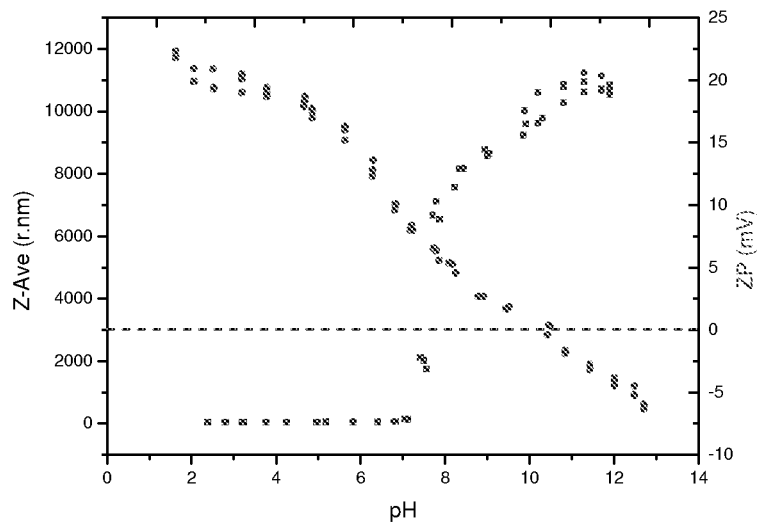

FIG. 49 shows a zeta potential vs. pH curve for the resulting P(QDMA$_{10}$-co-GMA$_{115}$)-b-PHPMA$_{600}$ particles.

Figure 50:
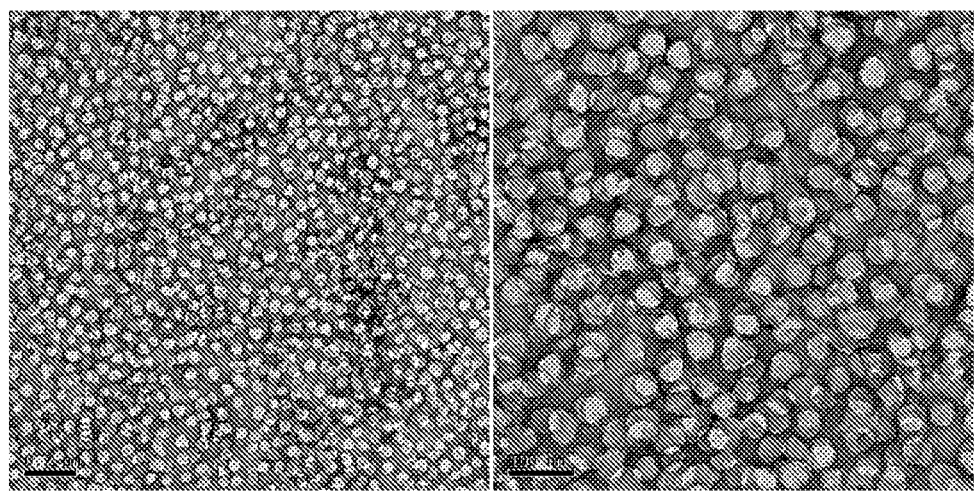

FIG. 50 shows TEM images of the resulting P(QDMA$_{10}$-co-GMA$_{115}$)-b-PHPMA$_{600}$ particles.

Synthesis of Spherical Cationic Diblock Copolymer Particles Via Aqueous Dispersion Polymerisation, P(QDMA$_{10}$-stat-GMA$_{115}$)-b-PHPMA$_{700}$ A round-bottomed flask was charged with HPMA (8.5 g, 58.9 mmol), ACVA (4.7 mg, 0.017 mmol) and P(QDMA$_{10}$-stat-GMA$_{115}$) macroCTA (MS-381; 1.84 g, 0.08 mmol) was dissolved in 0.30 M NaCl (103.5 g). The reaction mixture was sealed in a round-bottomed flask, purged with nitrogen for 90 min. and then placed in a preheated oil bath at 70° C. for 24 h. DLS diameter=80 nm (PDI=0.030).

Figure 51:
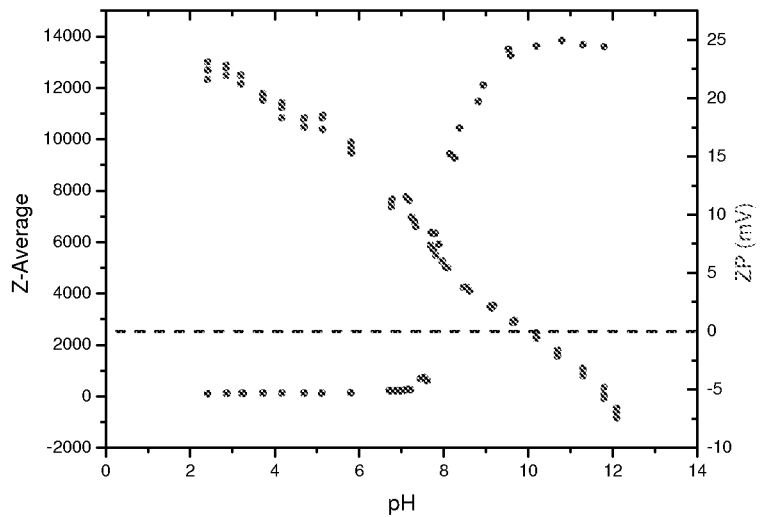

FIG. 51 shows zeta potential vs. pH curve for the resulting P(QDMA$_{10}$-stat-GMA$_{115}$)-b-PHPMA$_{700}$ particles.

Figure 52:
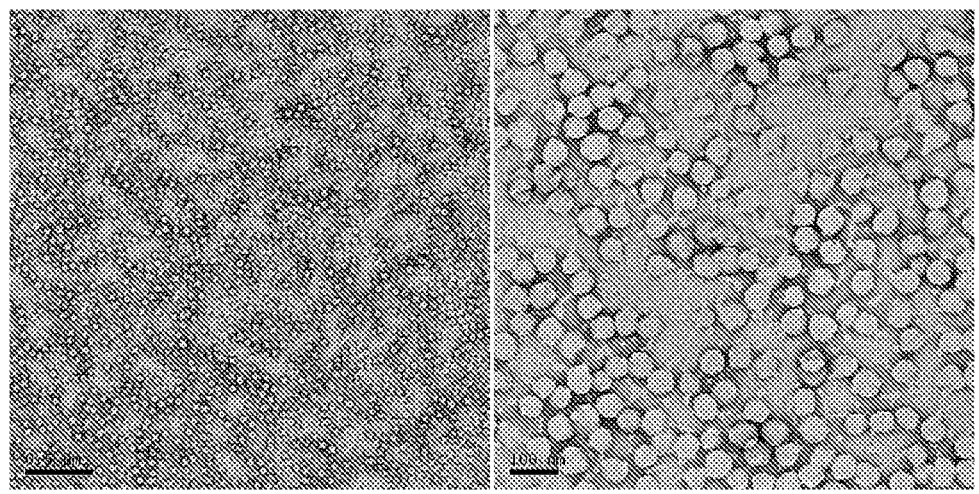

FIG. 52 shows TEM images of the resulting P(QDMA$_{10}$-stat-GMA$_{115}$)-b-PHPMA$_{700}$ particles.

Synthesis of Spherical Cationic Diblock Copolymer Particles Via Aqueous Dispersion Polymerisation, P(QDMA$_{10}$-stat-GMA$_{115}$)-b-PHPMA$_{900}$ A round-bottomed flask was charged with HPMA (9.0 g, 62.4 mmol), ACVA (3.9 mg, 0.014 mmol) and P(QDMA$_{10}$-stat-GMA$_{115}$) macroCTA (MS-381; 1.52 g, 0.07 mmol) dissolved in 0.30 M NaCl (105.2 g). The reaction mixture was sealed in a round-bottomed flask, purged with nitrogen for 90 min. and then placed in a preheated oil bath at 70° C. for 24 h. DLS diameter=92 nm (PDI=0.038).

Figure 53:
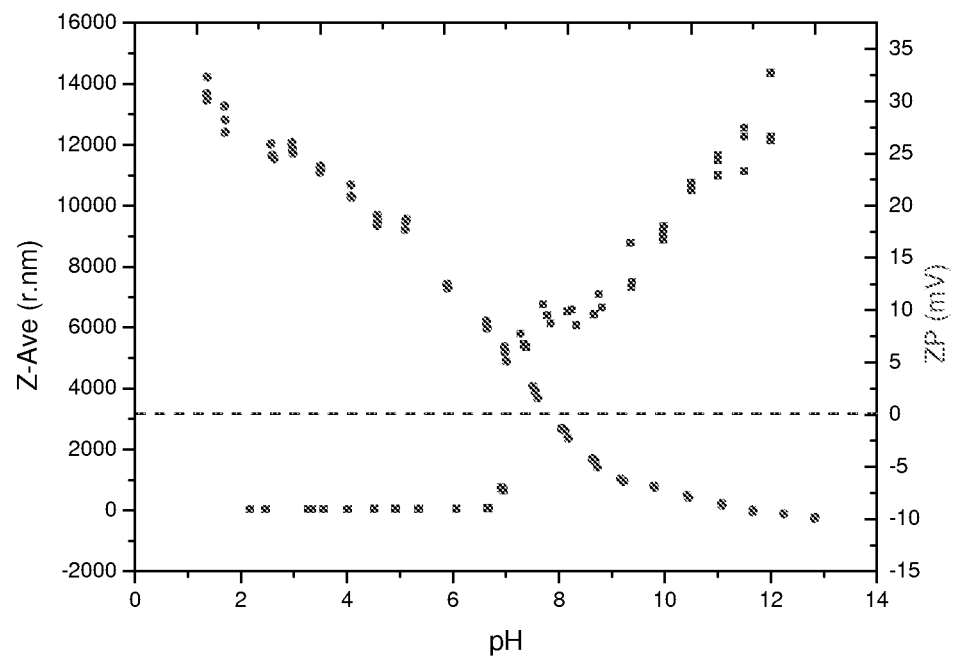

FIG. 53 shows a zeta potential vs. pH curve for the resulting P(QDMA$_{10}$-stat-GMA$_{115}$)-b-PHPMA$_{900}$ particles.

Figure 54:
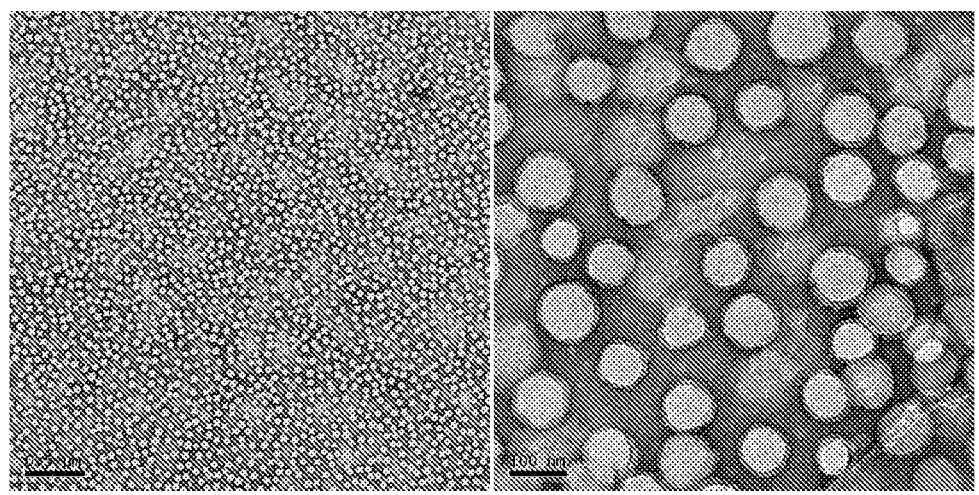

FIG. 54 show TEM images of the resulting P(QDMA$_{10}$-stat-GMA$_{115}$)-b-PHPMA$_{900}$ particles.

Conclusion

The above examples describe the preparation of cationic spherical nanoparticles of approximately constant surface charge (positive zeta potential) but with varying particle diameter. This is achieved by simply targeting longer PHPMA core-forming PHPMA chains using the same cationic stabiliser macroCTA in each case.

GLOSSARY

AA=acrylic acid
AMA=2-aminoethyl methacrylate, hydrochloride salt
CDB=cumyl dithiobenzoate
CTA=chain transfer agent
CTP=4-cyanopentanoic acid dithiobenzoate
DEGMA=methoxy-capped di(ethyleneglycol) methacrylate
DLS=dynamic light scattering
DMA=2-(dimethylamino)ethyl methacrylate
DMAA=N,N'-dimethyl acrylamide
DP=degree of polymerisation
DPA=2-(diisopropylamino)ethyl methacrylate
EGDMA=ethylene glycol dimethacrylate
GMA=glycerol monomethacrylate
GPC=gel permeation chromatography
HBA=4-hydroxybutyl acrylate
HBMA=4-hydroxybutyl methacrylate
HEMA=2-hydroxyethyl methacrylate
HPA=2-hydroxypropyl acrylate
HPMA=2-hydroxypropyl methacrylate
KSPMA=potassium 3-sulfopropylmethacrylate
MAA=methacrylic acid
MEA=2-methoxyethyl acrylate
MPC=2-(methacryloyloxy)ethyl phosphorylcholine
OEGMA=oligo(ethylene glycol) methacrylate
OEGA=oligo(ethylene glycol) acrylate
PAMA=poly(2-aminoethyl methacrylate)
PDI=polydispersity index
PDMA=poly(2-(dimethylamino)ethyl methacrylate)
PDPA=poly2-(diisopropylamino)ethyl methacrylate
PGMA=poly(glycerol monomethacrylate)
PHEMA=poly(2-hydroxyethyl methacrylate
PHPMA=poly(2-hydroxypropyl methacrylate)
PMPC=poly(2-(methacryloyloxy)ethyl phosphorylcholine)
PQDMA=methyl chloride-quaternized poly(2-(dimethylamino)ethyl methacrylate) or methyl iodide-quaternized poly(2-(dimethylamino)ethyl methacrylate)
PKSPMA=poly(potassium 3-sulfopropyl methacrylate)
PSEMA=poly(2-(methacryloyloxy)ethyl succinate)
QDMA=methyl chloride-quaternised 2-(dimethylamino) ethyl methacrylate
RAFT=reversible addition-fragmentation chain transfer
SEMA=(2-(methacryloyloxy)ethyl succinate)

REFERENCES

[1] Satguru, R.; McMahon, J.; Padget, J. C.; Coogan, R. C. *Surface Coatings International*. 1994, 77, 424-431.
[2] Okubo, M.; Matsuda, M.; Terada, A.; Kagawa, Y.; Kondo, S. *J. App. Polym. Sci.* 2003, 90, 1825-1829.
[3] El-Aasser, M. S.; Tang, J.; Wang, X.; Daniels, E. S.; Dimonie, V. L.; Sudol, E. D. *Proceedings of the Annual Meeting Technical Program of the FSCT* (2000), 78th 283-312. Publisher: Federation of Societies for Coatings Technology.
[4] (a) Hawker, C. J.; Bosman, A. W.; Harth, E. *Chem. Rev.* 2001, 101, 3661-3688. (b) Delaittre, G.; Dire, C.; Rieger, J.; Putaux, J.-L.; Charleux, B. *Chem. Commun.* 2009, 2887-2889.
[5] Matyjaszewski, K.; Xia, J. *Chem. Rev.* 2001, 101, 2921-2990.
[6] Moad, G.; Rizzardo. E.; Thang, S. H. *Aust. J. Chem.* 2005, 58, 379-410.
[7] Lowe, A. B.; McCormick, C. L. *Prog. Polym. Sci.* 2007, 32, 283-351.
[8] Perrier, S.; Takolpuckdee, P. J. *J. Polym. Sci. Part A: Polym. Chem.* 2005, 43, 5347-5393.
[9] Save, M.; Guillaneuf, Y.; Gilbert, R. G. *Aust. J. Chem.* 2006, 59, 693-711.
[10] Nicolas, J.; Ruzette, A. V.; Farcet, C.; Gerard, P.; Magnet, S.; Charleux, B. *Polymer.* 2007, 48 7029-7040.
[11] Nicolas, J.; Charleux, B.; Guerret, O.; Magnet, S. *Angew. Chem. Int. Ed.* 2004, 43, 6186-6189.
[12] Delaittre, G.; Nicolas, J.; Lefay, C.; Save, M.; Charleux, B. *Chem. Commun.* 2005, 614-616.
[13] Nicolas, J.; Charleux, B.; Guerret, O.; Magnet, S. *Macromolecules.* 2004, 37, 4453-4463.
[14] Nicolas, J.; Charleux, B.; Guerret, O.; Magnet, S. *Macromolecules.* 2005, 38, 9963-9973.
[15] Charleux, B.; Nicolas, *J. Polymer.* 2007, 48, 5813-5833.
[16] Prodpran, T.; Dimonie, V. L.; Sudol, E. D.; El-Aasser, M. S. *Macromolecular Symposia.* 2000, 155, 1-14.
[17] Zetterlund, P. B.; Wakamatsu, J.; Okubo, M. *Macromolecules.* 2009, 42, 6944-6952.
[18] Cunningham, M. F.; Tortosa, K.; Ma, J. W.; McAuley, K. B.; Keoshkerian, B.; Georges, M. K. *Macromolecular Symposia.* 2002, 182, 273-282.
[19] Min, K.; Gao, H.; Matyjaszewski, K. *J. Am. Chem. Soc.* 2006, 128, 10521-10526.
[20] Li, M.; Min, K.; Matyjaszewski, K. *Macromolecules.* 2004, 37, 2106-2112.
[21] Li, W.; Min, K.; Matyjaszewski, K.; Stoffelbach, F.; Charleux, B. *Macromolecules.* 2008, 41, 6387-6392.
[22] Li, M.; Matyjaszewski, K. *Macromolecules.* 2003, 36, 6028-6035.
[23] Kagawa, Y.; Kawasaki, M.; Zetterlund, P. B.; Minami, H.; Okubo, M. *Macromolecular Rapid Communications.* 2007, 28, 2354-2360.
[24] Kagawa, Y.; Zetterlund, P. B.; Minami, H.; Okubo, M. *Macromolecules.* 2007, 40, 3062-3069.
[25] Okubo, M.; Minami, H.; Zhou, J. *Colloid and Polymer Science.* 2004, 282, 747-752.
[26] Ferguson, C. J.; Hughes, R. J.; Pham, B. T. T.; Hawkett, B. S.; Gilbert, R. G.; Serelis, A. K.; Such, C. H. *Macromolecules.* 2002, 35, 9243-9245.
[27] Pham, B. T. T.; Nguyen, D.; Ferguson, C. J.; Hawkett, B. S.; Serelis, A. K.; Such, C. H. *Macromolecules.* 2003, 36, 8907-8909.
[28] Ferguson, C. J.; Hughes R. J.; Nguyen, D.; Pham, B. T. T.; Gilbert, R. G.; Serelis, A. K.; Such, C. H.; Hawkett, B. S. *Macromolecules.* 2005, 38, 2191-2204.
[29] Ganeva, D. E.; Sprong, E.; Bruyn, H. de; Warr, G. G.; Such, C. H.; Hawkett, B. S. *Macromolecules.* 2007, 40, 6181-6189.
[30] Fréal-Saison, S.; Save, M.; Bui, C.; Charleux, B.; Magnet, S. *Macromolecules.* 2006, 39, 8632-8638.
[31] Rieger, J.; Stoffelbach, F.; Bui, C.; Alaimo, D.; Jérôme, C.; Charleux, B. *Macromolecules.* 2008, 41, 4065-4068.
[32] Stoffelbach, F.; Tibiletti, L.; Rieger, J.; Charleux, B. *Macromolecules.* 2008, 41, 7850-7856.
[33] Manguian, M.; Save, M.; Charleux, B. *Macromol. Rapid Commun.* 2006, 27, 399-404.
[34] Huang, X.; E. Sudol, D. V.; Dimonie, L.; Anderson, C. D.; El-Aasser, M. S. *Macromolecules.* 2006, 39, 6944-6950.

[35] Simms, R. W.; Davis, T. P.; Cunningham, M. F. *Macromolecular Rapid Commun.* 2005, 26, 592-596.
[36] Wang, X.; Luo, Y.; Li, B.; Zhu, S. *Macromolecules.* 2009, 42, 6414-6421.
[37] Song, J. S.; Winnik, M. A. *Macromolecules.* 2006, 39, 8318-8325.
[38] Bathfield, M.; D'Agosto, F.; Spitz, R.; Charreyre, M.; Pichot, C.; Delair, T. *Macromol. Rapid Commun.* 2007, 28, 1540-1545.
[39] Wan, W.-M.; Hong, C.-Y.; Pan, C.-Y. *Chem. Commun.* 2009, 5883-5885.
[40] An, Z.; Shi, Q.; Tang, W.; Tsung, C. K.; Hawker, C. J.; Stucky, G. D. *J. Am. Chem. Soc.* 2007, 129, 14493-14499.
[41] Delaittre, G.; Save, M.; Charleux, B. *Macromol. Rapid Commun.* 2007, 28, 1528-1533.
[42] Ali, A. M. I.; Pareek, P.; Sewell, L.; Schmid, A.; Fujii, S.; Armes, S. P.; Shirley, I. M. *Soft Matter.* 2007, 3, 1003-1013.
[43] Li, Y.; Lokitz, B. S.; McCormick, C. L. *Angew. Chem., Int. Ed.* 2006, 45, 5792-5795.
[44] Li, Y.; Armes, S. P. *Macromolecules.* 2009, 42, 939-945
[45] Madsen, J.; Armes, S. P.; Bertal, K.; MacNeil, S.; Lewis, A. L. *Biomacromolecules.* 2009, 10, 1875-1887
[46] Lobb, E. J.; Ma, I.; Billingham, N. C.; Armes, S. P. *J. Am. Chem. Soc.* 2001, 123, 7913-7914.
[47] Du, J.; Tang, Y.; Lewis, A. L.; Armes, S. P. *J. Am. Chem. Soc.* 2005, 127, 17982-17983.
[48] Save, M.; Weaver, J. V. M.; Armes, S. P.; McKenna, P. *Macromolecules.* 2002, 35, 1152-1159.
[49] Mitsukami, Y.; Donovan, M. S.; Lowe, A. B.; McCormick, C. L. *Macromolecules.* 2001, 34, 2248-2256.
[50] Chiefari, J. J.; Chong Y. K.; Ercole F.; Krstina J.; Jeffery J.; Le T. P. T.; Mayadunne R. T. A.; Meijs G. F.; Moad C. L.; Moad G.; Rizzardo E.; Thang S. H. *Macromolecules.* 1998, 31, 5559-5562.
[51] Morisaku, T.; Watanabe, J.; Konno, T.; Takai, M.; Ishihara, K. *Polymer.* 2008, 49, 4652-4657.
[52] Battaglia, G.; Ryan, A. J. *J. Am. Chem. Soc.* 2005, 127, 8757-8764.
[53] Förster, S.; Plantenberg, T. *Angew. Chem. Int. Ed.* 2002, 41, 688-714.
[54] Boissé, S.; Rieger, J.; Belal, K.; Di-Cicco, A.; Beaunier, P.; Li, M. H.; Charleux, B. *Chem. Commun.* 2010, 46, 1950-1952.
[55] Li, Y.; Armes, S. P. *Angew. Chem. Int. Ed.* 2010, 49, 4042-4046.
[56] Madsen, J.; Armes, S. P.; Bertal, K.; Lomas, H.; MacNeil, S.; Lewis, A. L. *Biomacromolecules.* 2008, 9, 2265-2275.
[57] Bertal, K.; Shepherd J.; Douglas, C. W. I.; Madsen, J.; Morse, A.; Edmondson, S.; Armes, S. P; Lewis, A.; MacNeil, S. *J. Mater. Sci.* 2009, 44, 6233-6246.
[58] Israelachvili, J. N. (1991) *Intermolecular & Surface Forces* (Academic Press, London).
[59] Blanazs, A.; Armes, S. P.; Ryan, A. J. *Macromolecular Rapid Communications.* 2009, 30, 267-277.
[60] Jain, S.; Bates, F. S. *Macromolecules.* 2004, 37, 1511-1523.
[61] Fernyhough, C.; Ryan, A. J.; Battaglia, G. *Soft Matter.* 2009, 5, 1674-1682.
[62] Denkova, A. G.; Mendes, E.; Coppens, M. O, *Soft Matter.* 2010, 6, 2351-2357.
[63] Denkova, A. G.; Mendes, E.; Coppens, M. O. *Journal of Physical Chemistry B.* 2009, 113, 989-996.
[64] Burke, S. E.; Eisenberg, A. *Langmuir.* 2001, 17, 6705-6714.
[65] Dan, N.; Safran, S. A. *Advances in Colloid and Interface Science.* 2006, 123, 323-331.
[66] Dan, N; Shimoni, K.; Pata, V.; Damino, D. *Langmuir.* 2006, 22, 9860-9865.
[67] Chen, L.; Shen, H. W.; Eisenberg, A. *Journal of Physical Chemistry B.* 1999, 103, 9488-9497.
[68] Dire, C.; Magnet, S.; Couvreur, L.; Charleux, B. *Macromolecules.* 2009, 42, 95-103.
[69] Boursier, T; Chaduc, I.; Rieger, J.; D'Agosto, F.; Lansalot, M.; Charleux, B. *Polymer Chemistry,* 2011, 3, 355-362.
[70] Rieger, J.; Zhang, W. J.; Stoffelbach, F.; Charleux, B. *Macromolecules.* 2010, 43, 6302-6310.
[71] Wan, W.-M.; Sun, X.-L.; Pan, C.-Y. *Macromolecules.* 2009, 42, 4950-4952.
[72] Wan, W.-M.; Sun, X.-L.; Pan. C.-Y. *Macromolecular Rapid Communications.* 2010, 31, 399-404.
[73] Wan, W.-M.; Pan, C.-Y. *Polymer Chemistry.* 2010, 1, 1475-1484.
[74] Huang, C.-Q.; Pan, C.-Y. *Polymer.* 2010, 51, 5115-5121.
[75] Cai, W.-M.; Wan, W.-M.; Hong, C.-Y.; Huang, C.-Q.; Pan, C.-Y. *Soft Matter.* 2010, 6, 5554-5561.
[76] Moad, G.; Rizzardo, E.; Thang, S. H. *Accounts of Chemical Research.* 2008, 41, 1133-1142.
[77] Barner-Kowollik, C.; Buback, M.; Charleux, B.; Coote, M. L.; Drache, M.; Fukuda, T.; Goto, A.; Klumperman, B.; Lowe, A. B.; McLeary, J. B.; et al. *Journal of Polymer Science Part A-Polymer Chemistry.* 2006, 44, 5809-5831.
[78] Yu, B.; Lowe, A. B.; Ishihara, K. *Biomacromolecules.* 2009, 10, 950-958.
[79] Manoharan, V. N.; Elsesser, M. T.; Pine, D. J. *Science.* 2003, 301, 483-487.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of preparing colloidally stable polymeric particles comprising a block copolymer of Formula B:

　　　　　Formula B wherein $P_1$ represents a polymeric component derived from a monomer $M_1$, and $P_2$ represents a substantially aqueously insoluble polymeric component derived from an aqueously soluble monomer $M_2$, the method comprising forming a block copolymer of Formula B in an aqueous based medium by admixing:

(a) an aqueously soluble polymer including moieties of Formula A

　　　　　Formula A where X represents a terminal group of $P_1$, at least some of the groups X being a chain transfer agent (CTA) terminal group, with b) monomer $M_2$ and initiating an aqueous dispersion-type radical addition fragmentation chain transfer (RAFT) polymerization, to provide the block copolymer of Formula B, wherein each monomer $M_1$ is selected from a monomer of the Formula $M_{1A}$, $M_{1B}$ and/or $M_{1C}$:

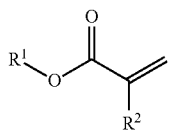　　　　　Formula $M_{1A}$

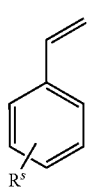　　　　　Formula $M_{1B}$

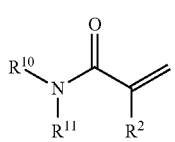　　　　　Formula $M_{1C}$ where $R^1$, $R^{10}$ and $R^{11}$ represent a substituent of $M_{1A}$ or $M_{1C}$ which allows $P_1$ to be at least partially aqueously soluble, $R^2$ represents H, $CH_3$ or CN, $R^S$ represents one or more substituents of the aromatic ring effective to allow $P_1$ to be least partially aqueously soluble, and each monomer $M_2$ is selected from a monomer of the Formulae $M_{2A}$ and/or $M_{2B}$:

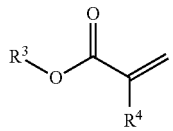　　　　　Formula $M_{2A}$

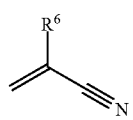　　　　　Formula $M_{2B}$ where $R^3$ is a substituent of $M_2$ which allows $P_2$ to be substantially aqueously insoluble, and $R^4$ and $R^6$ independently represent H or methyl;

or $P_1$ is a copolymer comprising a monomer $M_1$ with a monomer $M_2$ provided that the polymer $P_1$ remains aqueously soluble; and wherein the block copolymer of Formula B is selected from the group consisting of:

(i) PGMA-PHPMA: poly(glycerol monomethacrylate)-poly (2-hydroxypropyl methacrylate);

(ii) PQDMA-PHPMA: methyl chloride-quaternized poly(2-(dimethylamino)ethyl methacrylate)-poly(2-hydroxypropyl methacrylate);

(iii) PDPA-PHPMA: poly2-(diisopropylamino)ethyl methacrylate-poly(2-hydroxypropyl methacrylate);

(iv) PSEMA-PHPMA: poly(2-(methacryloyloxy)ethyl succinate)-poly(2-hydroxypropyl methacrylate);

(v) PKPSMA-PHPMA: poly(potassium 3-sulfopropyl methacrylate)-poly(2-hydroxypropyl methacrylate);

(vi) PAMA-PHPMA: poly(2-aminoethyl methacrylate)-poly (2-hydroxypropyl methacrylate);

(vii) PDMA-PHPMA: poly(2-(dimethylamino)ethyl methacrylate)-poly(2-hydroxypropyl methacrylate);

(viii) PGMA-PHEMA: poly(glycerol monomethacrylate)-poly(2-hydroxyethyl methacrylate);

(ix) PMPC-PHPMA: poly(2-(methacryloyloxy)ethyl phosphorylcholine)-poly(2-hydroxypropyl methacrylate);

(x) PGMA-(PHPMA/EGDMA): poly(glycerol monomethacrylate)-poly(2-hydroxypropyl methacrylate) cross-linked via ethylene glycol dimethacrylate or poly(ethylene glycol dimethacrylate);

(xi) PMPC-(PHPMA-EGDMA): poly(2-(methacryloyloxy) ethyl phosphorylcholine)-poly(2-hydroxypropyl methacrylate) cross-linked via ethylene glycol dimethacrylate or poly(ethylene glycol dimethacrylate);

(xii) PGMA-P(HEMA-stat-PHBMA): poly(glycerol monomethacrylate)-[statistical co-polymer of (2-hydroxyethyl methacrylate) and (hydroxybutyl methacrylate)]; and (xiii) PDMAA-PMEA: polydimethylacrylamide-poly(2-methoxyethyl acrylate).

2. The method of claim 1, wherein the block copolymer of Formula B is selected from the group consisting of:

(i) PGMA-PHPMA: poly(glycerol monomethacrylate)-poly(2-hydroxypropyl methacrylate), wherein the block has a degree of polymerization (DP) of 30-80 and the PHPMA block has a DP of 10-1000;

(ii) PQDMA-PHPMA: methyl chloride-quaternized poly (2-(dimethylamino)ethyl methacrylate)-poly(2-hydroxypropyl methacrylate), wherein the PQDMA block has a DP of 40-80 and the PHPMA block has a DP of 20-400;

(iii) PDPA-PHPMA: poly2-(diisopropylamino)ethyl methacrylate-poly(2-hydroxypropyl methacrylate), wherein the PDPA block has a DP of 40-80 and the PHPMA block has a DP of 10-400;
(iv) PSEMA-PHPMA: poly(2-(methacryloyloxy)ethyl succinate)-poly(2-hydroxypropyl methacrylate), wherein the PSEMA block has a DP of 40-100 and the PHPMA block has a DP of 10-400;
(v) PKPSMA-PHPMA: poly(potassium 3-sulfopropyl methacrylate)-poly(2-hydroxypropyl methacrylate), wherein the PKPSMA block has a DP of 50-80 and the PHPMA block has a DP of 10-400;
(vi) PAMA-PHPMA: poly(2-aminoethyl methacrylate)-poly(2-hydroxypropyl methacrylate), wherein the PAMA block has a DP of 50-80 and the PHPMA block has a DP of 10-400;
(vii) PDMA-PHPMA: poly(2-(dimethylamino)ethyl methacrylate)-poly(2-hydroxypropyl methacrylate), wherein the PDMA block has a DP of 50-80 and the PHPMA block has a DP of 10-400;
(viii) PGMA-PHEMA: poly(glycerol monomethacrylate)-poly(2-hydroxyethyl methacrylate), wherein the PGMA block has a DP of 40-80 and the PHEMA block has a DP of 10-400;
(ix) PMPC-PHPMA: poly(2-(methacryloyloxy)ethyl phosphorylcholine)-poly(2-hydroxypropyl methacrylate), wherein the PMPC block has a DP of 10-60 and the PHPMA block has a DP of 10-450;
(x) PGMA-(PHPMA/EGDMA): poly(glycerol monomethacrylate)-poly(2-hydroxypropyl methacrylate) cross-linked via ethylene glycol dimethacrylate or poly(ethylene glycol dimethacrylate), wherein the PGMA block has a DP of 30-80, the PHPMA block has a DP of 10-400, and the EGDMA cross-linker has a DP of 1-8;
(xi) PMPC-(PHPMA-EGDMA): poly(2-(methacryloyloxy)ethyl phosphorylcholine)-poly(2-hydroxypropyl methacrylate) cross-linked via ethylene glycol dimethacrylate or poly(ethylene glycol dimethacrylate), wherein the PMPC block has a DP of 10-170, the PHPMA block has a DP of 10-450, and the EGDMA cross-linker has a DP of 1-8;
(xii) PGMA-P(HEMA-stat-PHBMA): poly(glycerol monomethacrylate)-[statistical co-polymer of (2-hydroxyethyl methacrylate) and (hydroxybutyl methacrylate)], wherein the PGMA block has a DP of 10-500 and each of PHEMA and PHBMA have a DP of 10-450;
(xiii) PDMAA-PMEA: polydimethylacrylamide-poly(2-methoxyethyl acrylate), wherein the PDMAA block has a DP of 10-500 and the PMEA block has a DP of 50-800.

3. The method of claim 2, wherein the block copolymer of Formula B is selected from the group consisting of:
(i) PGMA-PHPMA: poly(glycerol monomethacrylate)-poly(2-hydroxypropyl methacrylate), wherein the block has a degree of polymerization (DP) of 30-80 and the PHPMA block has a DP of 10-1000;
(x) PGMA-(PHPMA/EGDMA): poly(glycerol monomethacrylate)-poly(2-hydroxypropyl methacrylate) cross-linked via ethylene glycol dimethacrylate or poly(ethylene glycol dimethacrylate), wherein the PGMA block has a DP of 30-80, the PHPMA block has a DP of 10-400, and the EGDMA cross-linker has a DP of 1-8;
(xii) PGMA-P(HEMA-stat-PHBMA): poly(glycerol monomethacrylate)-[statistical co-polymer of (2-hydroxyethyl methacrylate) and (hydroxybutyl methacrylate)], wherein the PGMA block has a DP of 10-500 and each of PHEMA and PHBMA have a DP of 10-450;
(xiii) PDMAA-PMEA: polydimethylacrylamide-poly(2-methoxyethyl acrylate), wherein the PDMAA block has a DP of 10-500 and the PMEA block has a DP of 50-800.

4. The method of claim 1, wherein the block copolymer of Formula B is PGMA-PHPMA: poly(glycerol monomethacrylate)-poly(2-hydroxypropyl methacrylate).

5. The method of claim 4, wherein the block copolymer of Formula B is PGMA-PHPMA: poly(glycerol monomethacrylate)-poly(2-hydroxypropyl methacrylate), wherein the block has a degree of polymerization (DP) of 30-80 and the PHPMA block has a DP of 50-500.

* * * * *